US012627929B2

(12) United States Patent
Tanaka et al.

(10) Patent No.: US 12,627,929 B2
(45) Date of Patent: May 12, 2026

(54) SPEAKER UNIT AND SPEAKER CURVED DIAPHRAGM

(71) Applicant: Mirai Speaker Inc., Tokyo (JP)

(72) Inventors: Hiroshi Tanaka, Tokyo (JP); Masahiro Suzuki, Tokyo (JP)

(73) Assignee: Mirai Speaker Inc., Tokyo (JP)

( * ) Notice: Subject to any disclaimer, the term of this patent is extended or adjusted under 35 U.S.C. 154(b) by 118 days.

(21) Appl. No.: 18/578,825

(22) PCT Filed: Jul. 18, 2022

(86) PCT No.: PCT/JP2022/027958
§ 371 (c)(1),
(2) Date: Jan. 12, 2024

(87) PCT Pub. No.: WO2023/002962
PCT Pub. Date: Jan. 26, 2023

(65) Prior Publication Data

US 2024/0323610 A1 Sep. 26, 2024

(30) Foreign Application Priority Data

Jul. 20, 2021 (JP) ................................ 2021-120069
Jul. 20, 2021 (JP) ................................ 2021-120070
Jul. 20, 2021 (JP) ................................ 2021-120071

(51) Int. Cl.
*H04R 7/12* (2006.01)
*H04R 1/02* (2006.01)
(Continued)

(52) U.S. Cl.
CPC ............ *H04R 7/122* (2013.01); *H04R 1/025* (2013.01); *H04R 7/18* (2013.01); *H04R 9/045* (2013.01); *H04R 9/06* (2013.01)

(58) Field of Classification Search
CPC .......... H04R 7/122; H04R 1/025; H04R 7/18; H04R 9/045; H04R 9/06
See application file for complete search history.

(56) References Cited

U.S. PATENT DOCUMENTS 10,182,294 B2 * 1/2019 Nozaki .................... H04R 7/16
2005/0152575 A1 * 7/2005 Paddock ................. H04R 7/12
381/423
(Continued)

FOREIGN PATENT DOCUMENTS

JP S59-59096 U 4/1984
JP 5668233 B1 2/2015
(Continued)

*Primary Examiner* — Olisa Anwah
(74) *Attorney, Agent, or Firm* — Dilworth & Barrese, LLP

(57) ABSTRACT

[Problem]
Provided is a high-performance and high-quality curved diaphragm speaker system that is capable of reproducing sounds in a plurality of bands and achieves performance sufficient for hard-of-hearing people and hearing people.
[Solution]
A speaker unit 10 of the present invention includes a first diaphragm 1 in a corn form, a second diaphragm 2 in a curved sheet form, and a driver unit 4 that drives both of the first diaphragm and the second diaphragm. A small diameter side 1*a* of the first diaphragm and one end side 2*a* of the second diaphragm are both connected to the driver unit. The second diaphragm has a plurality of regions having different resonance characteristics due to a change in the curvature of a diaphragm surface in the middle from the one end side to the other end side in a length direction. This speaker unit is attached to a housing 50 to form a speaker 100.

12 Claims, 35 Drawing Sheets

(51) Int. Cl.

| | |
|---|---|
| ***H04R 7/18*** | (2006.01) |
| ***H04R 9/04*** | (2006.01) |
| ***H04R 9/06*** | (2006.01) |

(56) References Cited

U.S. PATENT DOCUMENTS

| | | | | |
|---|---|---|---|---|
| 2014/0270327 | A1* | 9/2014 | Hedges | H04R 17/005<br>381/398 |
| 2016/0142824 | A1* | 5/2016 | Clark | H04R 7/04<br>381/423 |
| 2019/0069091 | A1* | 2/2019 | Bruins | H04R 7/18 |
| 2021/0377665 | A1* | 12/2021 | Mettler | H04R 23/02 |
| 2024/0137705 | A1* | 4/2024 | Jin | H04R 7/14 |

FOREIGN PATENT DOCUMENTS

| | | | |
|---|---|---|---|
| JP | 2016-15702 | A | 1/2016 |
| JP | 2016-140060 | A | 8/2016 |
| JP | 6586702 | B1 | 10/2019 |

* cited by examiner

SPEAKER UNIT AND SPEAKER CURVED DIAPHRAGM

TECHNICAL FIELD

The present invention relates to a speaker unit using a curved diaphragm and a speaker using the same and specifically relates to a high performance and high quality curved diaphragm speaker system that allows hearing-impaired people to hear together with hearing people without wearing a hearing aid and that expands a reproduction frequency bandwidth and improves the sound quality.

BACKGROUND ART

Recent years, the number of people with hearing difficulties such as age-related hearing loss caused by aging, organic hearing loss with a damage to the external ear, the middle ear, the internal ear, the cochlear nerve, and the like, and functional hearing loss caused by stress has been increased. In a case of hearing loss, it is not only a loss of a sense of hearing but also it is difficult to distinguish clearly even the sounds that can hear. For this reason, in some cases, a misunderstanding of a conversation partner may be caused by answering without fully understanding the content of the conversation, or a lively conversation cannot be made because of repeatedly asking of what is said.

Additionally, it has been said that there is a risk that an inability to communicate smoothly due to the hearing loss may cause a phenomenon where it becomes troublesome unconsciously to have a conversation, which leads less opportunities to meet with people and a tendency to stay at home, and there may occur a problem of social isolation and exclusion.

In general, use of a hearing aid is a means of reducing the inconveniences of the hearing loss as described above. Additionally, for a case of watching television, there is an FM transmitter that obtains the sound of the television by being connected to an earphone jack of the television to transmit the sound via FM radio waves and receive the FM radio waves with the own FM radio.

However, the hearing aid has not been preferably used and has been used reluctantly in many cases because of the reasons such as “troublesome” and “embarrassing to wear”. Additionally, there are many hearing aids that also pick up the noises, which rather causes great stress in some cases.

On the other hand, in a case of using the FM transmitter, it is troublesome that it is required to prepare the FM transmitter and Install the FM transmitter every time watching television. Additionally, there is a problem that, since the output destination of the sound is switched by connecting the FM transmitter to the earphone jack, it is impossible for hearing-impaired people and hearing people to comfortably watch the television together.

To deal with this, as a speaker that generates sound that not all the hearing-impaired people but most of the hearing-impaired people can hear, there has been proposed by the applicant a speaker that includes a housing with a hollow structure, a driving unit stored in the housing, and a curved diaphragm arranged on a surface of the housing and that is configured to emit the sound by transmitting vibrations of the driving unit to an end edge portion of the curved diaphragm (for example, see Patent Literatures 1 and 2).

Such a speaker using the curved diaphragm (hereinafter, simply referred to as a “curved diaphragm speaker”) allows hearing-impaired people to hear without wearing a hearing aid and also allows hearing people to hear without discomfort.

In addition, with the curved diaphragm speaker according to the inventions disclosed in Patent Literatures 1 and 2, it could be confirmed in a later demonstration experiment that it allows for hearing of close sounds as a matter of course but also for clear hearing of sounds in the distance. That is, it allows for hearing with no cracking sound like when the volume is turned up excessively and also for hearing of close sounds at a volume not excessively loud.

It has been confirmed that this curved diaphragm speaker has a basic performance at an applicable level; however, it has been demanded in the expansion of a reproduction frequency bandwidth, particularly in a low sound bandwidth equal to or less than 400 to 500 Hz (hereinafter, referred to as a “low frequency”), to enhance the sound quality with an improvement in the reproduction performance.

Here, the curved diaphragm speaker is in general a means that drives the curved diaphragm by a moving coil, which is so-called a voice coil, and generates sound. In order to increase the reproduction capability on the low frequency side with this means, there are required an increase in the amount of voice coil amplitude (movement) appropriate for the capability, a diaphragm and a structure appropriate for the voice coil amplitude, and powerup.

However, if the amount of the amplitude of the voice coil is increased forcibly to increase the reproduction capability on the low frequency side, the curved diaphragm itself makes abnormal sound. For this reason, in order to perform the low frequency reproduction equivalent to that by a conventional type speaker, the area of the curved diaphragm needs to be expanded by, for example, extending the length, but it is impossible to say that this dimension is an applicative dimension.

To deal with this, it can be considered in order to increase the reproduction capability on the low frequency side that a dynamic type speaker unit including a cone-shaped diaphragm is additionally mounted in the housing in which the curved diaphragm speaker unit is mounted, and both the speaker units are driven to emit sounds respectively. With this, the sound quality of the curved diaphragm having difficulty making sound on the low frequency side can be corrected by the sound emission by the cone-shaped diaphragm, and it is possible to implement a compound type full-range speaker using the curved diaphragm and the cone-shaped diaphragm.

However, with such a compound type speaker system, although the housing in which the speaker units are mounted can be shared, there are still required the two speaker units (the curved diaphragm speaker unit and the dynamic type speaker unit) corresponding to the reproduction frequency bandwidths, and this leads high cost.

Additionally, if each of the speaker units are mounted in the housing to make the sound emission directions of the curved diaphragm and the cone-shaped diaphragm the same in order to secure a favorable sense of sound pressure of the sounds emitted from the two speakers, a wider disposing area is required, and the size of the housing is increased. On the other hand, if the sound emission directions of the curved diaphragm and the cone-shaped diaphragm are made different in consideration of the disposing area, it is impossible to obtain a sufficient sense of sound pressure in either one of the speakers.

Therefore, the applicant has been proposed a speaker unit that includes a first diaphragm in the form of a cone, a second diaphragm in the form of a curved sheet, and a driver unit that drives those first diaphragm and second diaphragm together, in which the driver unit is connected to both a small diameter side of the first diaphragm and one end side of the second diaphragm, and a speaker that is formed by mounting this speaker unit in a housing (see Patent Literature 3).

The speaker unit proposed by the applicant requires only one driver unit; for this reason, the manufacturing cost and the weight can be reduced, and the speaker unit can be small in a compact form. Additionally, since it is a combination of a dynamic-type first speaker including the cone-shaped diaphragm and a second speaker including the curved diaphragm, the speaker using this speaker unit can reproduce the sound of a wider bandwidth.

Therefore, the reproduction bandwidth on the low frequency side that the second speaker (the curved diaphragm speaker) cannot sound is made up by the first speaker (the dynamic-type speaker), and it is possible to implement a hybrid-type speaker system that includes a speaker that is extremely effective for hearing-impaired people and a speaker for hearing people and that can reproduce the sound of a wider bandwidth.

The hybrid-type speaker system proposed by the applicant as above can be said as a curved diaphragm speaker system that is sufficient for hearing-impaired people and hearing people; however, once it is manufactured in a compact form and it is possible to reproduce the sound of a wider bandwidth, there has been demanded a proposition of a high performance and high quality curved diaphragm speaker system with further improved sound quality.

Note that, there has been proposed a speaker that includes (a pair of) two diaphragms forming curved vibration surfaces such that the sound of a wide bandwidth can be reproduced in a piezoelectric type speaker in which piezoelectric matter is used for a driving unit of the flat diaphragms (see Patent Literature 4).

However, when the sizes and the shapes of the pair of the two diaphragms (the vibration surfaces) are the same, the sounds of the same resonance bandwidth are reproduced from the different vibration surfaces at close positions, and there is concern that the respectively generated sounds resonate to the other or are distorted and are then turned into unclear sounds that sound weird for hearing-impaired people and hearing people.

PRIOR ART DOCUMENTS

Patent Documents

Patent Documents 1: Japanese Patent No. 5668233
Patent Documents 2: Japanese Patent Application Publication No. 2016-140060
Patent Documents 3: Japanese Patent No. 6586702
Patent Documents 4: Japanese Utility Model Application Publication No. Sho 59-59096

SUMMARY OF INVENTION

Technical Problems

The present invention is made in view of the above-described circumstances and provides a high performance and high quality curved diaphragm speaker system, which is a hybrid-type speaker system using a curved diaphragm that can reproduce sounds of multiple bandwidths and that achieves expansion of the reproduction frequency bandwidth and improvement in the sound quality.

Solution to Problems

A speaker unit according to the present invention at least includes: a first diaphragm in the form of a cone; a second diaphragm in the form of a sheet forming a curved vibration surface; and a driver unit that drives the first diaphragm and the second diaphragm together, in which the driver unit is connected to a small diameter side of the first diaphragm and one end side of the second diaphragm, and the second diaphragm includes multiple regions of different resonance characteristics.

That is, the second diaphragm is a single diaphragm on which multiple curved vibration surfaces of different resonance bandwidths are provided.

It is desirable that these regions of different resonance characteristics are arranged in a length direction from the one end side toward facing another end side along a curve direction in the diaphragm.

This second diaphragm may include the multiple regions of different resonance characteristics by, for example, being bent such that curvatures of the vibration surfaces are changed in the middle of the length direction from the one end side toward the facing other end side along the curve direction.

To be specific, it is a combination of two regions in which a curvature of a curved vibration surface on the one end side is small, and a curvature of a curved vibration surface on the other end side is great.

Thus, it is possible to reproduce sound of a reduced resonance bandwidth by reducing the curvature of the curved vibration surface on the one end side, and it is possible to reproduce sound of an increased resonance bandwidth by increasing the curvature of the curved vibration surface on the one end side more than that on the one end side.

Additionally, the second diaphragm may include multiple regions of different resonance characteristics by applying a shape in which thicknesses of the vibration surfaces are changed in the middle of the length direction from the one end side toward the other end side.

That is, in the second diaphragm, a predetermined means is adopted to provide regions of different thicknesses on the single curved diaphragm.

Here, the predetermined means is, for example, to affix a sheet material or to apply a coating agent on either one of a predetermined region or another region except the predetermined region.

Therefore, for example, it is possible to implement a diaphragm of a combination of two regions in which the thickness of the predetermined region in the vibration surfaces is increased (thickened), and the thickness of the other region is reduced (thinned) more than that of the predetermined region by adopting such a predetermined means.

Thus, it is possible to reproduce sound of a reduced resonance bandwidth by increasing the thickness of the predetermined region in the vibration surfaces, and it is possible to reproduce sound of an increased resonance bandwidth by reducing the thickness of the other region except the predetermined region.

Moreover, the second diaphragm may include multiple regions of different resonance characteristics by applying a shape in which hardnesses of the vibration surfaces are changed in the middle of the length direction from the one end side toward the other end side.

That is, in the second diaphragm, the predetermined means is adopted to provide regions of different hardnesses on the single curved diaphragm.

To be specific, it is possible to implement a combination of two regions in which the predetermined region in the curved diaphragm is made hard, and the other region is made soft more than the predetermined region by adopting the above-described predetermined means.

Thus, it is possible to reproduce sound of an increased resonance bandwidth by making the predetermined region in the curved vibration surfaces hard, and it is possible to reproduce sound of a reduced resonance bandwidth by making the other region except the predetermined region soft.

Furthermore, the second diaphragm may include multiple regions of different resonance characteristics by applying a shape in which weights of the vibration surfaces are changed in the middle of the length direction from the one end side toward the other end side.

That is, in the second diaphragm, the predetermined means is adopted to provide regions of different weights on the single curved diaphragm.

To be specific, it is possible to implement a combination of two regions in which the weight of the predetermined region in the curved diaphragm is increased (made heavy), and the weight of the other region except the predetermined region reduced (made light) by adopting the above-described predetermined means.

Thus, it is possible to reproduce sound of a reduced resonance bandwidth by increasing the weight of the predetermined region in the curved vibration surfaces, and it is possible to reproduce sound of an increased resonance bandwidth by reducing the weight of the other region except the predetermined region.

Additionally, in the speaker unit according to the present invention, it is desirable that the predetermined region in the second diaphragm includes a boundary with the other region that has a tapered shape in which a dimension in a width direction is reduced toward the other end side from the one end side of the second diaphragm.

That is, the boundary between the predetermined region and the other region is provided to be in the form of a Roman character "V".

Thus, with the provision of the predetermined region and the other region such that the shape of a boundary portion is in the form of a Roman character "V", resonance regions are overlapped in the middle of the length direction from the one end side toward the other end side in the second diaphragm, and it is possible to reproduce blended sounds of multiple different resonance characteristics.

In addition, in the speaker unit according to the present invention, the second diaphragm may be connected to the driver unit via a blade piece in the form of a plate attached to a tip of a voice coil bobbin of the driver unit.

This blade piece may be, for example, directly attached by providing a notch at the tip of the voice coil bobbin, or a center cap may be attached to the tip of the voice coil bobbin to attach the blade piece to this center cap.

In this case, the blade piece may be a separate body from the center cap, but it is desirable to be integral with the center cap. That is, the blade piece may be attached to an already-existing center cap, but this case requires two operations such as to attach the center cap to the voice coil tip and to attach the blade piece to the center cap.

However, when the blade piece and the center cap are integral in advance, it is possible to efficiently attach the blade piece by one operation to attach the center cap to the voice coil tip. In addition, with the integral blade piece and center cap, it is also possible to avoid a risk that the blade piece falls off the center cap due to vibration of the voice coil.

Moreover, a speaker according to the present invention is formed by mounting any one of the above-described speaker units in a housing.

Advantageous Effects of Invention

A speaker unit of the present invention includes a first diaphragm in the form of a cone and a second diaphragm in the form of a sheet forming a curved vibration surface, and the second diaphragm includes multiple regions of different resonance characteristics. Therefore, sounds of different resonance bandwidths are reproduced from one region and another region in a single curved diaphragm; thus, a wide (expanded) reproduction frequency bandwidth is obtained, and it is possible to to improve the sound quality.

Additionally, with the speaker unit of the present invention described above being mounted (stored) in a housing, a speaker of the present invention is a hybrid-type speaker system, which is a combination of a dynamic-type first speaker including a cone-shaped diaphragm and a second speaker including a first curved vibration surface (one region) and a third speaker including a second curved vibration surface (the other region) formed by dividing a single curved diaphragm. Therefore, it is possible to implement a speaker system including a speaker that is extremely effective for hearing-impaired people and a speaker for hearing people in which the first speaker (the dynamic-type speaker) makes up the reproduction bandwidth on a low frequency side that the second speaker and the third speaker (both are the curved diaphragm speaker) cannot sound, and sounds of different resonance bandwidths reproduced in the respective curved vibration surfaces (regions) of the second speaker and the third speaker are combined, and thus the reproduction frequency bandwidth is expanded, and the sound quality is improved.

Accordingly, in a compound type speaker system using a curved diaphragm, sounds of multiple bandwidths can be reproduced, and thus expansion of the reproduction frequency bandwidth and improvement in the sound quality are achieved, and it is possible to provide a further favorable high performance and high quality curved diaphragm speaker system with less cost and also the favorable sense of sound pressure secured without a size increase in a housing.

DESCRIPTION OF EMBODIMENTS

First Embodiment

Hereinafter, regarding an embodiment of a speaker unit according to the present invention and a hybrid-type speaker system using this speaker unit, a configuration in which multiple curved vibration surfaces of different resonance bandwidths are provided on a single diaphragm is described as an example with reference to the drawings.

Note that, the embodiment described below is technically limited in various ways since it is a specific example of the present invention; however, unless otherwise stated in the description below that it is particularly limited, the scope of the present invention is not limited to the mode.

Figure 1:
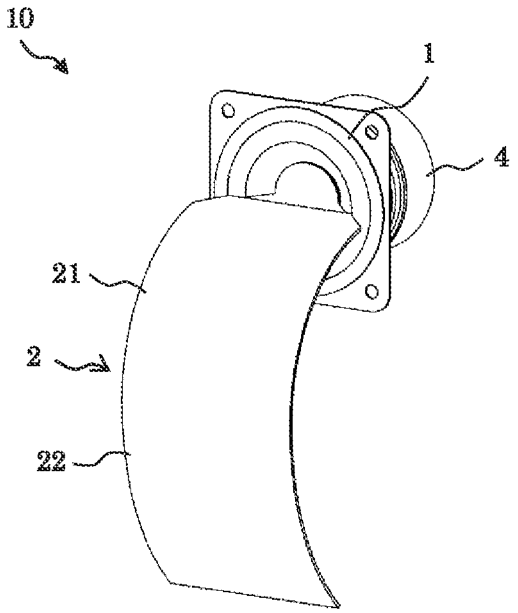
FIG. 1 is a front perspective view illustrating a first speaker unit according to the present invention.
Figure 2:
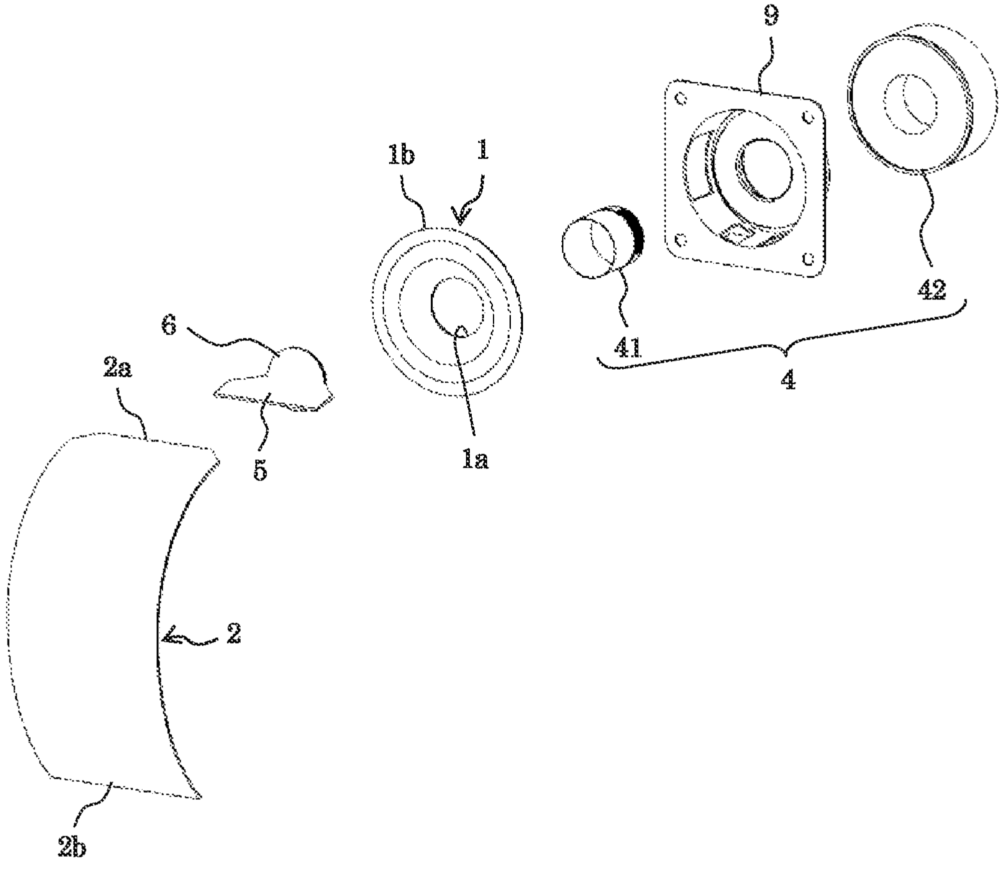
FIG. 2 is an exploded view describing a structure of the first speaker unit according to the present invention.

As illustrated in FIGS. 1 and 2, a first speaker unit 10 according to the present embodiment at least includes a first diaphragm 1 in the form of a cone (hereinafter, referred to as a "cone-shaped diaphragm"), a second diaphragm 2 in the form of a curved sheet (hereinafter, referred to as a "curved diaphragm"), a driver unit 4 that drives those cone-shaped diaphragm 1 and curved diaphragm 2 together, and a blade piece 5 in the form of a plate that is attached to one end side of the curved diaphragm 2 and connected to the driver unit 4.

The cone-shaped diaphragm 1 is a sheet-shaped member in the form of a mortar in which a small diameter side 1*a* is connected to the driver unit 4 while a large diameter side 1*b* is attached to a cone support frame 9. This cone-shaped diaphragm 1 attaches the cone support frame 9 to a housing 50 described later when forming a speaker, and the speaker is formed by mounting the large diameter side 1*b* of the cone-shaped diaphragm 1 in the housing 50 via the cone support frame 9.

The curved diaphragm 2 is formed in advance to include multiple regions that are curved at desired curvatures (curved vibration surfaces).

Additionally, the curved diaphragm 2 may be a sheet-shaped member having flexibility that can form the curved vibration surfaces by bending elastically and may be a member that can be processed to include multiple regions while maintaining a desired curvature.

That is, in the curved diaphragm 2, the curvatures of the vibration surfaces are changed in the middle of a length direction from one end side 2*a* to another end side 2*b* facing along a curve direction, and sounds of different resonance bandwidths are thus reproduced from the vibration surfaces formed at the different curvatures.

As a material of the curved diaphragm 2, it is possible to use paper such as carbon paper, plastic having flexibility such as polyimide and polyester, a wood material such as balsa wood, and a metal such as aluminum, beryllium, and boron.

Additionally, as a material of the curved diaphragm 2, for example, a foamed sheet material may be applied. To be specific, a sheet-shaped high foam with a thickness of about 1 mm that is called "Softlon S" of SEKISUI CHEMICAL CO., LTD. that foams by heating from x5 to x50 after irradiating polyethylene with electron beams can be applied.

Figure 3:
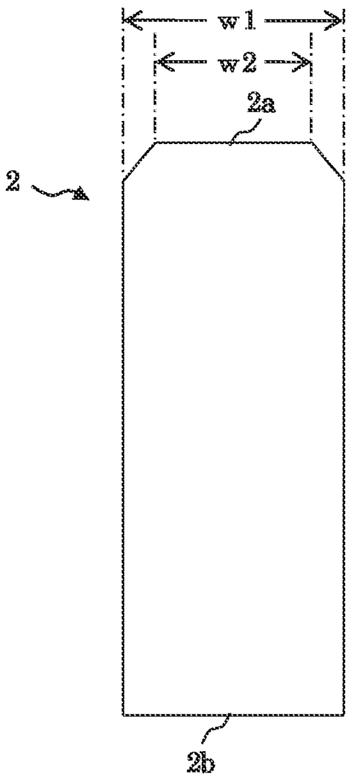
FIG. 3 is a front view describing a curved diaphragm used in the first speaker unit according to the present invention.

As illustrated in FIG. 3, the curved diaphragm 2 has a shape in which the dimension in a width direction is gradually reduced (narrowed) toward the one end side 2*a* connected to the driver unit 4.

Here, the width direction means a direction orthogonal to the length direction of the curved vibration surface from the one end side 2*a* to the facing other end side 2*b* along the curve direction, and the dimension in the width direction means a distance (a length) between edge portions on two sides along the length direction.

In FIG. 3, there is illustrated that, in the curved diaphragm 2, the shape in the width direction is gradually reduced (narrowed) toward the one end side 2*a* from the other end side 2*b*, and a dimension w2 in the width direction of the one end side 2*a* is smaller than a dimension w1 in the width direction that stays constant from the other end side 2*b* (w1>w2).

Therefore, the shape of the one end side 2*a* in the curved diaphragm 2 is substantially the same shape conforming to the mortar shape of the cone-shaped diaphragm 1, and even when the one end side 2*a* of the curved diaphragm 2 is also connected to the same driver unit 4 to which the small diameter side 1*a* of the cone-shaped diaphragm 1 is connected, the cone-shaped diaphragm 1 and the curved diaphragm 2 are not put in contact and do not interfere with each other.

Figure 4:
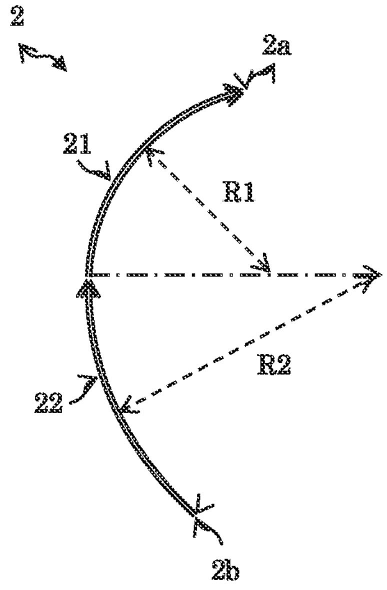
FIG. 4 is a side view describing a structure of the curved diaphragm used in the first speaker unit according to the present invention.

Additionally, as illustrated in FIG. 4, in the curved diaphragm 2, the curvatures of the vibration surfaces are changed in the middle of the length direction from the one end side 2*a* to the other end side 2*b*. That is, the curved diaphragm 2 is bent at a combination of multiple curvatures.

In FIG. 4, there is illustrated that the curved diaphragm 2 is divided into a vibration surface 21 in a region positioned on the one end side 2*a* (hereinafter, referred to as a "first curved vibration surface") and a vibration surface 22 in a region positioned on the other end side 2*b* (hereinafter, referred to as a "second curved vibration surface") and is bent at a combination of a first curvature that the first curved vibration surface 21 has and a second curvature that the second curved vibration surface 22 has, which is different from the first curvature.

To be specific, for example, when a curvature radius R1 in the first curved vibration surface 21 is 51.40 mm, and a curvature radius R2 in the second curved vibration surface 22 is 83.00 mm, the curvature of the first curved vibration surface 21 is greater than the curvature of the second curved vibration surface 22, and the curvatures of the vibration surfaces in the curved diaphragm 2 are changed to be small (gentle) in the middle of the length direction from the one end side 2*a* to the other end side 2*b*.

The driver unit 4 is an actuator that vibrates the cone diaphragm 1 and the blade piece 5 together according to an inputted (conducted) electric signal (sound signal).

Here, a direction in which the curved diaphragm 2 is driven by the driver unit 4 means an expansion direction on a surface of the curved diaphragm 2, that is, the curve direction in which the vibration surfaces are expanded from the one end side 2*a* toward the facing other end side 2*b* (or from the other end side 2*b* toward the facing one end side 2*a*) of the curved diaphragm 2.

This driver unit 4 may be, for example, an electromagnetic actuator of a moving coil type or a moving magnet type. Since the driver unit 4 has a high stacking factor of a coil, the magnetic efficiency is high. Therefore, loud and clear sound emission can be expected.

In the actuator of the moving coil type, a voice coil is inserted and arranged in a magnetic gap formed by a magnetic circuit, an electric signal and the like is applied to this voice coil to generate vibration according to the applied signal, and the vibration is transmitted to the diaphragm connected with the voice coil to drive. That is, since one end of the voice coil is stored inside the magnetic circuit (a magnetic field), and another end is connected to the diaphragm, the inputted electric signal moves the voice coil, and the movement is transmitted to the diaphragm and converted into acoustic energy (sound).

In the present embodiment, as illustrated in FIG. 2, the driver unit 4 is described as the actuator of the moving coil type in which one end of a voice coil 41 is inserted in a magnetic gap of a magnetic circuit 42, and the voice coil 41 is driven by applying the electric signal.

Note that, the electric signal inputted to the driver unit 4 may be, for example, a sound signal outputted from a television, a radio, an audio player, a personal computer, a smart device such as a smart phone and a tablet, and so on.

Figure 5:
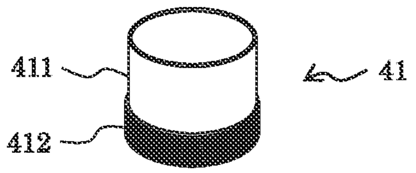
FIG. 5 is a front perspective view describing a voice coil included in a driver unit used in a speaker unit according to the present invention.

As illustrated in FIG. 5, the voice coil 41 is formed by winding a coil wire rod 412 of a desired diameter by a desired number of turns on one end side in a height (length) direction around an outer periphery of a coil bobbin 411 in the form of a cylinder.

Figure 6A:
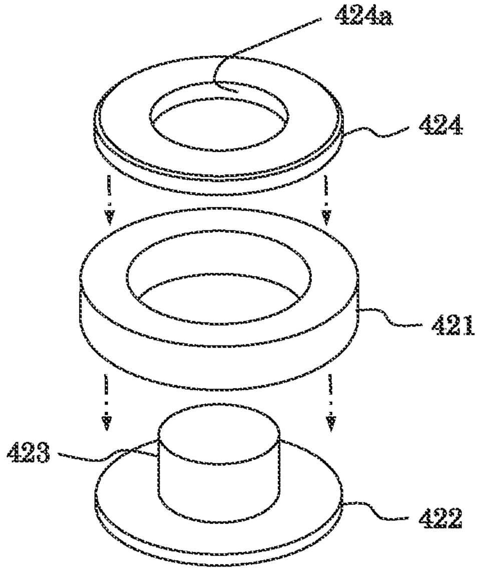
FIG. 6A is an exploded perspective view and FIG. 6B is an assembled and completed perspective view describing a magnetic circuit included in the driver unit used in the speaker unit according to the present invention.
Figure 6B:
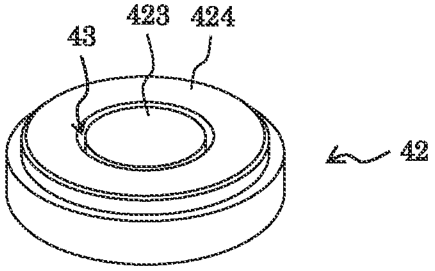

On the other hand, as illustrated in FIG. 6, the magnetic circuit 42 has a shape appropriate for driving the voice coil 41, and a common structure that is used the most is formed of magnetic circuit parts such as a ferrite magnet 421 in a ring shape, a plate 424 provided with a hole 424*a* of a diameter of a predetermined dimension in a central portion of a circular plate made of an iron material that is a good magnetic material, and a yoke 422 provided with a projection portion (hereinafter, described as a "pole") 423 in the form of a column in a central portion of a circular plate made of an iron material likewise.

A magnetic gap 43 is formed with the plate 424 being arranged and mounted on an upper surface of the ferrite magnet 421 in the form of a cylinder while a circular plate portion of the yoke 422 including the pole 423 in the form of a column being arranged and mounted on a lower surface of the ferrite magnet 421. That is, the pole 423 and the plate 424 are mounted by centering an outer diameter of the pole 423 with an inner diameter of the plate hole 424*a*, and thus a clearance in the form of a ring, that is, the gap 43 having a predetermined width dimension is formed between an outer surface of the pole 423 and an inner surface of the hole 424*a* in the center portion of the plate 424.

Additionally, the dimension of the magnetic gap 43 in a depth direction is determined based on the thickness dimension of the plate 424. Therefore, the magnetism that the ferrite magnet 421 has is conducted and converged into the gap 43 by the yoke 422 and the plate 424, a magnetic flux is generated in the gap 43, and thus the magnetic gap is formed. Then, the voice coil 41 is arranged in the center of this ring-shaped magnetic gap 43.

Therefore, as illustrated in FIG. 2, the cone-shaped diaphragm 1 is connected and fixed to the driver unit 4 by inserting the voice coil 41 into a hole (hereinafter, described as a "neck portion") of a predetermined dimension that is provided in a central portion of the small diameter side 1*a* and applying an adhesive to a contact portion between the neck portion and an outer periphery portion of the coil bobbin 411.

The blade piece 5 is used to efficiently connect the curved diaphragm 2 to the driver unit 4 and is attached to a tip of the voice coil 41 of the driver unit 4 so as to protrude from the small diameter side 1*a* to the large diameter side 1*b* of the cone-shaped diaphragm 1.

That is, the one end side 2*a* of the curved diaphragm 2 is connected to the driver unit 4 via the blade piece 5.

It is desirable that this blade piece 5 is formed of a single flat piece entirely from a proximal side connected to the driver unit 4 to a distal side, in which the proximal side is substantially perpendicular to the driver unit 4, and the blade piece 5 is curved or inclined toward the distal side according to the curvature of the curved diaphragm 2.

That is, an operation to attach the curved diaphragm 2 to the blade piece 5 is easily performed when the blade piece 5 is curved (inclined) according to the curvature of the curved diaphragm toward the distal side.

In addition, when the blade piece 5 is curved (inclined) toward the distal side, in the driving by the driver unit 4, it is possible to smoothly drive with no risk of applying stress to the curved diaphragm 2.

In FIGS. 1 and 2, there is illustrated the first speaker unit 10 that includes the curved diaphragm 2 including the two regions of different resonance characteristics, which are a combination of the first curved vibration surface 21 of a large curvature that is positioned on the one end side 2*a* and the second curved vibration surface 22 of a smaller curvature than that of the first curved vibration surface 21.

In the first speaker unit 10 in the present embodiment, when the one end side 2*a* of the curved diaphragm 2 is connected to the driver unit 4, it is possible to connect the curved diaphragm 2 with the driver unit 4 (the voice coil 41) by attaching the one end side 2*a* of the curved diaphragm 2 to the blade piece 5 integral with a center cap 6 attached to the tip of the voice coil 41.

That is, it is possible to implement the first speaker unit 10 as illustrated in FIG. 1 by applying an adhesive to one surface side of the blade piece 5 or one surface side of the curved diaphragm 2 and thereafter arranging one surface of the one end side 2*a* of the curved diaphragm 2 on one surface of the blade piece 5 so as to overlap.

Comparing with the conventional means in which a notch is provided at the tip of the voice coil 41, and the one end side 2*a* of the curved diaphragm 2 is inserted into the notch, this means can reliably connect the curved diaphragm 2 and the driver unit 4 (the voice coil 41) together.

Figure 7:
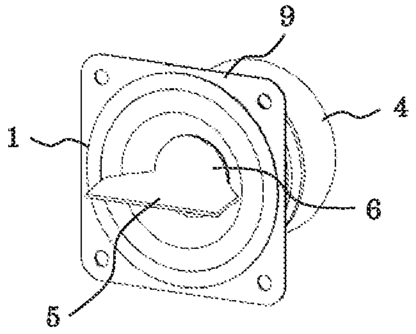
FIG. 7 is a front perspective view illustrating a state before the curved diaphragm is attached in the first speaker unit according to the present invention.

In FIG. 7, there is illustrated that the blade piece 5 is integral with the center cap 6 and includes the flat piece curved downward according to the curvature of the curved diaphragm 2 toward the distal side.

Note that, the center cap (a dust cap) 6 is a member attached to prevent dust from entering into the voice coil 41, and it is possible to enhance the sense of unity in the tone by using the same material as that of the cone paper, or it is possible to give a role of a dome type tweeter by using a metallic material.

In the first speaker unit 10 formed as above, the small diameter side 1*a* of the cone diaphragm 1 and a one end side 2*a* end surface of the curved diaphragm 2 attached via the blade piece 5 are both connected to the driver unit 4 (the voice coil 41). That is, the small diameter side 1*a* of the cone diaphragm 1 is directly connected to the driver unit 4 (the voice coil 41) while the one end side 2*a* of the curved diaphragm 2 is indirectly connected to the driver unit 4 (the voice coil 41) via the blade piece 5.

Therefore, with the application of the electric signal and the like to the driver unit 4, the voice coil 41 generates the vibration according to the applied signal, and the cone diaphragm 1 and the first curved vibration surface 21 and the second curved vibration surface 22 in the curved diaphragm 2 connected to this voice coil 41 can be driven together by transmitting the vibration thereto.

Specifically, one end (a proximal portion) of the voice coil 41 is stored within the magnetic circuit (magnetic field) 42, and another end (a distal portion) is connected to the curved diaphragm 2 via the cone diaphragm 1 and the blade piece 5. Therefore, the inputted electric signal moves the voice coil 41, and the movement is transmitted to the cone diaphragm 1 and the curved diaphragm 2 and converted into acoustic energy (sound).

In addition, since the curvatures of the first curved vibration surface 21 and the second curved vibration surface 22 in the curved diaphragm 2 are different from each other, the resonance bandwidths reproduced by the respective curved vibration surfaces are different.

Additionally, in the first speaker unit 10 in the present embodiment, the small diameter side 1*a* of the cone diaphragm 1 and the one end side 2*a* of the curved diaphragm 2 are connected to the same driver unit 4. Therefore, the driver unit 4 that drives the cone diaphragm 1 and the driver unit 4 that drives the first curved vibration surface 21 and the second curved vibration surface 22 in the curved diaphragm 2 are efficiently shared, and thus the reduction in the manufacturing cost and the weight and the manufacturing into a small and compact form are implemented.

In addition, in the first speaker unit 10 in the present embodiment, it is possible to simply and reliably connect the curved diaphragm 2 with the driver unit 4 via the blade piece 5. Therefore, it is possible to efficiently manufacture the first speaker unit 10 in mass quantities.

Figure 8:
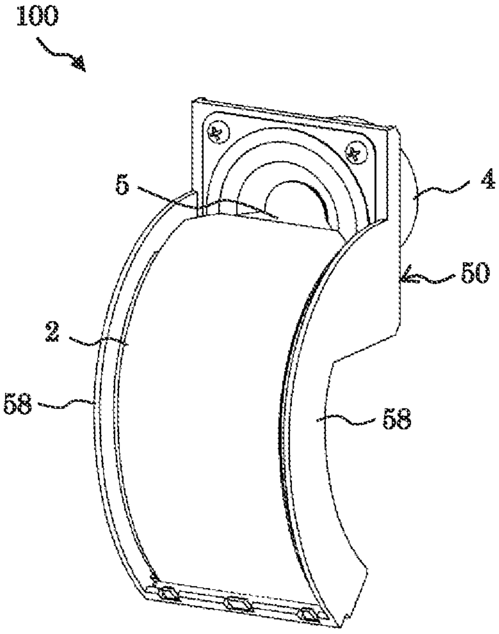
FIG. 8 is a front perspective view illustrating a first speaker in which the first speaker unit according to the present invention is mounted in a housing.
Figure 9:
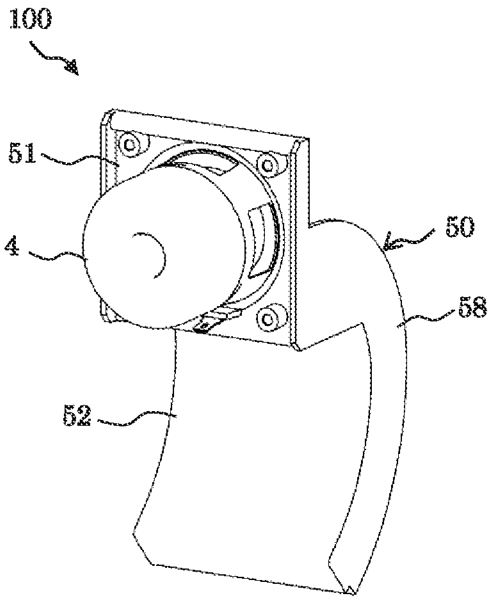
FIG. 9 is a back perspective view of a first speaker illustrated in FIG. 8.

Moreover, the first speaker unit 10 formed as above forms a speaker 100 illustrated in FIGS. 8 and 9 by fixing the large diameter side 1*b* of the cone diaphragm 1 and the other end side 2*b* of the curved diaphragm 2 to the housing 50.

Figure 10:
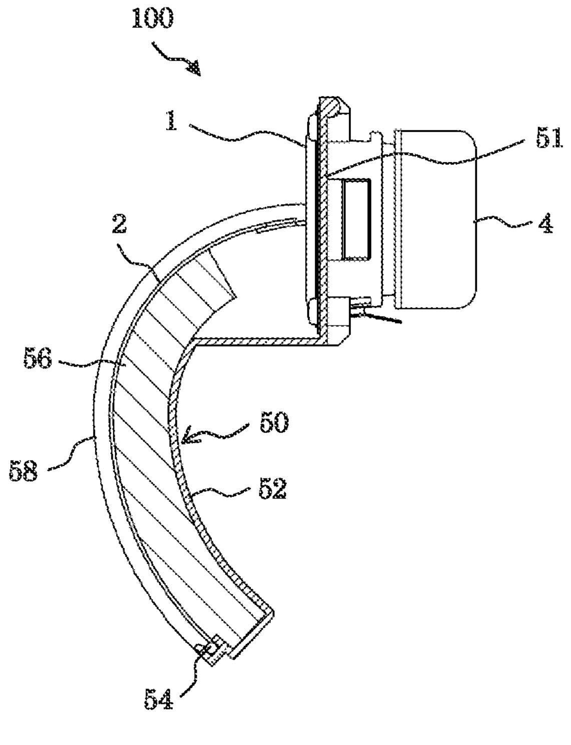
FIG. 10 is a front central longitudinal section of a portion of the first speaker illustrated in FIG. 8 except the driver unit.
Figure 11:
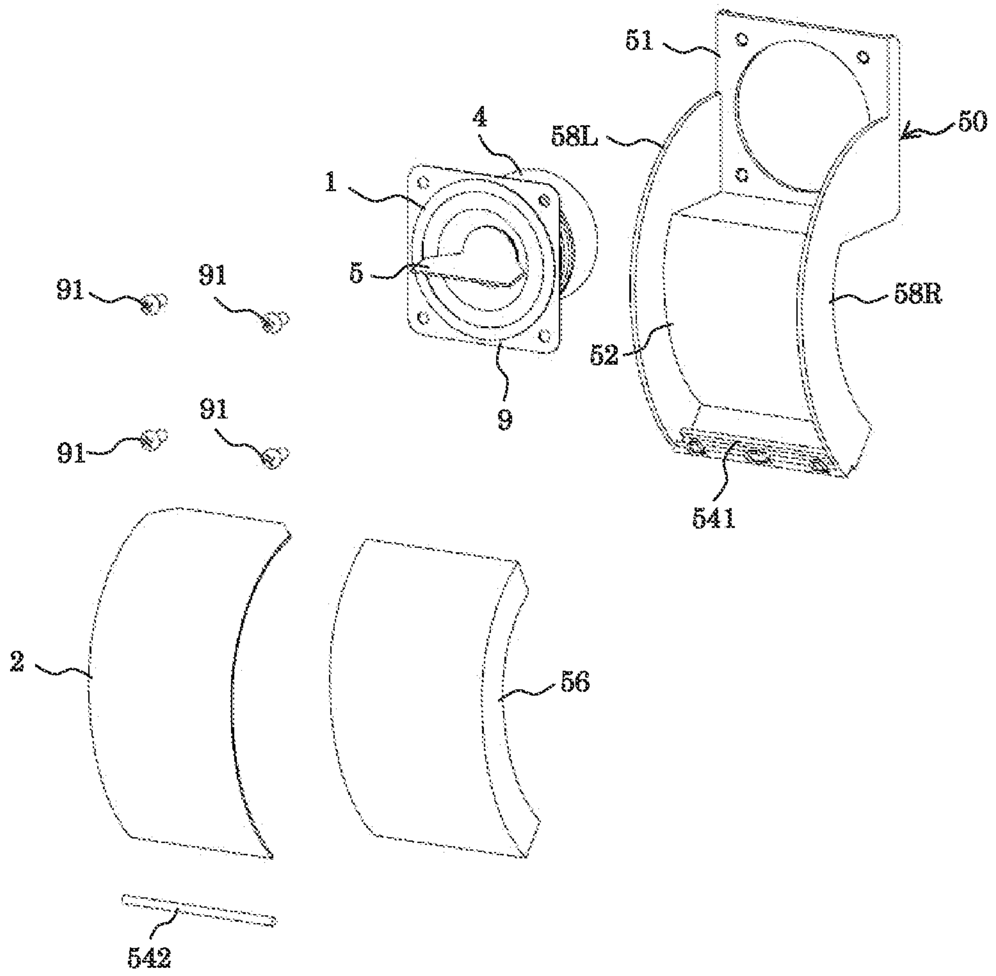
FIG. 11 is an exploded view describing a structure of the first speaker illustrated in FIG. 8.

As illustrated in FIGS. 10 and 11, the housing 50 includes a support frame 51, a support surface 52 continuously provided on this support frame 51, a fixation means 54 provided at a terminal portion of the support surface 52, a flexible elastic support member 56 each arranged on the support surface 52, and a pair of side plates 58, 58.

The support frame 51 is a member in the form of a flat frame including an opening of a size that exposes the large diameter side 1*b* of the cone-shaped diaphragm 1, and the large diameter side 1*b* of the cone diaphragm 1 is connected to the housing 50 by the support frame 51 by attaching the cone support frame 9 connected with the large diameter side 1*b* of the cone diaphragm 1 to an opening periphery.

The support surface 52 is a part including a curved surface portion equal to the curves of the first curved vibration surface 21 and the second curved vibration surface 22 in the curved diaphragm 2 and is positioned on a back surface side of the curved diaphragm 2 without putting the curved surface portion in contact with a back surface of the curved diaphragm 2. This support surface 52 functions to assist the curved diaphragm 2 so as not to be deformed due to external force from a front surface side.

The fixation means 54 attaches the other end side 2*b* of the curved diaphragm 2 to one end side of the housing 50 and may be formed of, for example, a recessed groove 541 provided along the width direction and a fixation rod 542 arranged in this recessed groove 541. That is, the other end side 2*b* of the curved diaphragm 2 is held by inserting the other end side 2*b* of the curved diaphragm 2 into the recessed groove 541 and arranging the fixation rod 542 in this recessed groove 541.

The elastic support member 56 is a member that is flexible and elastic and that can support the curved diaphragm 2 so as to prevent the warpage and may be formed of, for example, a member in the form of cotton such as sponge and tangled threadlike fibers. That is, the elastic support member 56 is arranged to be put between a recessed surface side of a curved surface portion in the curved diaphragm 2 and the support surface 52 by connecting the one end side 2*a* of the curved diaphragm 2 to the blade piece 5 and connecting the other end side 2*b* of the same to the housing 50 by the fixation means 54.

In FIG. 10, there is illustrated that the elastic support member 56 is put entirely between the recessed surface side of the curved surface portion in the curved diaphragm 2 and the support surface 52.

This elastic support member may not be put entirely between the recessed surface side of the curved surface portion in the curved diaphragm 2 and the support surface 52 and may be put partially therebetween.

As a means to partially arrange the elastic support member, for example, a single elongated elastic support member extending along the curve direction of the support surface 52 may be arranged on the central portion of the support surface 52, or multiple elongated elastic support members may be arranged away from each other on the support surface 52. Additionally, elastic support members in the form of a small piece may be scattered and arranged on the support surface 52.

The side plates 58 are a pair of plate-shaped members that are arranged on two sides, respectively, so as to sandwich and store the support frame 51, the support surface 52, and the flexible elastic support member 56 arranged on this support surface 52 with the curved diaphragm 2 (the first curved vibration surface 21 and the second curved vibration surface 22) and are arranged such that, for example, a pair of plate-shaped members in a shape like a shape along an outer edge of a Japanese Katakana character, "fu", face each other.

In FIG. 11, the side plate on a front right side is indicated by a reference sign 58R, and the side plate on a front left side is indicated by a reference sign 58L.

Note that, a reference sign 91 illustrated in FIG. 11 is a screw that attaches and fixes the first speaker unit 10 (the cone support frame 9) to the support frame 51 of the housing 50.

Additionally, although it is not illustrated, a back plate portion of the housing 50 is provided with a hole to mount an audio jack and a switch.

Therefore, as illustrated in FIG. 11, the first speaker unit 10 first fixes the cone support frame 9 to the support frame 51 of the housing 50 by using the screws 91 . . . 91. Next, after the elastic support member 56 is arranged on the support surface 52 of the housing 50, and the other end side 2*b* of the curved diaphragm 2 is inserted into the recessed groove 541, the fixation rod 542 is additionally arranged for holding. Thus, the other end side 2*b* of the curved diaphragm 2 is attached to the housing 50 by the fixation means 54.

The speaker 100 formed as above makes up by the cone diaphragm 1 the reproduction bandwidth on the low frequency side that the speaker including the curved diaphragm cannot sound, while it is possible to reproduce sounds of a high frequency to a middle frequency of an increased resonance bandwidth in the first curved vibration surface 21 of a large curvature that is positioned on the one end side 2*a* of the curved diaphragm 2, and on the other hand it is possible to reproduce sounds of a middle frequency to a low frequency of a reduced resonance bandwidth in the second curved vibration surface 22 of a small curvature that is positioned on the other end side 2*b* of the curved diaphragm 2.

That is, this speaker 100 includes a dynamic-type first speaker including the cone diaphragm 1, a second speaker including the first curved vibration surface 21, and a third speaker including a second curved vibration surface 22 of a different resonance bandwidth from that of the first curved vibration surface 21. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

Note that, although a case where the thicknesses, the hardnesses, and the weights of the vibration surfaces are different is not exemplified in the above-described embodiment, the thicknesses, the hardnesses, and the weights may be appropriately adjusted by additionally affixing a sheet material or applying a coating agent on a surface of the sheet-shaped member used as the diaphragm, and a single diaphragm including multiple regions of different resonance characteristics thereon may be implemented.

That is, even if the curved diaphragm is a sheet-shaped member having flexibility that can form the curved vibration surface but it is impossible to process later to maintain a desired curvature, it is possible to implement a single diaphragm including multiple regions with different thicknesses, hardnesses, and weights by additionally affixing a sheet material or applying a paint on the vibration surfaces.

The region on which a sheet material is affixed and the region on which a coating agent is applied on the curved diaphragm are not particularly limited; however, for example, it is desirable that a boundary portion between one region and another region is provided to have a tapered shape in which the dimension in the width direction is reduced (narrowed) toward the other end side from the one end side of the diaphragm.

Figure 12:
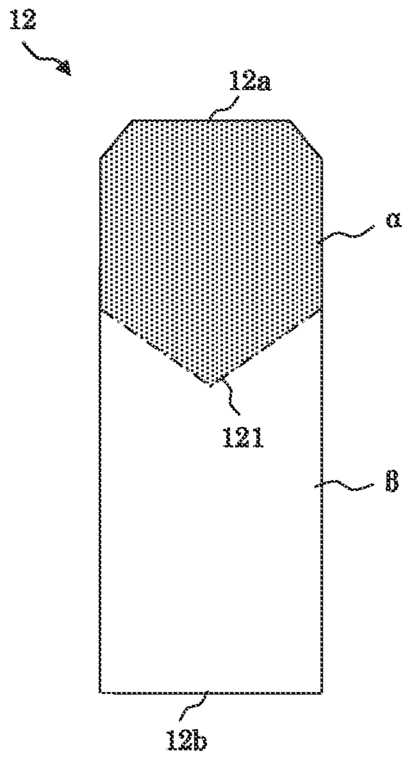
FIG. 12 is a front view describing another curved diaphragm used in the speaker unit according to the present invention.

To be specific, as illustrated in FIG. 12, it is favorable that a boundary 121 portion between one region α and another region β is provided to be in the form of a Roman character "V" in the middle of the length direction from one end side 12*a* to another end side 12*b* of a curved diaphragm 12.

When the boundary 121 portion between the one region α and the other region β is provided such that the shape is in the form of the Roman character "V" as above, the sounds reproduced from the two regions can be overlapped and blended in the boundary portion having the tapered shape.

In the curved diaphragm 12, for example, when the thickness of the region α as the first curved vibration surface is great (thick), and the thickness of the region β as the second curved vibration surface is small (thin), it is possible to reproduce the sound of a low resonance bandwidth from the first curved vibration surface (the region α) and to reproduce the sound of a high resonance bandwidth from the second curved vibration surface (the region β).

Additionally, in the curved diaphragm 12, when the hardness of the region α as the first curved vibration surface is great (hard), and the hardness of the region β as the second curved vibration surface is small (soft), it is possible to reproduce the sound of a high resonance bandwidth from the first curved vibration surface (the region α) and to reproduce the sound of a low resonance bandwidth from the second curved vibration surface (the region β).

Moreover, when the thickness of the vibration surface is increased by affixing a sheet material or applying a coating agent, the weight is naturally increased (becomes heavy). Therefore, in the curved diaphragm 12, when the weight of the region α as the first curved vibration surface is great, and the weight of the region β as the second curved vibration surface is small (light), it is possible to reproduce the sound of a low resonance bandwidth from the first curved vibration surface (the region α) and to reproduce the sound of a high resonance bandwidth from the second curved vibration surface (the region β).

In such a curved diaphragm 12, the curved surface is formed by connecting the one end side 12*a* to the driver unit 4 in a state of an upright flat plate and thereafter elastically bending and deforming the other end side 12*b*, and the other end side 12*b* is connected to the housing 50 such that the deformed curved projection surface side faces the front.

Note that, the curved diaphragm may be a member formed in advance so as to include multiple regions in which the thicknesses and the hardnesses of the vibration surfaces are changed in the middle of the length direction from the one end side to the other end side.

Therefore, in the present invention, in addition to the configuration in which the single diaphragm includes the multiple regions of different curvatures thereon, a configuration in which the single diaphragm includes the multiple regions of different thicknesses thereon, a configuration in which the single diaphragm includes the multiple regions of different hardnesses thereon, and a configuration in which the single diaphragm includes the multiple regions of different weights thereon are applied, and thus it is possible to provide a speaker unit including the curved diaphragm provided with the multiple vibration surfaces of different resonance bandwidths and a hybrid-type speaker system.

Additionally, in the present invention, it is also possible to provide the speaker unit that can reproduce the sounds of multiple bandwidths and the hybrid-type speaker system by another means other than the above-described configuration.

That is, although the above-described configuration is that the single curved diaphragm includes the multiple regions of different resonance characteristics thereon, a configuration in which separated multiple vibration surfaces of different resonance characteristics are provided may be applied.

Second Embodiment

For example, a speaker unit according to a second embodiment is characterized in that the speaker unit at least includes a first diaphragm in the form of a cone, a second diaphragm in the form of a sheet forming a curved vibration surface, a third diaphragm in the form of a sheet forming a curved vibration surface and having different resonance characteristics from the second diaphragm, and a driver unit that drives those first diaphragm, second diaphragm, and third diaphragm together, in which the second diaphragm and the third diaphragm are arranged adjacent in positions in which respective one end sides face each other on a large diameter side of the first diaphragm, and the driver unit is connected to a small diameter side of the first diaphragm and the one end side of the second diaphragm and the one end side of the third diaphragm.

That is, in the speaker unit according to the second embodiment, the second diaphragm and the third diaphragm can be, for example, different from each other in the dimension of the curved vibration surface in the length direction from the one end side to facing another end side along the curve direction of the diaphragm in the form of a sheet. In other words, it is a combination of two curved diaphragms in which the dimension of the one diaphragm in the length direction is great (long), and the length of the other diaphragm is small (short).

Note that, in each embodiment described below, a portion different from the above-described speaker unit 10 and speaker 100 is mainly described. Therefore, similar constituents are denoted by the same reference sign to omit the description and are assumed to be the same unless otherwise stated.

Figure 13:
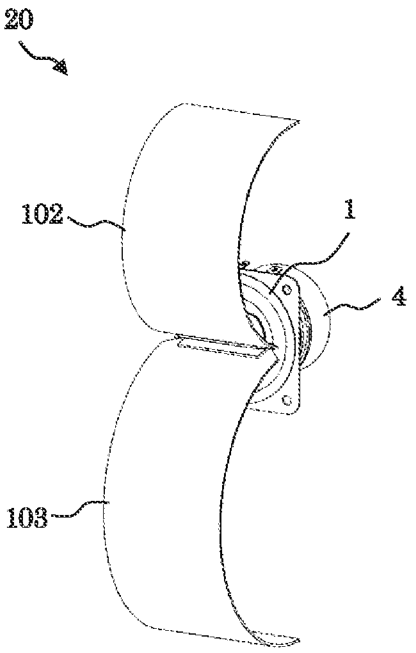
FIG. 13 is a front perspective view illustrating a second speaker unit according to the present invention.
Figure 14:
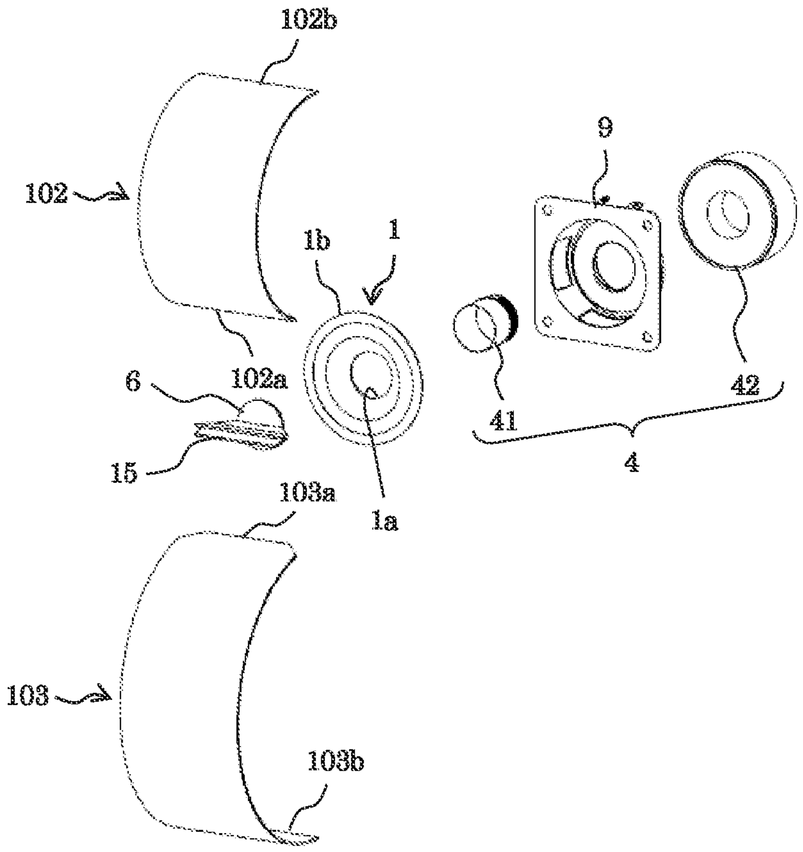
FIG. 14 is an exploded view describing a structure of the second speaker unit according to the present invention.

To be specific, as illustrated in FIGS. 13 and 14, a speaker unit 20 according to the second embodiment at least includes the first diaphragm (hereinafter, referred to as a "cone-shaped diaphragm") 1, a second diaphragm (hereinafter, referred to as a "first curved diaphragm") 102, a third diaphragm (hereinafter, referred to as a "second curved diaphragm") 103, the driver unit 4 that drives those cone-shaped diaphragm 1, first curved diaphragm 102, and second curved diaphragm 103 together, and a blade piece 15 in the form of a plate to which one end sides of the first curved diaphragm 102 and the second curved diaphragm 103 are both attached and that is connected to the driver unit 4.

The first curved diaphragm 102 is formed by using a sheet-shaped member having flexibility that can form a curved vibration surface, and one end side 102*a* is connected to the same driver unit 4 to which the small diameter side 1*a* of the cone-shaped diaphragm 1 is connected.

Additionally, as with the first curved diaphragm 102, the second curved diaphragm 103 is formed by using a sheet-shaped member having flexibility that can form the curved vibration surface, and one end side 103*a* is connected to the same driver unit 4 to which the small diameter side 1*a* of the cone-shaped diaphragm 1 is connected.

That is, the one end side 102*a* of the first curved diaphragm 102 and the one end side 103*a* of the second curved diaphragm 103 are both connected to the same driver unit 4 via the blade piece 15.

As a material of these first curved diaphragm 102 and second curved diaphragm 103, as with the curved diaphragm 2 in the above-described first embodiment, it is possible to use paper such as carbon paper, plastic having flexibility such as polyimide and polyester, a wood material such as balsa wood, and a metal such as aluminum, beryllium, and boron. Additionally, the above-described foamed sheet material may be applied.

The thicknesses of the first curved diaphragm 102 and the second curved diaphragm 103 are not particularly limited as long as it is possible to elastically bend and deform to form the curved projection surface. That is, any thickness may be applied to both the first curved diaphragm 102 and second curved diaphragm 103 as long as it allows for the formation of the curved surface by connecting the respective one end sides 102*a*, 103*a* to the driver unit 4 in a state of an upright flat plate and thereafter elastically bending and deforming the other end sides 102*b*, 103*b* in different directions, respectively, and allows for the connection of the other end sides 102*b*, 103*b* to a housing 150 described later such that the deformed curved projection surface side faces the front.

Additionally, both the first curved diaphragm 102 and second curved diaphragm 103 may be a member formed to include the curved vibration surface in advance, and in this case, after the respective one end sides 102*a*, 103*a* are connected to the driver unit 4, the other end sides 102*b*, 103*b* are each connected to the housing 150 described later such that the curved projection surface faces the front.

Moreover, as with the curved diaphragm 2 in the above-described first embodiment, as illustrated in FIG. 3, the first curved diaphragm 102 and the second curved diaphragm 103 have a shape in which the dimension in the width direction is gradually reduced (narrowed) toward the one end sides 102*a*, 103*a* both connected to the driver unit 4.

That is, the shapes of the one end sides 102*a*, 103*a* in the first curved diaphragm 102 and the second curved diaphragm 103 are substantially the same shapes conforming to the mortar shape of the cone-shaped diaphragm 1. Therefore, even when the one end sides 102*a*, 103*a* in the first curved diaphragm 102 and the second curved diaphragm 103 are each connected to the driver unit 4 to which the cone-shaped diaphragm 1 is connected, the cone-shaped diaphragm 1 and the first curved diaphragm 102 and the second curved diaphragm 103 are not put in contact and do not interfere with each other.

In the present embodiment, in the first curved diaphragm 102 and the second curved diaphragm 103, the dimensions of the curved vibration surfaces in the length direction from the one end sides 102*a*, 103*a* respectively toward the facing other end sides 102*b*, 103*b* along the curve directions are different from each other.

That is, in the first curved diaphragm 102 and the second curved diaphragm 103, elements such as the dimensions in the width direction orthogonal to the length direction and the thicknesses of the respective diaphragms may be the same, but at least it is required that the dimensions in the length direction are different from each other.

Note that, when the dimensions in the length direction are different from each other, the areas of the curved diaphragms are naturally different from each other, and when the material used for the curved diaphragms is the same, the weights are different from each other as well.

In FIGS. 13 and 14, there is illustrated the second speaker unit 20 that includes the two curved diaphragms in which the dimensions in the width direction and the thicknesses are the same, but the dimensions in the length direction are different from each other, which are a combination of the first curved diaphragm 102 of a small (short) dimension in the length direction and the second curved diaphragm 103 of a great (long) dimension in the length direction.

In this speaker unit 20, since the dimension of the first curved diaphragm 102 in the length direction is small (short), the area of the vibration surface is small, and on the other hand, since the dimension of the second curved diaphragm 3 in the length direction is great (long), the area of the vibration surface is great.

Additionally, when the first curved diaphragm 102 and the second curved diaphragm 103 are bent at the same angle, the curvatures are different from each other.

The driver unit 4 is an actuator that vibrates the cone diaphragm 1 and the blade piece 15 together according to the inputted (conducted) electric signal (sound signal).

Here, a direction in which the first curved diaphragm 102 is driven by the driver unit 4 means an expansion direction on a surface of the first curved diaphragm 102, that is, the curve direction in which the vibration surface is expanded from the one end side 102*a* toward the facing other end side 102*b* (or from the other end side 102*b* toward the facing one end side 102*a*) of the first curved diaphragm 102. Additionally, a direction in which the second curved diaphragm 103 is driven by the driver unit 4 means an expansion direction on a surface of the second curved diaphragm 103, that is, the curve direction in which the vibration surface is expanded from the one end side 103*a* toward the facing other end side 103*b* (or from the other end side 103*b* toward the facing one end side 103*a*) of the second curved diaphragm 103.

The blade piece 15 is used to efficiently connect the first curved diaphragm 102 and the second curved diaphragm 103 to the driver unit 4 and is attached to a tip of the voice coil 41 of the driver unit 4 so as to protrude from the small diameter side 1*a* to the large diameter side 1*b* of the cone-shaped diaphragm 1.

This blade piece 15 may be formed of a single flat piece entirely from a proximal side connected to the driver unit 4 to a distal side, and it is desirable to include two flat pieces that are gradually away from each other toward the distal side from the proximal side. That is, it is favorable that the proximal side connected to the driver unit 4 is an integral flat piece while the distal side diverges into two such that the respective first curved diaphragm 102 and second curved diaphragm 103 are attached thereto separately.

Additionally, in this blade piece 15, it is desirable that the proximal side is substantially perpendicular to the driver unit 4, and the blade piece 15 is curved or inclined toward the distal side according to the curvatures of the first curved diaphragm 102 and the second curved diaphragm 103, respectively.

That is, an operation to attach the first curved diaphragm 102 and the second curved diaphragm 103 to the blade piece 15 and an operation to form the curved vibration surface by elastically bending and deforming the first curved diaphragm 102 and the second curved diaphragm 103 are easily performed when the blade piece 15 is curved (inclined) according to the curvature of the curved diaphragm toward the distal side.

In addition, when the blade piece 15 is curved (inclined) toward the distal side, in the driving by the driver unit 4, it is possible to smoothly drive with no risk of applying stress to the first curved diaphragm 102 and the second curved diaphragm 103.

In the second speaker unit 20 in the present embodiment, when the one end side 102*a* of the first curved diaphragm 102 and the one end side 103*a* of the second curved diaphragm 103 are connected to the driver unit 4, the one end sides 102*a*, 103*a* are attached to the blade piece 15 integral with the center cap 6 attached to the tip of the voice coil 41. Thus, it is possible to connect the first curved diaphragm 102 and the second curved diaphragm 103 with the driver unit 4 (the voice coil 41).

That is, after an adhesive is applied to one surface side of the blade piece 15 or one surface side of the first curved diaphragm 102, one surface of the first one end side 102*a* of the curved diaphragm 102 is arranged so as to overlap on one surface of the blade piece 15 while an adhesive is applied to another surface side of the blade piece 15 or one surface side of the second curved diaphragm 103. Then, one surface of the one end side 103*a* of the second curved diaphragm 103 is arranged so as to overlap on another surface of the blade piece 15, and thus it is possible to implement the second speaker unit 20 as illustrated in FIG. 13.

Comparing with the conventional means in which a notch is provided at the tip of the voice coil 41, and the one end side 102*a* of the first curved diaphragm 102 and the one end side 103*a* of the second curved diaphragm 103 are inserted together into the notch, this means makes can reliably connect the first curved diaphragm 102 and the second curved diaphragm 103 and the driver unit 4 (the voice coil 41) together.

Figure 15:
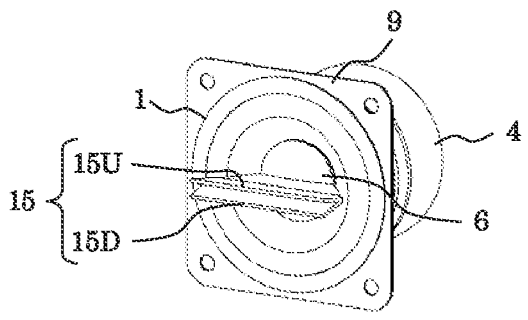
FIG. 15 is a front perspective view illustrating a state before the curved diaphragm is attached in the second speaker unit according to the present invention.

In FIG. 15, there is illustrated that the blade piece 15 is integral with the center cap 6, and toward the distal side, diverges into two including an upper piece 15U curved upward according to the curvature of the first curved diaphragm 102 and a lower piece 15D curved downward according to the curvature of the second curved diaphragm 103.

In the second speaker unit 20 formed as above, the small diameter side 1*a* of the cone diaphragm 1 and a one end side 102*a* end surface of the first curved diaphragm 102 and a one end side 103*a* end surface of the second curved diaphragm 103, which are attached via the blade piece 15, are all connected to the driver unit 4 (the voice coil 41). That is, the small diameter side 1*a* of the cone diaphragm 1 is directly connected to the driver unit 4 (the voice coil 41) while the one end side 102*a* of the first curved diaphragm 102 and the one end side 103*a* of the second curved diaphragm 103 are indirectly connected to the driver unit 4 (the voice coil 41) via the blade piece 15.

Therefore, with the application of the electric signal and the like to the driver unit 4, the voice coil 41 generates the vibration according to the applied signal, and the cone diaphragm 1 and the first curved diaphragm 102 and the second curved diaphragm 103 connected to this voice coil 41 can be driven together by transmitting the vibration thereto.

Specifically, the one end (the proximal portion) of the voice coil 41 is stored within the magnetic circuit (magnetic field) 42, and the other end (the distal portion) is connected to the first curved diaphragm 102 and the second curved diaphragm 103 via the cone diaphragm 1 and the blade piece 15. Therefore, the inputted electric signal moves the voice coil 41, and the movement is transmitted to the cone diaphragm 1 and the first curved diaphragm 102 and the second curved diaphragm 103 and converted into acoustic energy (sound).

In addition, since the dimensions of the first curved diaphragm 102 and the second curved diaphragm 103 in the length direction are different from each other, the resonance bandwidths reproduced by the respective curved diaphragms are different.

Additionally, in the second speaker unit 20 in the present embodiment, the small diameter side 1*a* of the cone diaphragm 1 and the one end side 102*a* of the first curved diaphragm 102 and the one end side 103*a* of the second curved diaphragm 103 are connected to the same driver unit 4. Therefore, the driver unit 4 that drives the cone diaphragm 1, the driver unit 4 that drives the first curved diaphragm 102, and the driver unit 4 that drives the second curved diaphragm 103 are efficiently shared, and thus the reduction in the manufacturing cost and the weight and the manufacturing into a small and compact form are implemented.

In addition, in the second speaker unit 20 in the present embodiment, it is possible to simply and reliably connect the first curved diaphragm 102 and the second curved diaphragm 103 with the driver unit 4 via the blade piece 15, and therefore the efficient manufacturing in mass quantities is possible.

Figure 16:
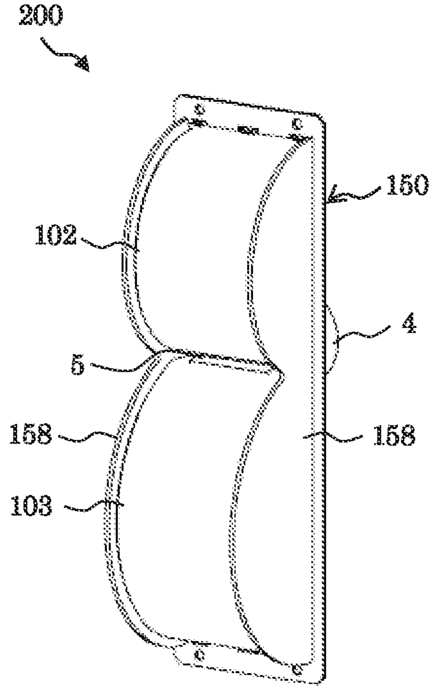
FIG. 16 is a front perspective view illustrating a second speaker in which the second speaker unit according to the present invention is mounted in a housing.
Figure 17:
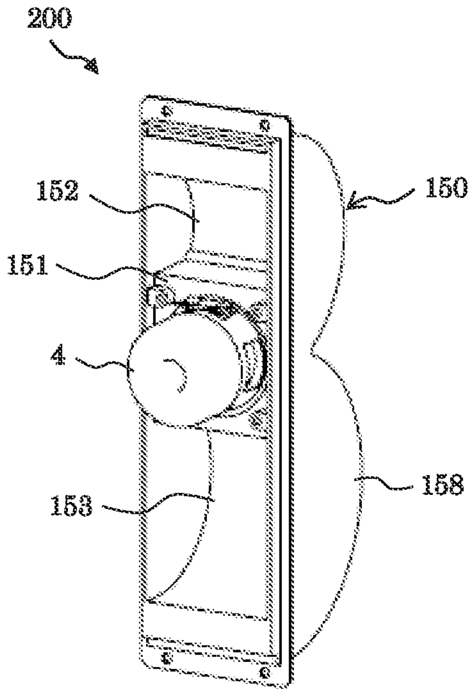
FIG. 17 is a back perspective view of the second speaker illustrated in FIG. 16.

Moreover, the second speaker unit 20 formed as above forms a speaker 200 illustrated in FIGS. 16 and 17 by fixing the large diameter side 1*b* of the cone diaphragm 1, the other end side 102*b* of the first curved diaphragm 102, and the other end side 103*b* of the second curved diaphragm 103 to the housing 150 together.

Figure 18:
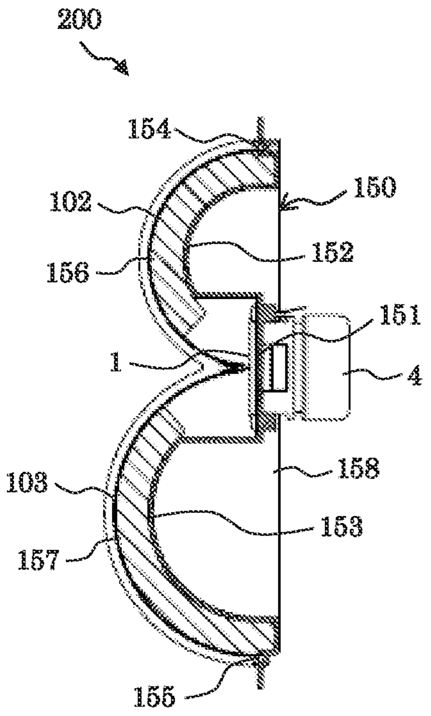
FIG. 18 is a front central longitudinal section of a portion of the second speaker illustrated in FIG. 16 except the driver unit.
Figure 19:
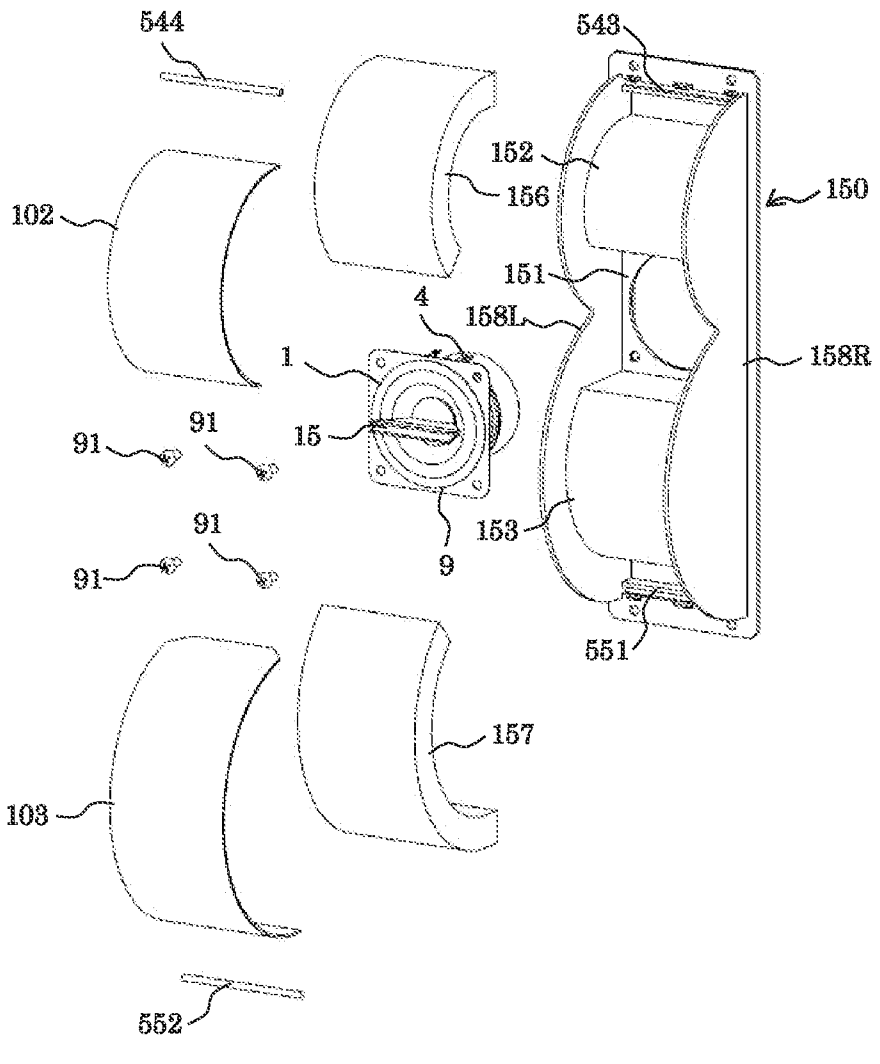
FIG. 19 is an exploded view describing a structure of the second speaker illustrated in FIG. 16.

As illustrated in FIGS. 18 and 19, the housing 150 includes a support frame 151, two support surfaces 152, 153 continuously provided on this support frame 151, a first fixation means 154 provided at a terminal portion of the one support surface 152, a second fixation means 155 provided at a terminal portion of the other support surface 153, flexible elastic support members 156, 157 arranged on the two support surfaces 152, 153, respectively, and a pair of side plates 158, 158.

The support frame 151 is a member in the form of a flat frame including an opening of a size that exposes the large diameter side 1*b* of the cone-shaped diaphragm 1. Regarding this support frame 151, the large diameter side 1*b* of the cone diaphragm 1 is connected to the housing 150 by the support frame 151 by attaching the cone support frame 9 connected with the large diameter side 1*b* of the cone diaphragm 1 to an opening periphery.

The support surface 152 is a part including a curved surface portion equal to the curve of the first curved diaphragm 102 and is positioned on a back surface side of the first curved diaphragm 102 without putting the curved surface portion in contact with a back surface of the first curved diaphragm 102. This support surface 152 functions to assist the first curved diaphragm 102 to prevent the deformation due to external force from a front surface side.

The support surface 153 is a part including a curved surface portion equal to the curve of the second curved diaphragm 103 and, as with the support surface 152, the support surface 153 is positioned on a back surface side of the second curved diaphragm 103 without putting the curved surface portion in contact with a back surface of the second curved diaphragm 103. This support surface 153 functions to assist the second curved diaphragm 103 to prevent the deformation due to external force from a front surface side. These support surface 152 and support surface 153 are continuously provided in different facing positions with the support frame 151 being arranged therebetween.

The first fixation means 154 attaches the other end side 102*b* of the first curved diaphragm 102 to one end side of the housing 150 and may be formed of, for example, a recessed groove 543 provided along the width direction and a fixation rod 544 arranged in this recessed groove 543. That is, the other end side 102*b* of the first curved diaphragm 102 is held by inserting the other end side 102*b* of the first curved diaphragm 102 into the recessed groove 543 and arranging the fixation rod 544 in this recessed groove 543.

The second fixation means 155 attaches the other end side 103*b* of the second curved diaphragm 103 to another end side of the housing 150 and may be formed of, for example, a recessed groove 551 and a fixation rod 552 as with the first fixation means 154. That is, the other end side 103*b* of the second curved diaphragm 103 is held by inserting the other end side 103*b* of the second curved diaphragm 103 into the recessed groove 551 and arranging the fixation rod 552 in this recessed groove 551.

Both the elastic support members 156, 157 are a member that is flexible and elastic and that can support the first curved diaphragm 102 and the second curved diaphragm 103 so as to prevent the warpage and may be formed of, for example, a member in the form of cotton such as sponge and tangled threadlike fibers. That is, the elastic support member 156 is arranged to be put between a recessed surface side of a curved surface portion in the first curved diaphragm 102 and the support surface 152 by connecting the one end side 102*a* of the first curved diaphragm 102 to the blade piece 15 and connecting the other end side 102*b* of the same to the housing 150 by the first fixation means 154. On the other hand, the elastic support member 157 is arranged to be put between a recessed surface side of a curved surface portion in the second curved diaphragm 103 and the support surface 153 by connecting the one end side 103*a* of the second curved diaphragm 103 to the blade piece 15 and connecting the other end side 103*b* of the same to the housing 150 by the second fixation means 155.

In FIG. 18, there are illustrated that the elastic support member 156 is put entirely between the recessed surface side of the curved surface portion in the first curved diaphragm 102 and the support surface 152, and the elastic support member 157 is put entirely between the recessed surface side of the curved surface portion in the second curved diaphragm 103 and the support surface 153.

Note that, as with the above-described first embodiment, this elastic support member may not be put entirely between the recessed surface side of each curved surface portion in the first curved diaphragm 102 and the second curved diaphragm 103 and each of the support surfaces 152, 153 and may be put partially therebetween.

The side plates 158 are a pair of plate-shaped members that are arranged on two sides, respectively, so as to sandwich and store the support frame 151, the two support surfaces 152, 153, and the flexible elastic support members 156, 157 arranged on these support surfaces 152, 153, respectively, with the first curved diaphragm 102 and the second curved diaphragm 103 and have, for example, a shape of mountains falling sideways in which large and small two mountains are adjacent like a shape along an outer edge of a Roman character "B".

In FIG. 19, the side plate on a front right side is indicated by a reference sign 158R, and the side plate on a front left side is indicated by a reference sign 158L.

Therefore, as illustrated in FIG. 19, the second speaker unit 20 first fixes the cone support frame 9 to the support frame 151 of the housing 150 by using the screws 91 . . . 91. Next, after the elastic support member 156 is arranged on the support surface 152 on an upper side of the housing 150, and the first curved diaphragm 102 is elastically bent upward at an angle of 180 degrees to insert the other end side 102*b* thereof into the recessed groove 543, the fixation rod 544 is additionally arranged for holding. Thus, the other end side 102*b* of the first curved diaphragm 102 is attached to the housing 150 by the first fixation means 154.

Additionally, after the elastic support member 157 is arranged on the support surface 153 on a lower side of the housing 150, and the second curved diaphragm 103 is elastically bent downward at an angle of 180 degrees to insert the other end side 103*b* thereof into the recessed groove 551, the fixation rod 552 is additionally arranged for holding. Thus, the other end side 103*b* of the second curved diaphragm 103 is attached to the housing 150 by the second fixation means 155.

In FIG. 18, there are illustrated that the other end side 102*b* of the first curved diaphragm 102 is attached on an upper end side of the housing 150, and the other end side 103*b* of the second curved diaphragm 103 is attached on a lower end side of the housing 150. Additionally, the curvatures of the vibration surfaces of the first curved diaphragm 102 and the second curved diaphragm 103 are different from each other.

The speaker 200 formed as above makes up by the cone diaphragm 1 the reproduction bandwidth on the low frequency side that the speaker including the curved diaphragm cannot sound. Additionally, the speaker 200 can reproduce sounds of a high frequency to a middle frequency of an increased resonance bandwidth in the first curved diaphragm 102 with the curved vibration surface of a small (short) dimension in the length direction and can reproduce sounds of a middle frequency to a low frequency of a reduced resonance bandwidth in the second curved diaphragm 103 with the curved vibration surface of a great (long) dimension in the length direction.

That is, this speaker 200 includes a dynamic-type first speaker including the cone diaphragm 1, a second speaker including the first curved diaphragm 102, and a third speaker including the second curved diaphragm 103 of a different resonance bandwidth from that of the first curved diaphragm 102. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

Third Embodiment

Figure 20:
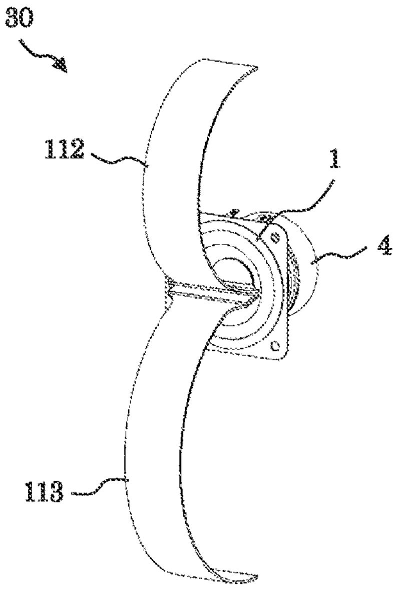
FIG. 20 is a front perspective view illustrating a third speaker unit according to the present invention.
Figure 21:
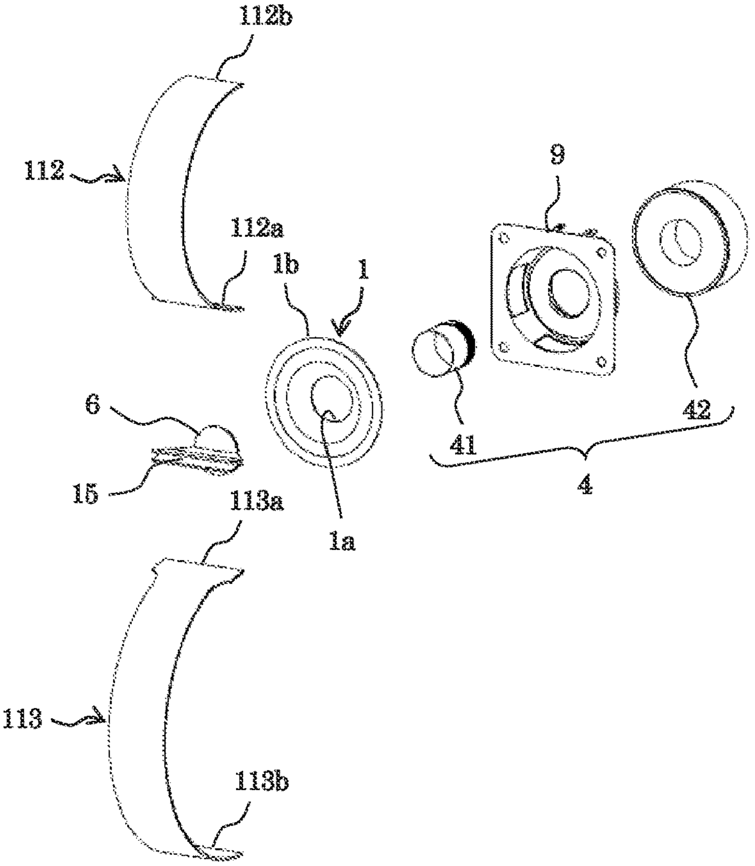
FIG. 21 is an exploded view describing a structure of the third speaker unit according to the present invention.

Next, as illustrated in FIGS. 20 and 21, a speaker unit 30 according to a third embodiment at least includes the cone-shaped diaphragm 1, a first curved diaphragm 112, a second curved diaphragm 113 of different resonance characteristics from that of the first curved diaphragm 112, the driver unit 4 that drives those cone-shaped diaphragm 1, first curved diaphragm 112, and second curved diaphragm 113 together, and the blade piece 15 in the form of a plate to which one end sides of the first curved diaphragm 112 and the second curved diaphragm 113 are both attached and that is connected to the driver unit 4.

In the present embodiment, in the first curved diaphragm 112 and the second curved diaphragm 113, the dimensions in the length direction are different from each other while the dimensions in the width direction orthogonal to the length direction are the same, and the first curved diaphragm 112 and the second curved diaphragm 113 are adjusted to be small (narrow) so as to conform to the weight of the driver unit 4.

That is, as with the first curved diaphragm 102 and the second curved diaphragm 103 in the above-described second speaker unit 20, in the first curved diaphragm 112 and the second curved diaphragm 113, the dimensions of the curved vibration surfaces in the length direction from respective one end sides 112*a*, 113*a* toward respective facing other end sides 112*b*, 113*b* along the curve directions are different from each other. Additionally, the first curved diaphragm 112 and the second curved diaphragm 113 are different in that the respective dimensions in the width direction are smaller (narrower) than that of the first curved diaphragm 102 and the second curved diaphragm 103 in the above-described second speaker unit 20.

Here, the dimensions of the first curved diaphragm 112 and the second curved diaphragm 113 in the width direction are adjusted such that the weight of the voice coil 41 and the weights of the curved diaphragms 112, 113 are close to each other.

Note that, in the first curved diaphragm 112 and the second curved diaphragm 113, since the dimensions in the length direction are different from each other, the areas of the curved diaphragms are naturally different from each other, and when the material used for the curved diaphragms is the same, the weights are different from each other as well.

Additionally, as with the first curved diaphragm 102 and the second curved diaphragm 103 in the above-described second speaker unit 20, both the first curved diaphragm 112 and second curved diaphragm 113 are formed by using a sheet-shaped member having flexibility that can form the curved vibration surface. Therefore, in both the first curved diaphragm 112 and second curved diaphragm 113, the one end sides 112*a*, 113*a* are connected via the blade piece 15 to the same driver unit 4 to which the small diameter side 1*a* of the cone-shaped diaphragm 1 is connected.

These first curved diaphragm 112 and second curved diaphragm 113 both can use the same material as that of the first curved diaphragm 102 and the second curved diaphragm 103 in the second speaker unit 20.

Additionally, both the first curved diaphragm 112 and second curved diaphragm 113 have a shape in which the dimension in the width direction is gradually reduced (narrowed) toward the one end sides 112*a*, 113*a* connected to the driver unit 4.

Figure 22:
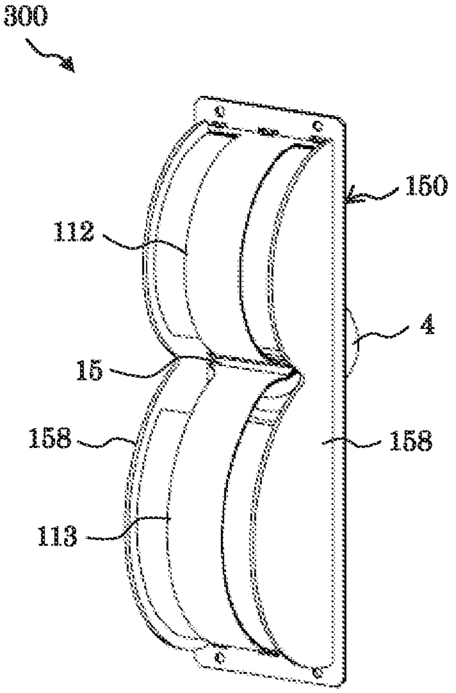
FIG. 22 is a front perspective view illustrating a third speaker in which the third speaker unit according to the present invention is mounted in the housing.
Figure 23:
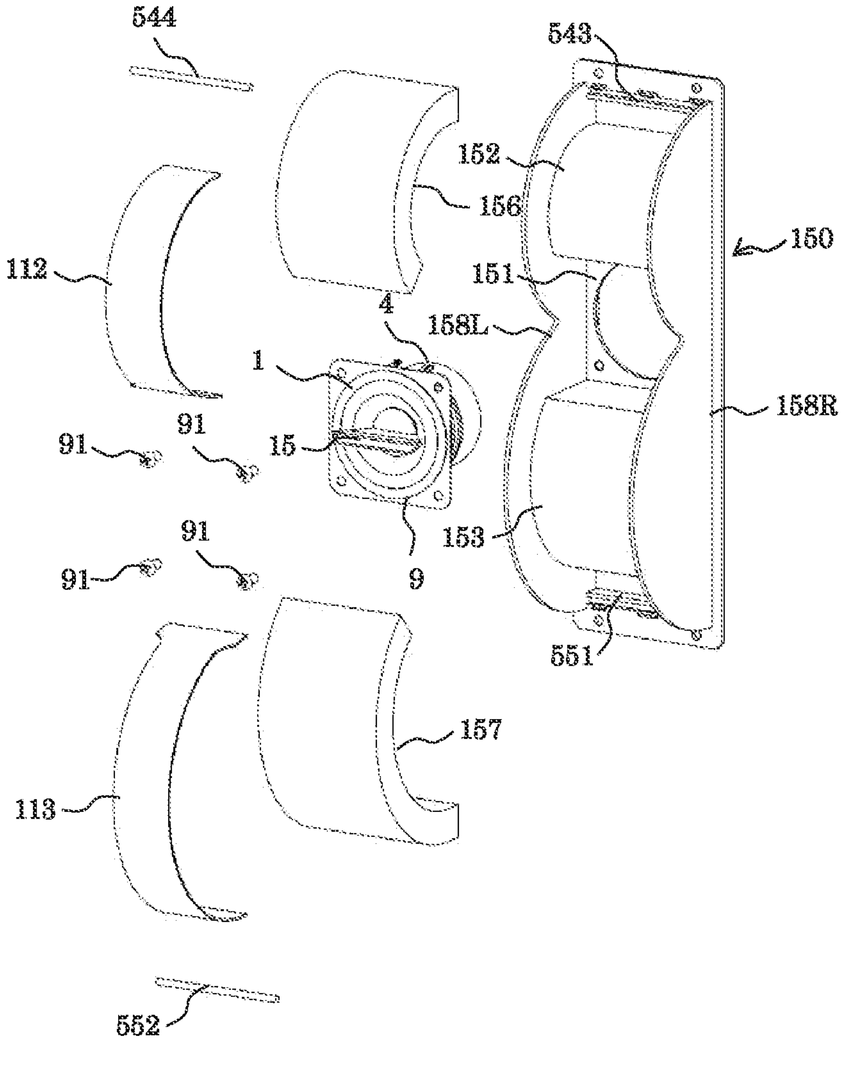
FIG. 23 is an exploded view describing a structure of the third speaker illustrated in FIG. 22.

Moreover, as with the second speaker unit 20 according to the second embodiment, the third speaker unit 30 formed as above forms a speaker 300 illustrated in FIGS. 22 and 23 by fixing the large diameter side 1*b* of the cone diaphragm 1 and the other end side 112*b* of the first curved diaphragm 112 and the other end side 113*b* of the second curved diaphragm 113 to the housing 150 together.

That is, as illustrated in FIG. 23, the third speaker unit 30 first fixes the cone support frame 9 to the support frame 151 of the housing 150 by using the screws 91 . . . 91. Next, after the elastic support member 156 is arranged on the support surface 152 on the upper side of the housing 150, and the first curved diaphragm 112 is elastically bent upward at an angle of 180 degrees to insert the other end side 112*b* thereof into the recessed groove 543, the fixation rod 544 is additionally arranged for holding. Thus, the other end side 112*b* of the first curved diaphragm 112 is attached to the housing 150 by the first fixation means 154.

Additionally, after the elastic support member 157 is arranged on the support surface 153 on the lower side of the housing 150, and the second curved diaphragm 113 is elastically bent downward at an angle of 180 degrees to insert the other end side 113*b* thereof into the recessed groove 551, the fixation rod 542 is additionally arranged for holding. Thus, the other end side 113*b* of the second curved diaphragm 113 is attached to the housing 150 by the second fixation means 155.

In FIG. 22, there is illustrated the speaker 300 in which the third speaker unit 30 including the two curved diaphragms in which the dimensions in the length direction are at least different from each other is mounted on the housing 150, in which the two curved diaphragms are a combination of the first curved diaphragm 112 of a small (short) dimension in the length direction and the second curved diaphragm 113 of a great (long) dimension in the length direction and have the dimensions in the width direction that are the same to each other while smaller (narrower) than the dimension in the width direction of the housing 150 for the mounting.

Additionally, in FIG. 22, there are illustrated that the other end side 112*b* of the first curved diaphragm 112 is attached on the upper end side of the housing 150, and the other end side 113*b* of the second curved diaphragm 113 is attached on the lower end side of the housing 150. Moreover, the curvatures of the vibration surfaces of the first curved diaphragm 112 and the second curved diaphragm 113 are different from each other.

The speaker 300 formed as above makes up by the cone diaphragm 1 the reproduction bandwidth on the low frequency side that the speaker including the curved diaphragm cannot sound, and it is possible to reproduce sounds of a high frequency to a middle frequency of an increased resonance bandwidth in the first curved diaphragm 112 with the curved vibration surface of a small (short) dimension in the length direction and to reproduce sounds of a middle frequency to a low frequency of a reduced resonance bandwidth in the second curved diaphragm 113 with the curved vibration surface of a great (long) dimension in the length direction.

That is, the speaker 300 includes a dynamic-type first speaker including the cone diaphragm 1, a second speaker including the first curved diaphragm 112, and a third speaker including the second curved diaphragm 113 of a different resonance bandwidth from that of the first curved diaphragm 112. Therefore, when the electric signal is inputted to the driver unit 4, a wide (expanded) reproduction frequency bandwidth is obtained in the curved diaphragm, and it is possible to improve the sound quality.

In addition, since the first curved diaphragm 112 and the second curved diaphragm 113 in the speaker 300 are made lighter in weight by reducing (narrowing) the dimension in the width direction and adjusting the weight to be close to the weight of the driver unit 4, the sound pressure obtained in the curved diaphragm is high.

Fourth Embodiment

Figure 24:
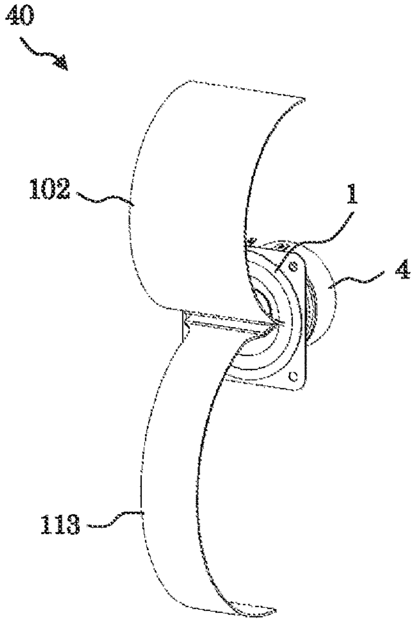
FIG. 24 is a front perspective view illustrating a fourth speaker unit according to the present invention.
Figure 25:
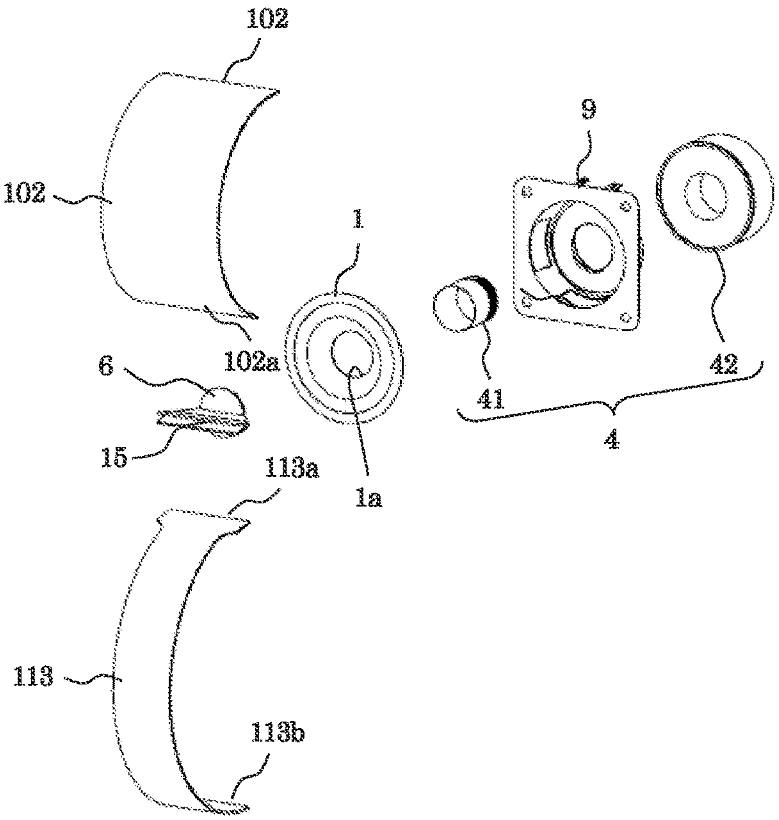
FIG. 25 is an exploded view describing a structure of the fourth speaker unit according to the present invention.

Next, as illustrated in FIGS. 24 and 25, a speaker unit 40 according to a fourth embodiment at least includes the cone-shaped diaphragm 1, the first curved diaphragm 102, the second curved diaphragm 113 of different resonance characteristics from that of the first curved diaphragm 102, the driver unit 4 that drives those cone-shaped diaphragm 1, first curved diaphragm 102, and second curved diaphragm 113 together, and the blade piece 15 in the form of a plate to which the one end sides of the first curved diaphragm 102 and the second curved diaphragm 113 are both attached and that is connected to the driver unit 4.

In the present embodiment, in the first curved diaphragm 102 and the second curved diaphragm 113, the dimensions in the length direction are different from each other while the dimensions in the width direction orthogonal to the length direction are different as well, and only the dimension of the second curved diaphragm 113 in the width direction is adjusted to be small (narrow) so as to conform to the weight of the driver unit 4.

That is, in the first curved diaphragm 102 and the second curved diaphragm 113, the dimensions of the curved vibration surfaces in the length direction are different from each other as with that of the first curved diaphragm 102 and the second curved diaphragm 103 in the above-described second speaker unit 20; however, it is different in that the dimension of the first curved diaphragm 102 in the width direction is the same as the first curved diaphragm 102 in the above-described second speaker unit 20, and the dimension of the second curved diaphragm 113 in the width direction is smaller (narrower) than that of the second curved diaphragm 103 in the above-described second speaker unit 20 as with the second curved diaphragm 113 in the above-described third speaker unit 30.

In other words, this fourth speaker unit 40 can be said that it includes a combination of the first curved diaphragm 102 in the second speaker unit 20 and the second curved diaphragm 113 in the third speaker unit 30.

Note that, when both the dimensions in the length direction and dimensions in the width direction are different, the areas of the curved diaphragms are naturally different from each other, and when the material used for the curved diaphragms is the same, the weights are different from each other as well.

Figure 26:
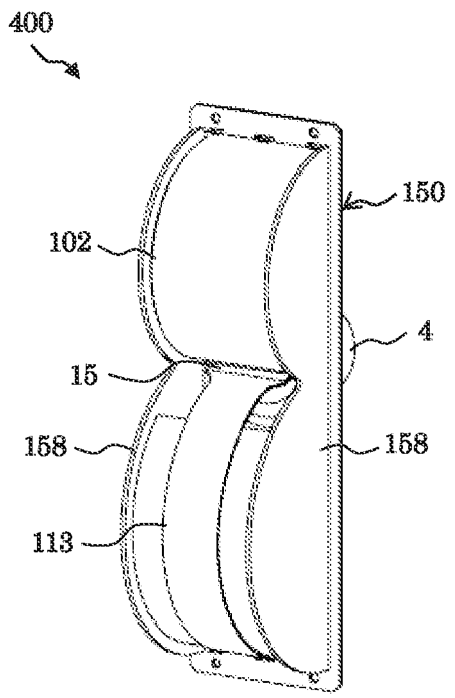
FIG. 26 is a front perspective view illustrating a fourth speaker in which the fourth speaker unit according to the present invention is mounted in the housing.
Figure 27:
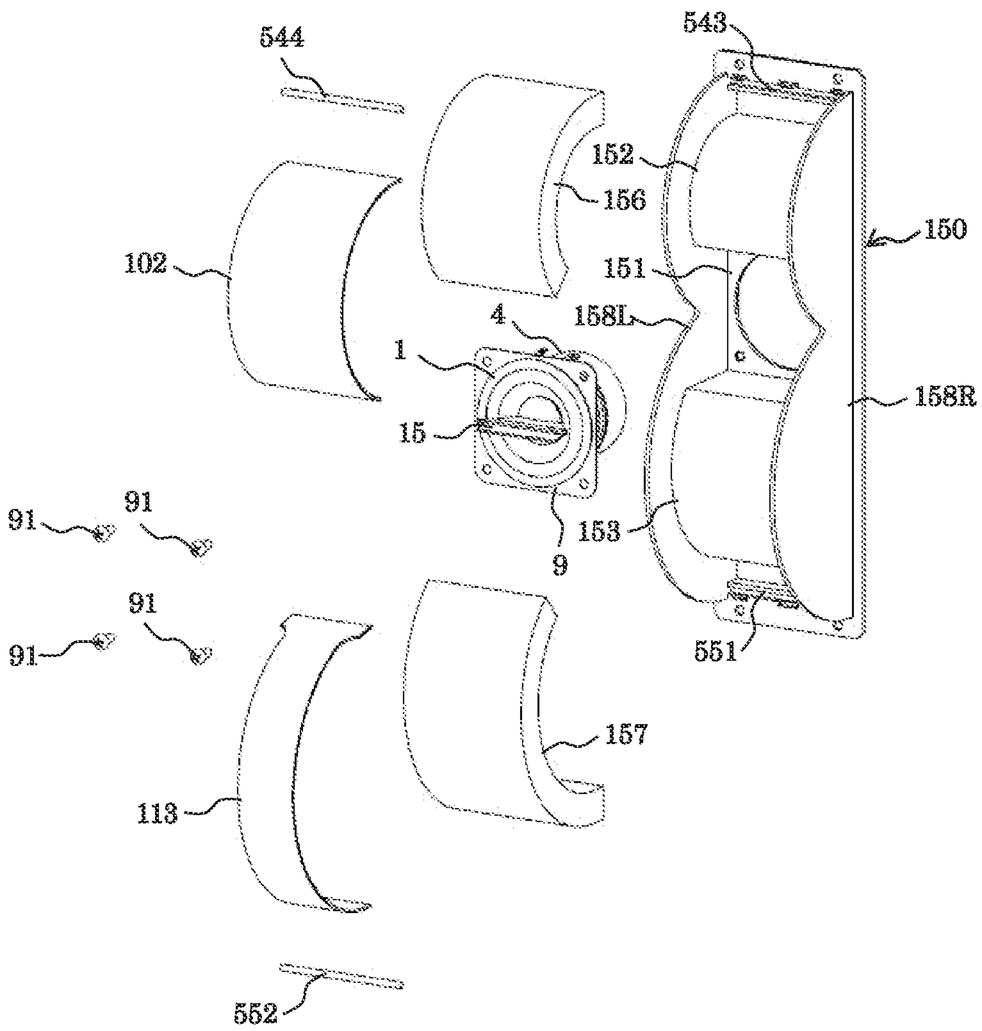
FIG. 27 is an exploded view describing a structure of the fourth speaker illustrated in FIG. 26.

Additionally, as with the second speaker unit 20 according to the second embodiment and the third speaker unit 30 according to the third embodiment, the fourth speaker unit 40 formed as above forms a speaker 400 illustrated in FIGS. 26 and 27 by fixing the large diameter side 1*b* of the cone diaphragm 1 and the other end side 102*b* of the first curved diaphragm 102 and the other end side 113*b* of the second curved diaphragm 113 to the housing 150 together.

In FIG. 24, there is illustrated the fourth speaker unit 40 that includes the two curved diaphragms in which the dimensions in the length direction and the dimensions in the width direction are different from each other, which are a combination of the first curved diaphragm 102, which has the dimension in the width direction equal to the dimension in the width direction of the housing 150 for the mounting and has a small (short) dimension in the length direction, and the second curved diaphragm 113, which has the dimension in the width direction smaller (narrower) than the dimension in the width direction of the housing 150 for the mounting and has a great (long) dimension in the length direction.

That is, as illustrated in FIG. 27, the fourth speaker unit 40 first fixes the cone support frame 9 to the support frame 151 of the housing 150 by using the screws 91 . . . 91. Next, after the elastic support member 156 is arranged on the support surface 152 on the upper side of the housing 150, and the first curved diaphragm 102 is elastically bent upward at an angle of 180 degrees to insert the other end side 102*b* thereof into the recessed groove 543, the fixation rod 544 is additionally arranged for holding. Thus, the other end side 102*b* of the first curved diaphragm 102 is attached to the housing 150 by the first fixation means 154.

Additionally, after the elastic support member 157 is arranged on the support surface 153 on the lower side of the housing 150, and the second curved diaphragm 113 is elastically bent downward at an angle of 180 degrees to insert the other end side 113*b* thereof into the recessed groove 551, the fixation rod 552 is additionally arranged for holding. Thus, the other end side 113*b* of the second curved diaphragm 113 is attached to the housing 150 by the second fixation means 155.

Moreover, in FIG. 26, there are illustrated that the other end side 102*b* of the first curved diaphragm 102 is attached on the upper end side of the housing 150, and the other end side 113*b* of the second curved diaphragm 113 is attached on the lower end side of the housing 150.

Furthermore, the curvatures of the vibration surfaces of the first curved diaphragm 102 and the second curved diaphragm 113 are different from each other.

The speaker 400 formed as above makes up by the cone diaphragm 1 the reproduction bandwidth on the low frequency side that the speaker including the curved diaphragm cannot sound. Additionally, the speaker 400 can reproduce sounds of a middle frequency to a low frequency of a reduced resonance bandwidth in the first curved diaphragm 102 with the curved vibration surface of a small (short) dimension in the length direction and a great (wide) dimension in the width direction and can reproduce sounds of a high frequency to a middle frequency of an increased resonance bandwidth in the second curved diaphragm 113 with the curved vibration surface of a great (long) dimension in the length direction and a small (narrow) dimension in the width direction.

That is, the speaker 400 includes a dynamic-type first speaker including the cone diaphragm 1, a second speaker including the first curved diaphragm 102, and a third speaker including the second curved diaphragm 113 of a different resonance bandwidth from that of the first curved diaphragm 102. Therefore, when the electric signal is inputted to the driver unit 4, a wide (expanded) reproduction frequency bandwidth is obtained in the curved diaphragm, and it is possible to improve the sound quality.

In addition, in the speaker 400, since only the second curved diaphragm 113 is made lighter in weight by reducing (narrowing) the dimension in the width direction and adjusting the weight to be close to the weight of the driver unit 4, the sound pressure obtained in the second curved diaphragm 113 is high, and the sound pressure balance of the resonance bandwidth with the first curved diaphragm 102 to be combined is adjusted.

Fifth Embodiment

Figure 28:
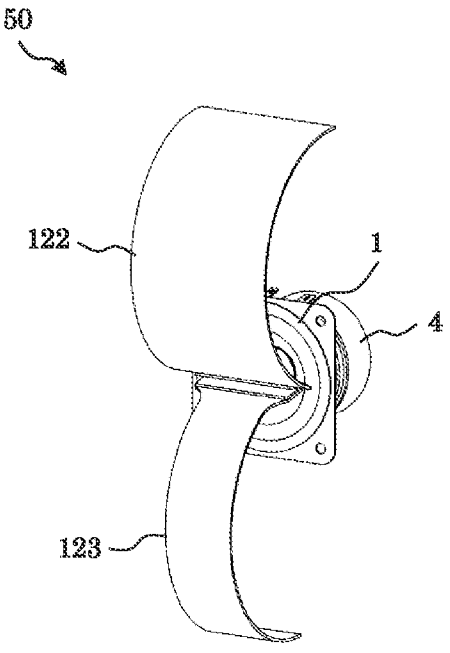
FIG. 28 is a front perspective view illustrating a fifth speaker unit according to the present invention.
Figure 29:
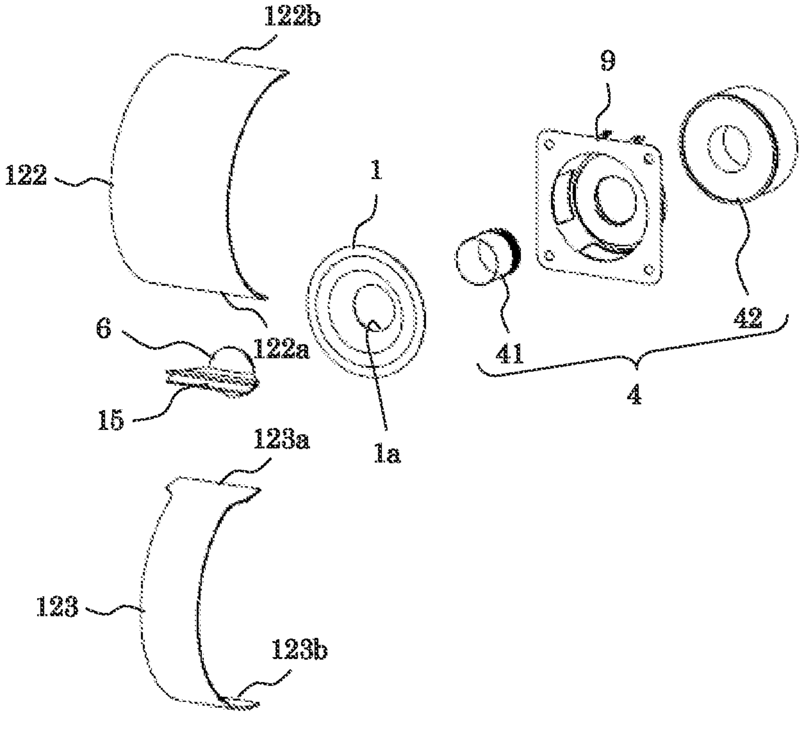
FIG. 29 is an exploded view describing a structure of the fifth speaker unit according to the present invention.

Next, as illustrated in FIGS. 28 and 29, a speaker unit 50 according to a fifth embodiment at least includes the cone-shaped diaphragm 1, a first curved diaphragm 122, a second curved diaphragm 123 of different resonance characteristics from that of the first curved diaphragm 122, the driver unit 4 that drives those cone-shaped diaphragm 1, first curved diaphragm 122, and second curved diaphragm 123 together, and the blade piece 15 in the form of a plate to which one end sides of the first curved diaphragm 122 and the second curved diaphragm 123 are both attached and that is connected to the driver unit 4.

In the present embodiment, in the first curved diaphragm 122 and the second curved diaphragm 123, the dimensions in the length direction are the same to each other, but only the dimension in the width direction orthogonal to the length direction is adjusted in only the second curved diaphragm 123 to be small (narrow) so as to conform to the weight of the driver unit 4.

That is, in the first curved diaphragm 122 and the second curved diaphragm 123, it is different in that the dimensions of the curved vibration surfaces in the length direction are the same to each other, the dimension of the first curved diaphragm 122 in the width direction is the same as that of the first curved diaphragm 102 in the above-described second speaker unit 20, and the dimension of the second curved diaphragm 123 in the width direction is smaller (narrower) than that of the second curved diaphragm 103 in the above-described second speaker unit 20 as with the second curved diaphragm 113 in the above-described third speaker unit 30.

That is, in the first curved diaphragm 122 and the second curved diaphragm 123, the elements such as the dimensions in the length direction and the thicknesses of the respective diaphragms may be the same, but at least the dimensions in the width direction are required to be different from each other. Note that, when the dimensions in the width direction are different from each other, the areas of the curved diaphragms are naturally different from each other, and when the material used for the curved diaphragms is the same, the weights are different from each other as well.

Figure 30:
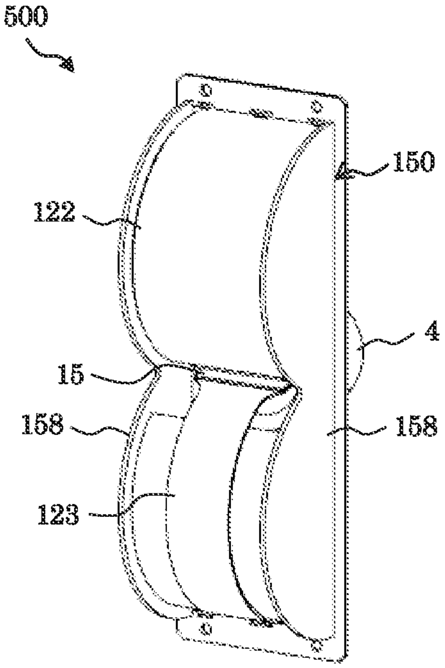
FIG. 30 is a front perspective view illustrating a fifth speaker in which the fifth speaker unit according to the present invention is mounted in the housing.
Figure 31:
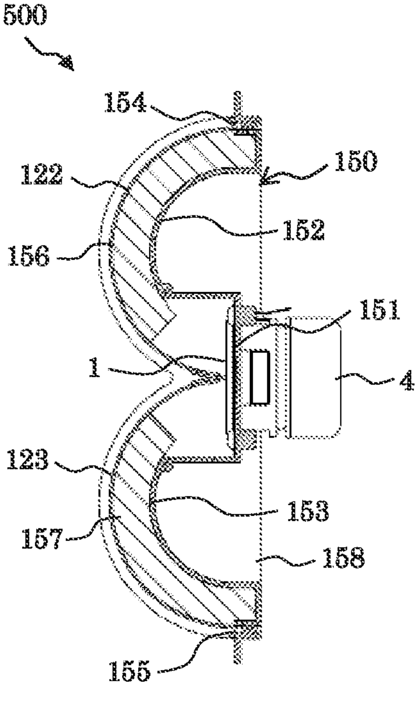
FIG. 31 is a front central longitudinal section of a portion of the fifth speaker illustrated in FIG. 30 except the driver unit.
Figure 32:
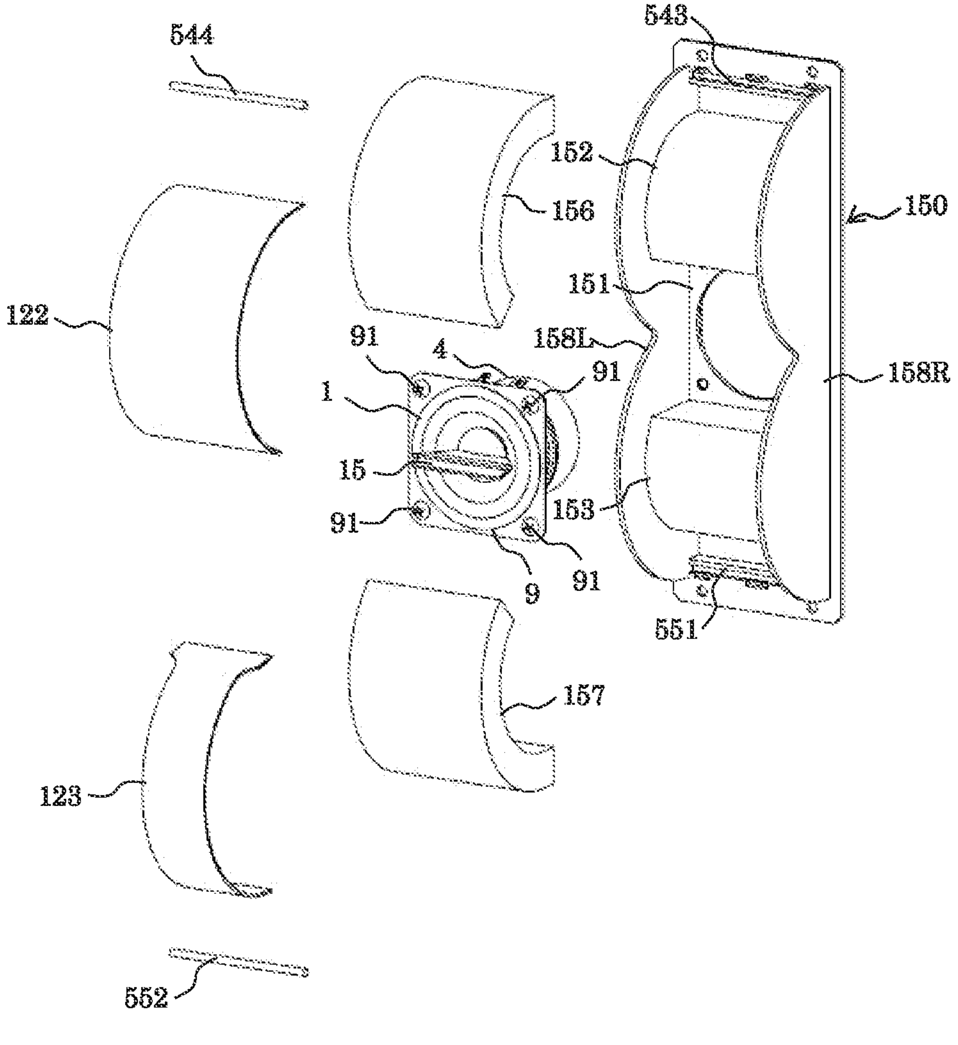
FIG. 32 is an exploded view describing a structure of the fifth speaker illustrated in FIG. 30.

Additionally, as with the second speaker unit 20 according to the second embodiment and the third speaker unit 30 according to the third embodiment, the fifth speaker unit 50 formed as above forms a speaker 500 illustrated in FIGS. 30 to 32 by fixing the large diameter side 1*b* of the cone diaphragm 1 and another end side 122*b* of the first curved diaphragm 122 and another end side 123*b* of the second curved diaphragm 123 to the housing 150 together.

In FIG. 28, there is illustrated the fifth speaker unit 50 that includes the two curved diaphragms in which the dimensions in the length direction are the same and the dimensions in the width direction are different from each other, which are a combination of the first curved diaphragm 122, which has the dimension in the width direction equal to the dimension in the width direction of the housing 150 for the mounting and has the dimension in the length direction the same to the other, and the second curved diaphragm 123, which has the dimension in the width direction smaller (narrower) than the dimension in the width direction of the housing 150 for the mounting and has the dimension in the length direction the same to the other.

That is, as illustrated in FIG. 32, the fifth speaker unit 50 first fixes the cone support frame 9 to the support frame 151 of the housing 150 by using the screws 91 . . . 91. Next, after the elastic support member 156 is arranged on the support surface 152 on the upper side of the housing 150, and the first curved diaphragm 122 is elastically bent upward at an angle of 180 degrees to insert the other end side 122*b* thereof into the recessed groove 543, the fixation rod 544 is additionally arranged for holding. Thus, the other end side 122*b* of the first curved diaphragm 122 is attached to the housing 150 by the first fixation means 154.

Additionally, after the elastic support member 157 is arranged on the support surface 153 on the lower side of the housing 150, and the second curved diaphragm 123 is elastically bent downward at an angle of 180 degrees to insert the other end side 123*b* thereof into the recessed groove 551, the fixation rod 552 is additionally arranged for holding. Thus, the other end side 123*b* of the second curved diaphragm 123 is attached to the housing 150 by the second fixation means 155.

In FIGS. 30 and 31, there are illustrated that the other end side 122*b* of the first curved diaphragm 122 is attached on the upper end side of the housing 150, and the other end side 123*b* of the second curved diaphragm 123 is attached on the lower end side of the housing 150.

Moreover, the curvatures of the vibration surfaces of the first curved diaphragm 122 and the second curved diaphragm 123 are equal to each other.

The speaker 500 formed as above also makes up by the cone diaphragm 1 the reproduction bandwidth on the low frequency side that the speaker including the curved diaphragm cannot sound. Additionally, the speaker 500 can reproduce sounds of a middle frequency to a low frequency of a reduced resonance bandwidth in the first curved diaphragm 122 with the curved vibration surface of a great (wide) dimension in the width direction and can reproduce sounds of a high frequency to a middle frequency of an increased resonance bandwidth in the second curved diaphragm 123 with the curved vibration surface of a small (narrow) dimension in the width direction.

That is, the speaker 500 includes a dynamic-type first speaker including the cone diaphragm 1, a second speaker including the first curved diaphragm 122, and a third speaker including the second curved diaphragm 123 of a different resonance bandwidth from that of the first curved diaphragm 122. Therefore, when the electric signal is inputted to the driver unit 4, a wide (expanded) reproduction frequency bandwidth is obtained in the curved diaphragm, and it is possible to improve the sound quality.

In addition, in the speaker 500, since only the second curved diaphragm 123 is made lighter in weight by reducing (narrowing) the dimension in the width direction and adjusting the weight to be close to the weight of the driver unit 4, the sound pressure obtained in the second curved diaphragm 123 is high, and the sound pressure balance of the resonance bandwidth with the first curved diaphragm 102 to be combined is adjusted.

As above, in those second to fifth speakers 200, 300, 400, and 500, the sound from the dynamic-type first speaker including the cone-shaped diaphragm and the sounds from the second speaker and the third speaker including the curved diaphragm are mixed, and thus it is possible to reproduce the sound of a wider bandwidth (sound waves for hearing-impaired people and hearing people).

Additionally, since the driver unit that drives the cone-shaped diaphragm and the driver unit that drives the curved diaphragm are common in the second to fifth speakers 200, 300, 400, and 500, the manufacturing cost and the weight are reduced. Moreover, the integrally and continuously provided first speaker and second speaker and third speaker allow for a less disposing area and a compact form.

Note that, in the above-described second to fifth embodiments, a case where the curvatures of the vibration surfaces are different in the curved diaphragms in which the dimensions such as the lengths and the widths are the same is not exemplified; however, as long as the material used as the curved diaphragms and the thickness thereof are the same, it is possible to reproduce the sound of a reduced resonance bandwidth by reducing the curvature of the vibration surface of the one curved diaphragm and to reproduce the sound of an increased resonance bandwidth by increasing the curvature of the vibration surface of the other curved diaphragm.

Additionally, in the above-described second to fifth embodiments, a case where the thicknesses and the hardnesses of the vibration surfaces are different is not exemplified; however, it is possible to change the thicknesses and the hardnesses as needed not only by changing the material used as the curved diaphragms but also by affixing a sheet material and applying a paint on a surface of the same material.

As a result, it is possible to reproduce the sound of a reduced resonance bandwidth by increasing the thickness of the one curved diaphragm and to reproduce the sound of an increased resonance bandwidth by reducing the thickness of the other curved diaphragm. Additionally, it is possible to reproduce the sound of a reduced resonance bandwidth by making the one curved diaphragm soft and to reproduce the sound of an increased resonance bandwidth by making the other curved diaphragm hard.

Sixth Embodiment

Additionally, in the present invention, a configuration in which separated multiple vibration surfaces of different resonance characteristics are provided in a single curved diaphragm may be applied.

For example, a speaker unit according to a sixth embodiment is characterized in that the speaker unit at least includes a first diaphragm in the form of a cone, a second diaphragm in the form of a sheet forming a curved vibration surface, and a driver unit that drives the first diaphragm and the second diaphragm together, in which the driver unit is connected to a small diameter side of the first diaphragm and one end side of the second diaphragm, and the second diaphragm is divided to include two vibration surfaces of different resonance characteristics by including a notch along the curve direction.

That is, in the speaker unit according to the sixth embodiment, in the second diaphragm, since the notch is provided along the curve direction so as to divide from an end edge on another end side to the vicinity of the one end side, the two vibration surfaces are formed so as to be integrally connected on the one end side while the end edge on the other end side is split off.

Figure 33:
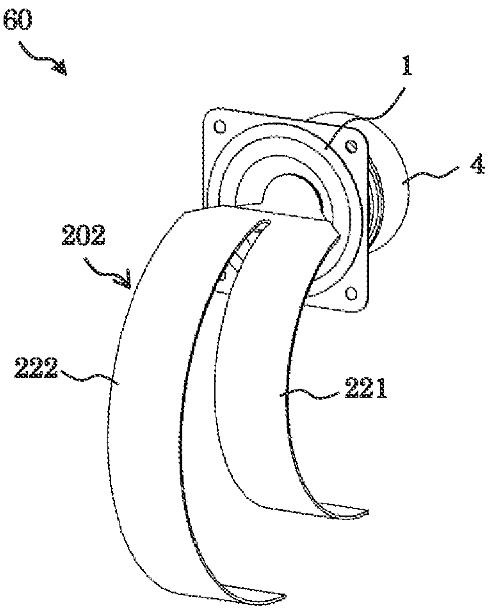
FIG. 33 is a front perspective view illustrating a sixth speaker unit according to the present invention.
Figure 34:
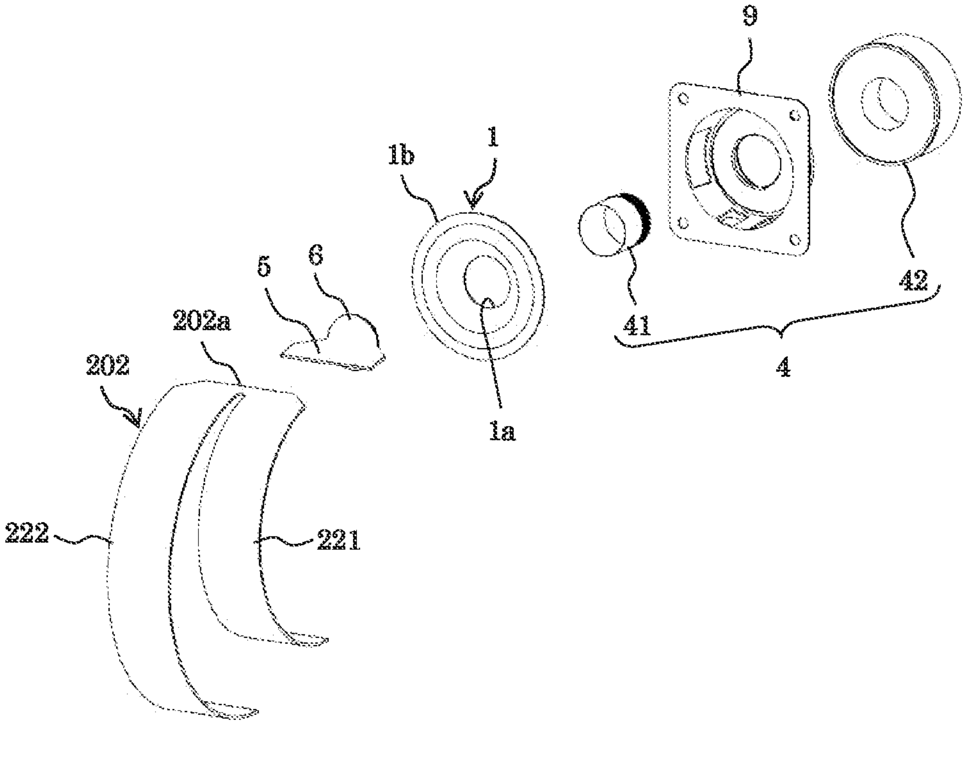
FIG. 34 is an exploded view describing a structure of the sixth speaker unit according to the present invention.

To be specific, as illustrated in FIGS. 33 and 34, a speaker unit 60 according to the sixth embodiment at least includes the first diaphragm 1 in the form of a cone (hereinafter, referred to as a "cone-shaped diaphragm"), a second diaphragm 202 in the form of a curved sheet (hereinafter, referred to as a "curved diaphragm"), the driver unit 4 that drives those cone-shaped diaphragm 1 and curved diaphragm 202 together, and the blade piece 5 in the form of a plate to which one end side of the curved diaphragm 202 is attached and that is connected to the driver unit 4.

The curved diaphragm 202 is formed by using a sheet-shaped member having flexibility that can form the curved vibration surface, and one end side 202*a* is connected to the same driver unit 4 to which the small diameter side 1*a* of the cone-shaped diaphragm 1 is connected.

Figure 35:
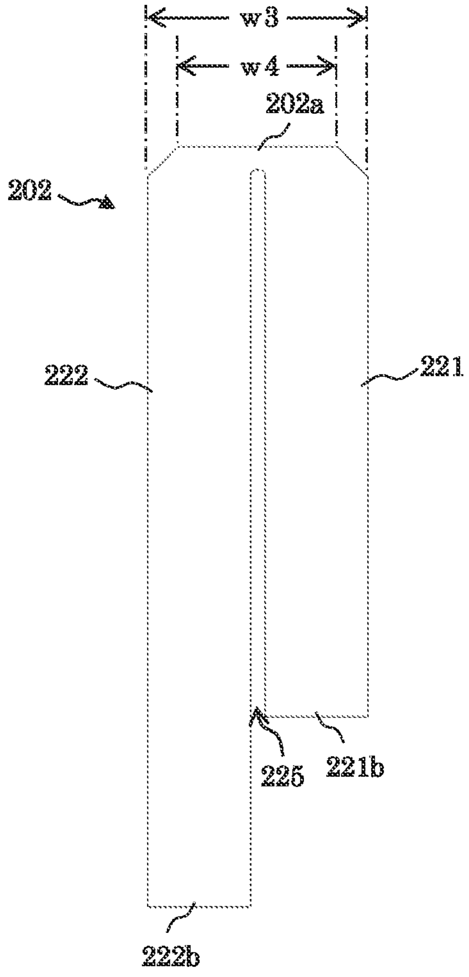
FIG. 35 is a front view describing a curved diaphragm used in the sixth speaker unit according to the present invention.

In the present embodiment, as illustrated in FIG. 35, the curved diaphragm 202 includes a notch 225 along the length direction in the center in the width direction. That is, the curved diaphragm 202 is partially divided to include the two vibration surfaces by providing the notch 225, and one vibration surface (hereinafter, referred to as a "first curved vibration surface") 221 and another vibration surface (hereinafter, referred to as a "second curved vibration surface") 222 are formed to be adjacent with the notch 225 as a boundary.

Note that, this notch 225 has a width dimension that allows for the arrangement of a partition plate 259 provided to a housing 250 described later.

In these two vibration surfaces, respective one end sides are common as the one end side 202*a* of the curved diaphragm 202; however, another end side 221*b* of the first curved vibration surface 221 and another end side 222*b* of the second curved vibration surface 222 are severally separated.

Additionally, in the curved diaphragm 202, the respective dimensions of the first curved vibration surface 221 and the second curved vibration surface 222 in the length direction are different from each other. Here, the length of the curved vibration surface means the dimension from the one end side 202*a* of the curved diaphragm 2 to the other end sides 221*b*, 222*b* of the respective curved vibration surfaces facing along the curve direction.

That is, in the first curved vibration surface 221 and the second curved vibration surface 222, the elements such as the dimensions in the width direction orthogonal to the length direction and the thicknesses of the respective vibration surfaces may be the same, but at least the dimensions in the length direction are required to be different from each other. Note that, when the dimensions of the two vibration surfaces in the length direction are different from each other, the areas of the curved vibration surfaces are naturally different from each other, and the weights are different from each other as well. Thus, the resonance characteristics of the two vibration surfaces are different.

Moreover, as illustrated in FIG. 35, the curved diaphragm 202 has a shape in which the dimension in the width direction is gradually reduced (narrowed) toward the one end side 202*a* connected to the driver unit 4.

Here, the width direction means a direction orthogonal to the length direction of the curved vibration surface from the one end side 202*a* to the facing other end sides 221*b*, 222*b* along the curve direction, and the dimension in the width direction means a distance (a length) between edge portions on two sides along the length direction as the curved diaphragm 202.

In FIG. 35, there is illustrated that the shape of the curved diaphragm 202 in the width direction is gradually reduced (narrowed) toward the one end side 202*a* from the other end sides 221*b*, 222*b*, and a dimension w4 in the width direction of the one end side 202*a* is smaller than a dimension w3 in the width direction close to the other end (w3>w4).

Therefore, the shape of the one end side 202*a* in the curved diaphragm 202 is substantially the same shape conforming to the mortar shape of the cone-shaped diaphragm 1, and even when the one end side 202*a* of the curved diaphragm 202 is connected to the driver unit 4 to which the cone-shaped diaphragm 1 is connected, the cone-shaped diaphragm 1 and the curved diaphragm 202 are not put in contact and do not interfere with each other.

As a material of this curved diaphragm 202, as with the curved diaphragm 2 in the above-described first embodiment, it is possible to use paper such as carbon paper, plastic having flexibility such as polyimide and polyester, a wood material such as balsa wood, and a metal such as aluminum, beryllium, and boron. Additionally, the above-described foamed sheet material may be applied.

The thicknesses of the curved diaphragm 202 are not particularly limited as long as it is possible to elastically bend and deform to form the curved projection surface. That is, any thickness may be applied to the curved diaphragm 202 as long as it allows for the formation of the curved surface by connecting each one end side 202*a* to the driver unit 4 in a state of an upright flat plate and thereafter elastically bending and deforming the other end sides 221*b*, 222*b*, and allows for the connection of the other end sides 221*b*, 222*b* to the housing 250 described later such that the deformed curved projection surface side faces the front.

Additionally, the curved diaphragm 202 may be a member formed to include the curved vibration surface in advance, and in this case, after each one end side 202*a* is connected to the driver unit 4, the other end sides 221*b*, 222*b* are each connected to the housing 250 described later such that the curved projection surface faces the front.

In FIGS. 33 and 34, there is illustrated the sixth speaker unit 60 that includes the curved diaphragm 202 including the two curved vibration surfaces respectively forming the curved surface portions in the same direction in which the respective dimensions in the width direction and the thicknesses are the same but the dimensions in the length direction are different from each other.

That is, the sixth speaker unit 60 includes the curved diaphragm 202, which is a combination of the first curved vibration surface 221 of a small (short) dimension in the length direction and the second curved vibration surface 222 of a great (long) dimension in the length direction.

In this speaker unit 60, since the dimension of the first curved vibration surface 221 in the length direction is small, the area is small, and on the other hand, since the dimension of the second curved vibration surface 222 in the length direction is great, the area is great, and not only the dimensions in the length direction and the areas are different from each other but also the curvatures of the vibration surfaces are different from each other when the first curved vibration surface 221 and the second curved vibration surface 222 are bent at the same angle.

The driver unit 4 is an actuator that vibrates the cone diaphragm 1 and the blade piece 5 together according to an inputted (conducted) electric signal (sound signal).

Here, a direction in which the curved diaphragm 202 (the first curved vibration surface 221 and the second curved vibration surface 222) is driven by the driver unit 4 means an expansion direction on a surface of the curved diaphragm 202, that is, the curve direction in which the vibration surfaces are expanded from the one end side 202*a* of the curved diaphragm 202 toward the facing other end side 221*b* in the first curved vibration surface 221 and the facing other end side 222*b* in the second curved vibration surface 222.

In the sixth speaker unit 60 in the present embodiment, when the one end side 202*a* of the curved diaphragm 202 is connected to the driver unit 4, it is possible to connect the curved diaphragm 202 with the driver unit 4 (the voice coil 41) by attaching the one end side 202*a* of the curved diaphragm 202 to the blade piece 5 integral with the center cap 6 attached to the tip of the voice coil 41.

Therefore, with the application of the electric signal and the like to the driver unit 4, the voice coil 41 generates the vibration according to the applied signal, and the cone diaphragm 1 and the curved diaphragm 202 (the first curved vibration surface 221 and the second curved vibration surface 222) connected to this voice coil 41 can be driven together by transmitting the vibration thereto.

Specifically, the one end (the proximal portion) of the voice coil 41 is stored within the magnetic circuit (magnetic field) 42, and the other end (the distal portion) is connected to the curved diaphragm 202 via the cone diaphragm 1 and the blade piece 5; therefore, the inputted electric signal moves the voice coil 41, and the movement is transmitted to the cone diaphragm 1 and the first curved vibration surface 221 and the second curved vibration surface 222 in the curved diaphragm 202 and converted into acoustic energy (sound).

In addition, since the dimensions of the first curved vibration surface 221 and the second curved vibration surface 222 in the length direction are different from each other, the resonance bandwidths reproduced by the respective curved vibration surfaces are different.

Figure 36:
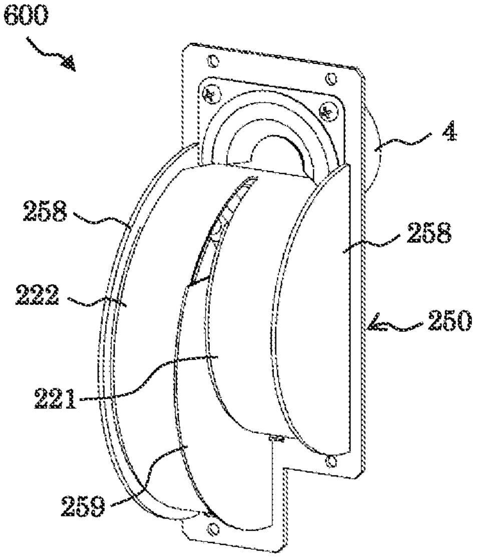
FIG. 36 is a front perspective view illustrating a sixth speaker in which the sixth speaker unit according to the present invention is mounted in a housing.
Figure 37:
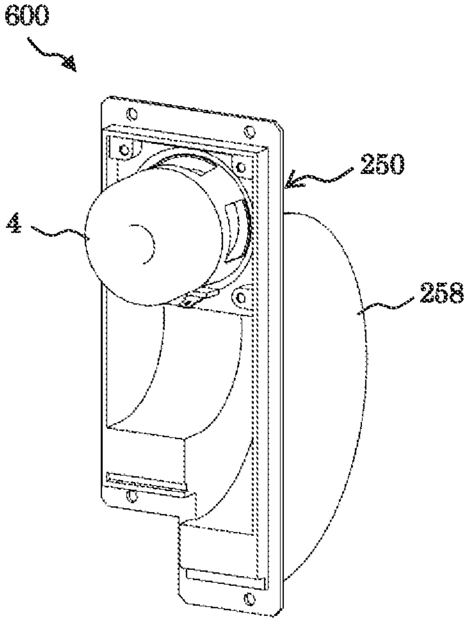
FIG. 37 is a back perspective view of the sixth speaker illustrated in FIG. 36.

Additionally, the sixth speaker unit 60 formed as above forms a sixth speaker 600 illustrated in FIGS. 36 and 37 by fixing the large diameter side 1*b* of the cone diaphragm 1 and the other end side 221*b* of the first curved vibration surface 221 and the other end side 222*b* of the second curved vibration surface 222 in the curved diaphragm 202 to the housing 250 together.

Figure 38:
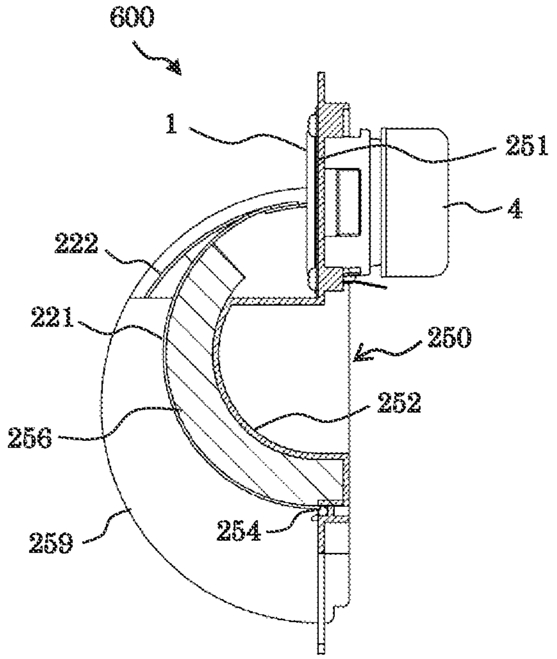
FIG. 38 is a front central right longitudinal section of a portion of the sixth speaker illustrated in FIG. 36 except the driver unit.
Figure 39:
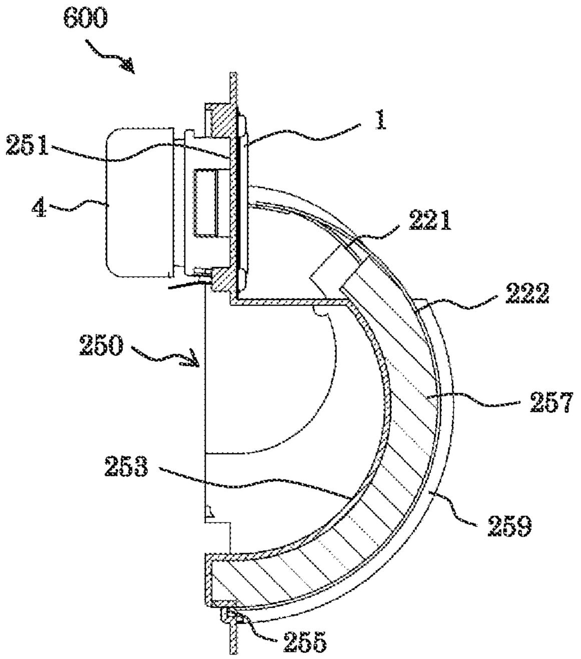
FIG. 39 is a front central left longitudinal section of the portion of the sixth speaker illustrated in FIG. 36 except the driver unit.
Figure 40:
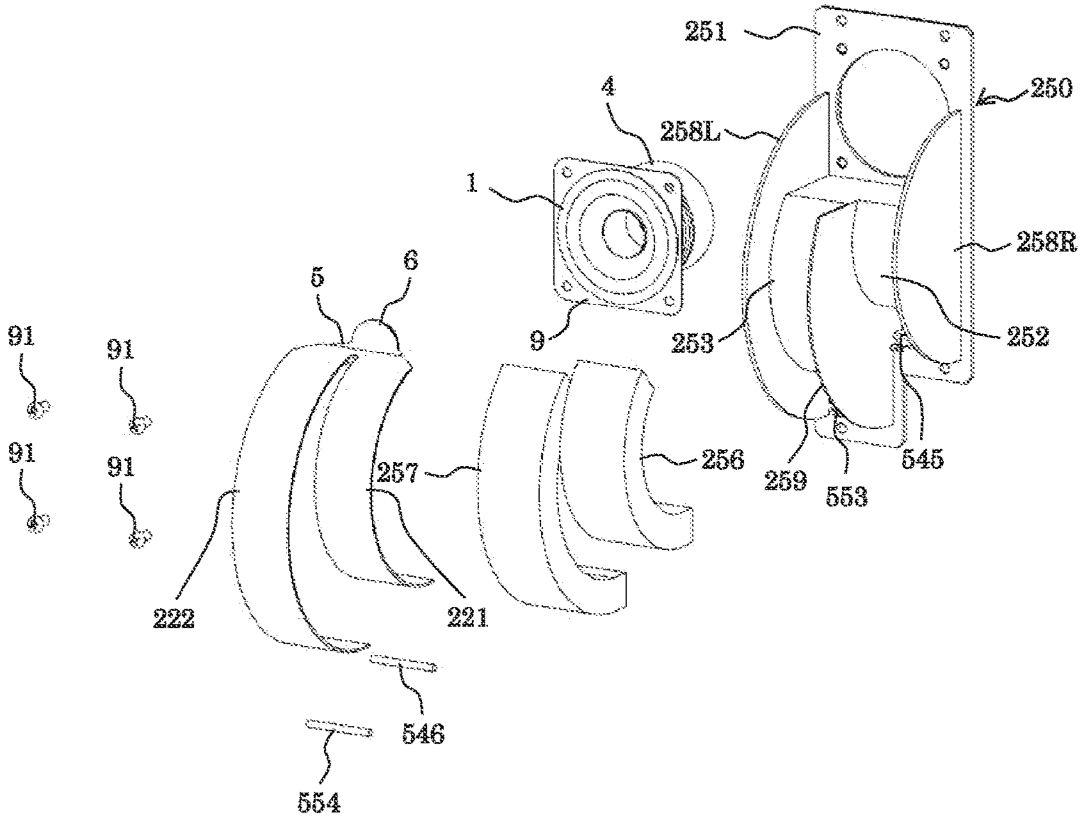
FIG. 40 is an exploded view describing a structure of the sixth speaker illustrated in FIG. 36.

As illustrated in FIGS. 38 to 40, the housing 250 includes a support frame 251, adjacent two support surfaces 252, 253 continuously provided on this support frame 251, a first fixation means 254 provided at a terminal portion of the one support surface 252 and a second fixation means 255 provided at a terminal portion of the other support surface 253, flexible elastic support members 256, 257 arranged on the two support surfaces 252, 253, respectively, and two side plates 258, 258.

The support frame 251 is a member in the form of a flat frame including an opening of a size that exposes the large diameter side 1*b* of the cone-shaped diaphragm 1, and the large diameter side 1*b* of the cone diaphragm 1 is connected to the housing 250 by the support frame 251 by attaching the cone support frame 9 connected with the large diameter side 1*b* of the cone diaphragm 1 to an opening periphery.

The support surface 252 is a part including a curved surface portion equal to the curve of the first curved vibration surface 221 in the curved diaphragm 202 and is positioned on a back surface side of the first curved vibration surface 221 without putting the curved surface portion in contact with a back surface of the first curved vibration surface 221. This support surface 252 functions to assist the first curved vibration surface 221 to prevent the deformation due to external force from a front surface side.

The support surface 253 is a part including a curved surface portion equal to the curve of the second curved vibration surface 222 in the curved diaphragm 202 and, as with the support surface 252, the support surface 253 is positioned on a back surface side of the second curved vibration surface 222 without putting the curved surface portion in contact with a back surface of the second curved vibration surface 222. This support surface 253 functions to assist the second curved vibration surface 222 to prevent the deformation due to external force from a front surface side.

Additionally, the support surface 252 and support surface 253 are formed in adjacent positions, respectively, with the partition plate 259 being arranged therebetween.

The first fixation means 254 attaches the other end side 221*b* of the first curved vibration surface 221 in the curved diaphragm 202 to one end side of the housing 250 and may be formed of, for example, a recessed groove 545 provided along the width direction and a fixation rod 546 arranged in this recessed groove 545. That is, the other end side 221*b* of the first curved vibration surface 221 is held by inserting the other end side 221*b* of the first curved vibration surface 221 into the recessed groove 545 and arranging the fixation rod 546 in this recessed groove 545.

The second fixation means 255 attaches the other end side 222*b* of the second curved vibration surface 222 in the curved diaphragm 202 to another end side of the housing 250 and may be formed of, for example, a recessed groove 553 and a fixation rod 554 as with the first fixation means 254.

That is, the other end side 222*b* of the second curved vibration surface 222 is held by inserting the other end side 222*b* of the second curved vibration surface 222 into the recessed groove 553 and arranging the fixation rod 554 in this recessed groove 553.

Both the elastic support members 256, 257 are a member that is flexible and elastic and that can support the first curved vibration surface 221 and the second curved vibration surface 222 so as to prevent the warpage and may be formed of, for example, a member in the form of cotton such as sponge and tangled threadlike fibers.

That is, the elastic support member 256 is arranged to be put between a recessed surface side in the first curved vibration surface 221 and the support surface 252 by connecting the one end side 202*a* of the curved diaphragm 202 to the blade piece 5 and connecting the other end side 221*b* of the first curved vibration surface 221 in the curved diaphragm 202 to the first fixation unit 254. On the other hand, the elastic support member 257 is arranged to be put between a recessed surface side in the second curved vibration surface 222 and the support surface 253 by connecting the one end side 202*a* of the curved diaphragm 202 to the blade piece 5 and connecting the other end side 222*b* of the second curved vibration surface 222 in the curved diaphragm 202 to the second fixation means 255.

In FIG. 38, there is illustrated that the elastic support member 256 is arranged entirely between the recessed surface side of the curved surface portion in the first curved vibration surface 221 and the support surface 252, and in FIG. 39, there is illustrated that the elastic support member 257 is arranged entirely between the recessed surface side of the curved surface portion in the second curved vibration surface 222 and the support surface 253.

Note that, as with the above-described first embodiment, this elastic support member may not be put entirely between each recessed surface side of the first curved vibration surface 221 and the second curved vibration surface 222 and the respective support surfaces 252, 253 and may be put partially therebetween.

The side plates 258 are a pair of plate-shaped members that are arranged on two sides, respectively, so as to sandwich and store the support frame 251, the two support surfaces 252, 253, the flexible elastic support members 256, 257 arranged on these support surfaces 252, 253, respectively, and the partition plate 259 with the first curved diaphragm 202 (the first curved vibration surface 221 and the second curved vibration surface 222) and are arranged such that, for example, a great plate-shaped member and a small plate-shaped member in a shape of mountain like the shape along an outer edge of the Roman character "D" face each other.

In FIG. 40, the side plate on a front right side is indicated by a reference sign 258R, and the side plate on a front left side is indicated by a reference sign 258L.

Therefore, as illustrated in FIG. 40, the sixth speaker unit 60 first fixes the cone support frame 9 to the support frame 251 of the housing 250 by using the screws 91 . . . 91. Next, after the elastic support member 256 is arranged on the support surface 252 on a right side of the housing 250, and the first curved vibration surface 221 in the curved diaphragm 202 is elastically bent downward at an angle of 180 degrees to insert the other end side 221*b* thereof into the recessed groove 545, the fixation rod 546 is additionally arranged for holding. Thus, the other end side 221*b* of the first curved vibration surface 221 is attached to the housing 250 by the first fixation means 254.

Additionally, after the elastic support member 257 is arranged on the support surface 253 on a left side of the housing 250, and the second curved vibration surface 222 in the curved diaphragm 202 is elastically bent downward at an angle of 180 degrees to insert the other end side 222*b* into the recessed groove 553, the fixation rod 554 is additionally arranged for holding. Thus, the other end side 222*b* of the second curved vibration surface 222 is attached to the housing 250 by the second fixation means 255.

As a result, the other end side 221*b* of the first curved vibration surface 221 is attached to a right lower end of the housing 250, and the other end side 222*b* of the second curved vibration surface 222 is attached to a left lower end of the housing 250; thus, the two vibration surfaces (the curved surface portions) are curved in the same direction and adjacent to each other.

In this case, since the first curved vibration surface 221 and the second curved vibration surface 222 are adjacent with the partition plate 259 being arranged therebetween, the risk that the respectively generated sounds interfere to the other is solved by the partition plate 259.

Additionally, since both the first curved vibration surface 221 and second curved vibration surface 222 are elastically bent at an angle of 180 degrees, the curvatures of the curved surface portions are different from each other.

In FIGS. 38 and 39, there are illustrated that the curvature of the first curved vibration surface 221 is small, and the curvature of the second curved vibration surface 222 is great.

The sixth speaker 600 formed as above makes up by the cone diaphragm 1 the reproduction bandwidth on the low frequency side that the speaker including the curved diaphragm cannot sound, and it is possible to reproduce sounds of a high frequency to a middle frequency of an increased resonance bandwidth in the first curved vibration surface 221 of a small (short) dimension in the length direction in the curved diaphragm 202 and, on the other hand, it is possible to reproduce sounds of a middle frequency to a low frequency of a reduced resonance bandwidth in the second curved vibration surface 222 of a great (long) dimension in the length direction in the curved diaphragm 202.

That is, this sixth speaker 600 includes a dynamic-type first speaker including the cone diaphragm 1, a second speaker including the first curved vibration surface 221, and a third speaker including the second curved vibration surface 222 of a different resonance bandwidth from that of the first curved vibration surface 221. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

Seventh Embodiment

Figure 41:
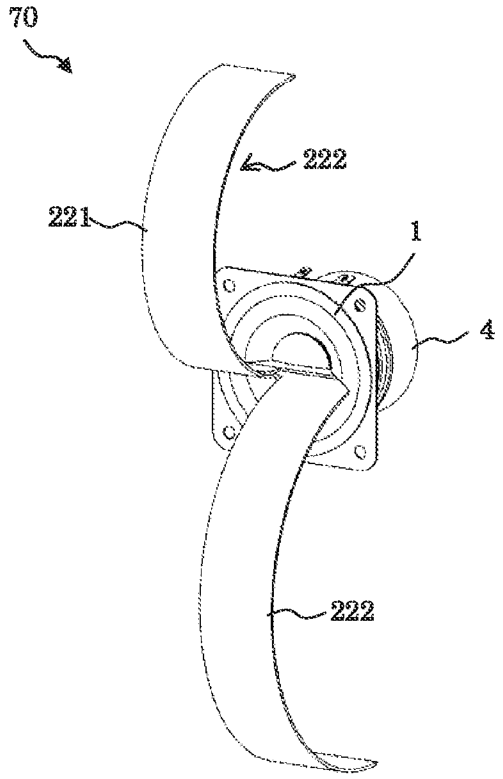
FIG. 41 is a front perspective view illustrating a seventh speaker unit according to the present invention.
Figure 42:
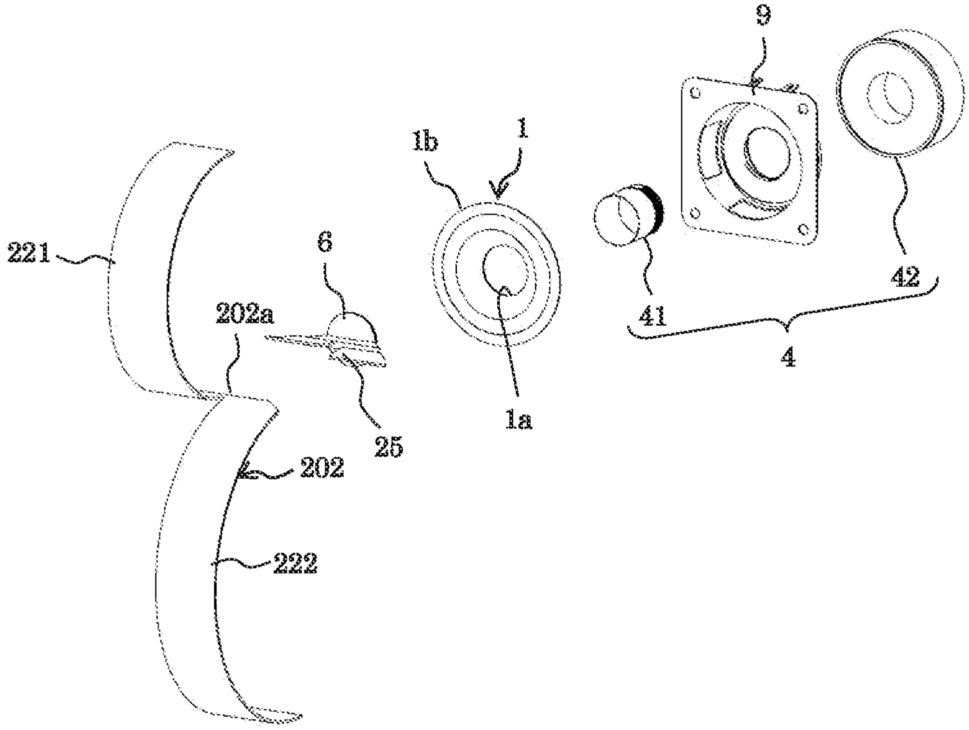
FIG. 42 is an exploded view describing a structure of the seventh speaker unit according to the present invention.

Next, as illustrated in FIGS. 41 and 42, a speaker unit 70 according to a seventh embodiment at least includes the cone-shaped diaphragm 1, the curved diaphragm 202, the driver unit 4 that drives those cone-shaped diaphragm 1 and curved diaphragm 202 together, and a blade piece 25 in the form of a plate to which the one end side of the curved diaphragm 202 is attached and that is connected to the driver unit 4, and as with the sixth embodiment, the curved diaphragm 202 includes the notch 225 along the length direction in the center in the width direction.

In the present embodiment, the curved diaphragm 202 is partially divided to include the two vibration surfaces by providing the notch 225, the first curved vibration surface 221 and the second curved vibration surface 222 are curved in different directions with the notch 225 being arranged therebetween, and the two vibration surfaces are arranged diagonally.

In these first curved vibration surface 221 and second curved vibration surface 222, the elements such as the dimensions in the width direction orthogonal to the length direction and the thicknesses of the respective vibration surfaces may be the same, but at least the dimensions in the length direction are required to be different from each other.

That is, in the first curved vibration surface 221 and the second curved vibration surface 222 in the curved diaphragm 202, the dimensions in the length direction are different from each other as with the first curved vibration surface 221 and the second curved vibration surface 222 in the above-described sixth speaker unit 60, but it is different in that the bending directions of the vibration surfaces are conflicting.

In FIGS. 41 and 42, there is illustrated the seventh speaker unit 70 that includes the curved diaphragm 2 including the two curved vibration surfaces in which the dimensions in the width direction and the thicknesses are the same while the dimensions in the length direction are different from each other, and the curved surface portions in the conflicting direction are formed.

The blade piece 25 is used to efficiently connect the curved diaphragm 202 to the driver unit 4, and a distal side diverges into two according to the bending directions of the curved vibration surfaces.

That is, the blade piece 25 may be formed of a single flat piece entirely from a proximal side connected to the driver unit 4 to the distal side, and it is desirable to include two flat pieces in which the proximal side is a single flat piece substantially perpendicular to the driver unit 4, and the notch is provided on the distal side such that the one is curved or inclined upward while the other is curved or inclined downward according to the bending directions of the first curved vibration surface 221 and the second curved vibration surface 222 in the curved diaphragm 202.

That is, an operation to form the curved vibration surfaces by elastically bending and deforming the first curved vibration surface 221 and the second curved vibration surface 222 is easily performed when the distal side of the blade piece 25 is curved (inclined) according to the bending directions of the curved diaphragms.

In addition, when the blade piece 25 is curved (inclined) toward the distal side, in the driving by the driver unit 4, it is possible to smoothly drive with no risk of applying stress to the first curved vibration surface 221 and the second curved vibration surface 222.

Figure 43:
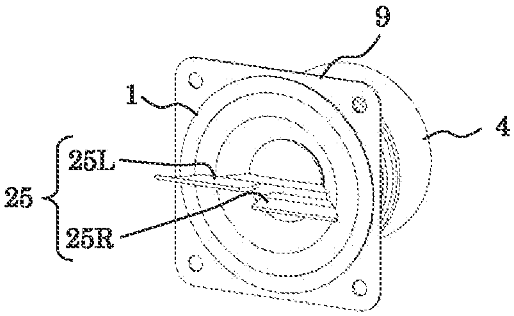
FIG. 43 is a front perspective view illustrating a state before the curved diaphragm is attached in the seventh speaker unit according to the present invention.

In FIG. 43, there is illustrated that the blade piece 25 is integral with the center cap 6 and diverges into two by providing the notch, which include a left piece 25L in which a distal side is curved upward according to the bending direction of the first curved vibration surface 221 and a right piece 25R that is curved downward according to the bending direction of the second curved vibration surface 222.

Figure 44:
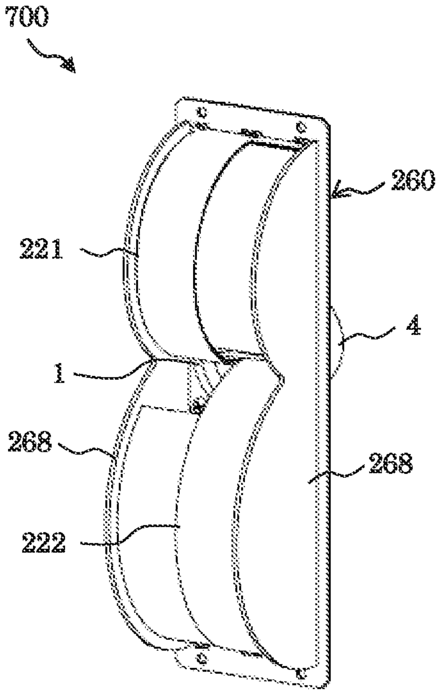
FIG. 44 is a front perspective view illustrating a seventh speaker in which the seventh speaker unit according to the present invention is mounted in a housing.

Additionally, the seventh speaker unit 70 formed as above forms a seventh speaker 700 illustrated in FIG. 44 by fixing the large diameter side 1*b* of the cone diaphragm 1 and the other end side 221*b* of the first curved vibration surface 221 and the other end side 222*b* of the second curved vibration surface 222 in the curved diaphragm 202 to a housing 260 together.

Figure 45:
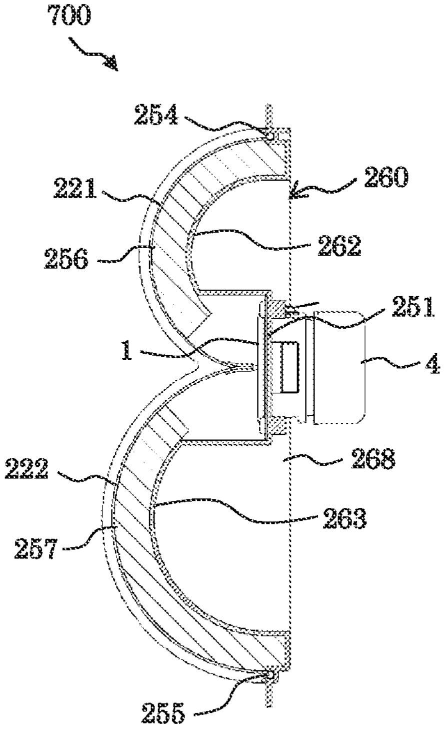
FIG. 45 is a front central longitudinal section of a portion of the seventh speaker illustrated in FIG. 44 except the driver unit.
Figure 46:
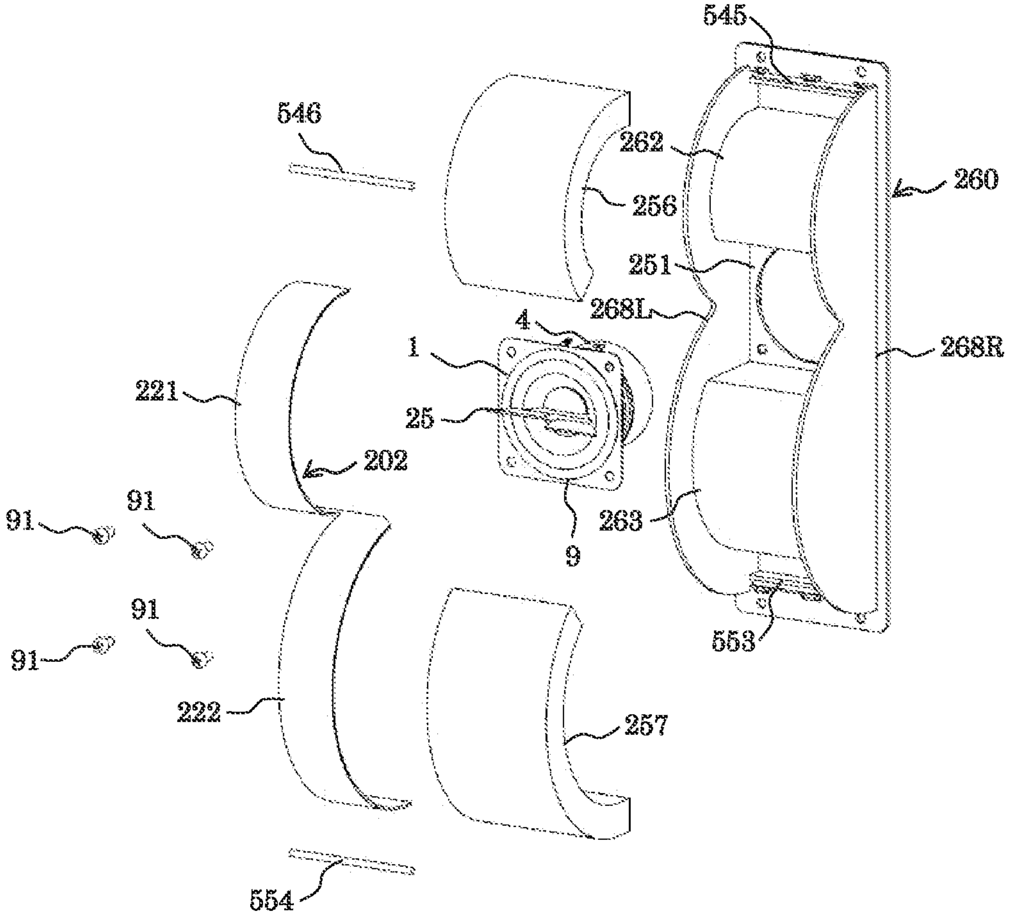
FIG. 46 is an exploded view describing a structure of the seventh speaker illustrated in FIG. 44.

As illustrated in FIGS. 45 and 46, the housing 260 includes the support frame 251, adjacent two support surfaces 262, 263 continuously provided on this support frame 251, the first fixation means 254 provided at a terminal portion of the one support surface 262 and the second fixation means 255 provided at a terminal portion of the other support surface 263, the flexible elastic support members 256, 257 arranged on the two support surfaces 262, 263, respectively, and a pair of side plates 268, 268.

As with the support surface 252 in the sixth speaker unit 60, the support surface 262 is a part including a curved surface portion equal to the curve of the first curved vibration surface 221 and is provided to be positioned on the back surface side of the first curved vibration surface 221 without putting the curved surface portion in contact with the back surface of the first curved vibration surface 221 and to be positioned on an upper side of the support frame 251.

As with the support surface 253 in the sixth speaker unit 60, the support surface 263 is a part including a curved surface portion equal to the curve of the second curved vibration surface 222 and is provided to be positioned on the back surface side of the second curved vibration surface 222 without putting the curved surface portion in contact with the back surface of the second curved vibration surface 222 and to be positioned on a lower side of the support frame 251.

Therefore, these support surface 262 and support surface 263 are continuously provided in different facing positions with the support frame 251 being arranged therebetween.

The side plates 268 are a pair of plate-shaped members that are arranged on two sides, respectively, so as to sandwich and store the support frame 251, the two support surfaces 262, 263, and the flexible elastic support members 256, 257 arranged on these support surfaces 262, 263, respectively, with the first curved vibration surface 221 and the second curved vibration surface 222 and have, for example, a shape of mountains falling sideways in which large and small two mountains are adjacent like a shape along an outer edge of a Roman character "B".

In FIG. 46, the side plate on a front right side is indicated by a reference sign 268R, and the side plate on a front left side is indicated by a reference sign 268L.

Therefore, as illustrated in FIG. 46, the seventh speaker unit 70 first fixes the cone support frame 9 to the support frame 251 of the housing 260 by using the screws 91 . . . 91. Next, after the elastic support member 256 is arranged on the support surface 262 on an upper side of the housing 260, and the first curved vibration surface 221 in the curved diaphragm 202 is elastically bent upward at an angle of 180 degrees to insert the other end side 221*b* thereof into the recessed groove 545, the fixation rod 546 is additionally arranged for holding. Thus, the other end side 221*b* of the first curved vibration surface 221 is attached to a housing 260 by the first fixation means 254.

Additionally, after the elastic support member 257 is arranged on the support surface 263 on a lower side of the housing 260, and the second curved vibration surface 222 in the curved diaphragm 202 is elastically bent downward at an angle of 180 degrees to insert the other end side 222*b* thereof into the recessed groove 553, the fixation rod 554 is additionally arranged for holding. Thus, the other end side 222*b* of the second curved vibration surface 222 is attached to the housing 260 by the second fixation means 255.

Thus, the other end side 221*b* of the first curved vibration surface 221 is attached to a left upper end of the housing 260, and the other end side 222*b* of the second curved vibration surface 222 is attached to a right lower end of the housing 260; thus, the two vibration surfaces (the curved surface portions) are curved in different directions and arranged diagonally.

Therefore, even though there is no partition plate between the two vibration surfaces, it is possible to prevent the risk that the respectively generated sounds resonate to the other and are distorted.

In these first curved vibration surface 221 and second curved vibration surface 222, the curvatures of the curved surface portions are different from each other.

In FIG. 45, there are illustrated that the curvature of the first curved vibration surface 221 is small, and the curvature of the second curved vibration surface 222 is great.

The seventh speaker 700 formed as above makes up by the cone diaphragm 1 the reproduction bandwidth on the low frequency side that the speaker including the curved diaphragm cannot sound, and it is possible to reproduce sounds of a high frequency to a middle frequency of an increased resonance bandwidth in the first curved vibration surface 221 of a small (short) dimension in the length direction in the curved diaphragm 202 and, on the other hand, it is possible to reproduce sounds of a middle frequency to a low frequency of a reduced resonance bandwidth in the second curved vibration surface 222 of a great (long) dimension in the length direction in the curved diaphragm 202.

That is, this seventh speaker 700 includes a dynamic-type first speaker including the cone diaphragm 1, a second speaker including the first curved vibration surface 221, and a third speaker including the second curved vibration surface 222 of a different resonance bandwidth from that of the first curved vibration surface 221. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

Eighth Embodiment

Figure 47:
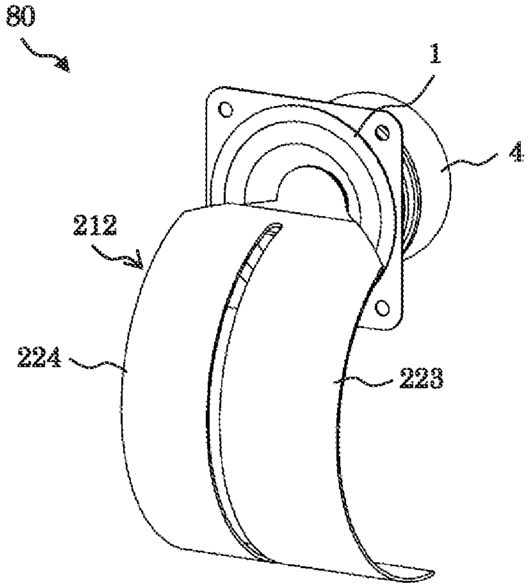
FIG. 47 is a front perspective view illustrating an eighth speaker unit according to the present invention.
Figure 48:
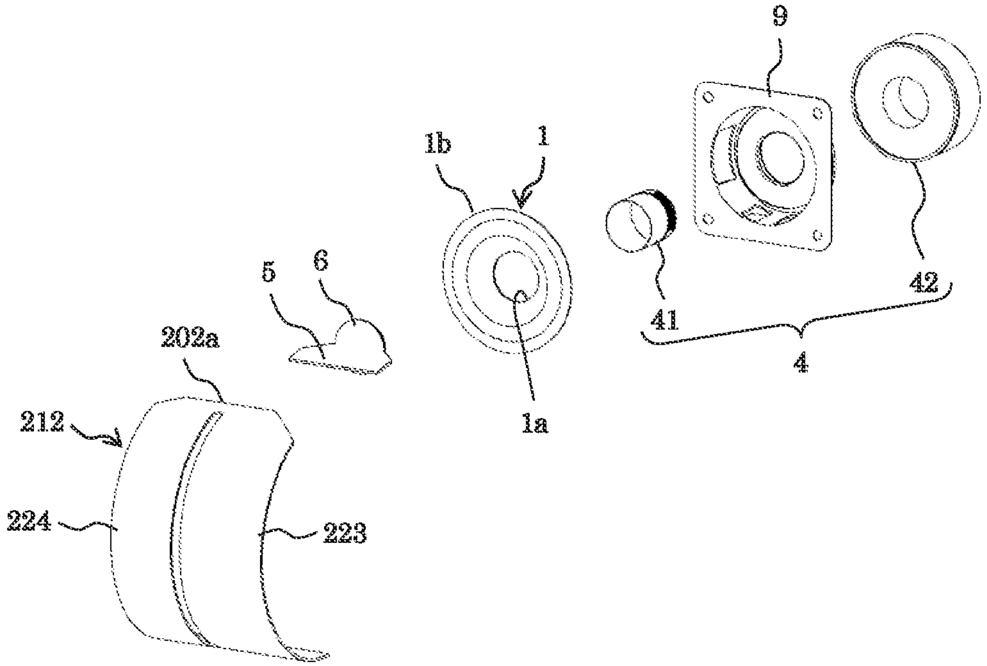
FIG. 48 is an exploded view describing a structure of the eighth speaker unit according to the present invention.
Figure 49:
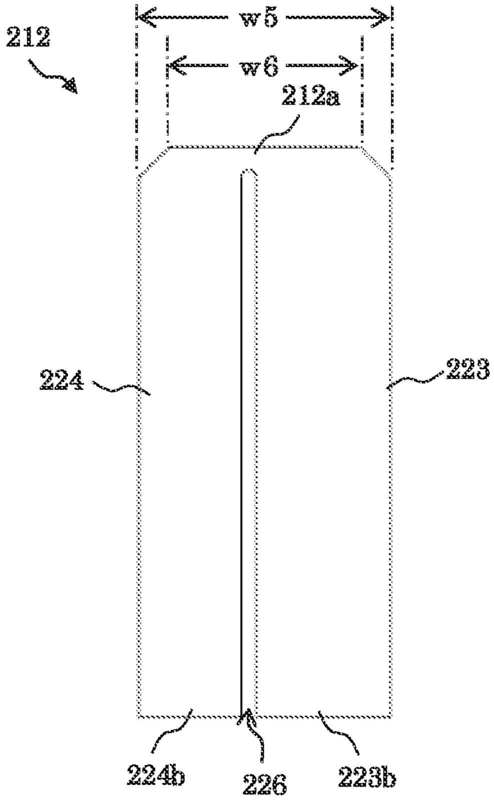
FIG. 49 is a front view describing a curved diaphragm used in the eighth speaker unit according to the present invention.

Next, as illustrated in FIGS. 47 and 48, a speaker unit 80 according to an eighth embodiment at least includes the cone-shaped diaphragm 1, a curved diaphragm 212, the driver unit 4 that drives those cone-shaped diaphragm 1 and curved diaphragm 212 together, and the blade piece 5 in the form of a plate to which one end side of the curved diaphragm 212 is attached and that is connected to the driver unit 4. Additionally, as illustrated in FIG. 49, the curved diaphragm 212 includes a notch 226 that is along the length direction while being displaced from the center in the width direction.

In the present embodiment, the curved diaphragm 212 is partially divided to include the two vibration surfaces by providing the notch 226, and a first curved vibration surface 223 and a second curved vibration surface 224 are curved in the same direction with the notch 226 being arranged therebetween such that the two vibration surfaces are formed to be adjacent.

In these first curved vibration surface 223 and second curved vibration surface 224, the elements such as the dimensions in the length direction and the thicknesses of the respective vibration surfaces may be the same, but at least the dimensions in the width direction orthogonal to the length direction are required to be different from each other.

That is, in the first curved vibration surface 223 and the second curved vibration surface 224 in the curved diaphragm 212, the dimensions in the length direction and the thicknesses are the same, and the bending directions of the vibration surfaces are also the same as with the first curved vibration surface 221 and the second curved vibration surface 222 in the above-described sixth speaker unit 60; however, the dimensions in the width direction are different from each other.

In FIG. 49, there are illustrated that the notch 226 is provided on a left side of the center of the curved diaphragm 212, and the dimension in the width direction of the first curved vibration surface 223 positioned on a right side of the notch 226 is greater than the dimension in the width direction of the second curved vibration surface 224 positioned on a left side of the notch 226.

Additionally, as illustrated in FIG. 49, the curved diaphragm 212 has a shape in which the dimension in the width direction is gradually reduced (narrowed) toward one end side 212*a* connected to the driver unit 4.

In FIG. 49, there is illustrated that the shape of the curved diaphragm 212 in the width direction is gradually reduced (narrowed) toward the one end side 212*a* from other end sides 223*b*, 224*b*, and a dimension w6 of the one end side 212*a* in the width direction is smaller than a dimension w5 in the width direction close to the other end (w5>w6).

Therefore, the shape of the one end side 212*a* in the curved diaphragm 212 is substantially the same shape conforming to the mortar shape of the cone-shaped diaphragm 1 as well, and even when the one end side 212*a* of the curved diaphragm 212 is connected to the driver unit 4 to which the cone-shaped diaphragm 1 is connected, the cone-shaped diaphragm 1 and the curved diaphragm 212 are not put in contact and do not interfere with each other.

As a material of this curved diaphragm 212, as with the curved diaphragm 2 in the above-described first embodiment, it is possible to use paper such as carbon paper, plastic having flexibility such as polyimide and polyester, a wood material such as balsa wood, and a metal such as aluminum, beryllium, and boron. Additionally, the above-described foamed sheet material may be applied.

The curved diaphragm 212 is not particularly limited as long as it has a thickness that can be elastically bent and deformed to form the curved projection surface.

Additionally, the curved diaphragm 212 may be a member formed to include the curved vibration surface in advance.

In FIGS. 47 and 48, there is illustrated the eighth speaker unit 80 that includes the curved diaphragm 212 including the two curved vibration surfaces in which the dimensions in the length direction and the thicknesses are the same, but the dimensions in the width direction are different, which are a combination of the first curved vibration surface 223 of a great (wide) dimension in the width direction and the second curved vibration surface 224 of a small (narrow) dimension in the width direction, the respective curved vibration surfaces forming the curved surface portions in the same direction.

In this speaker unit 80, although the dimensions of the two vibration surfaces in the length direction are the same, since the dimension of the first curved vibration surface 223 in the width direction is great (wide), the area of the vibration surface is great, and on the other hand, since the dimension of the second curved vibration surface 224 in the length direction is small (narrow), the area of the vibration surface is small; therefore, the weights are different from each other.

Thus, the resonance characteristics of the two vibration surfaces are different.

Figure 50:
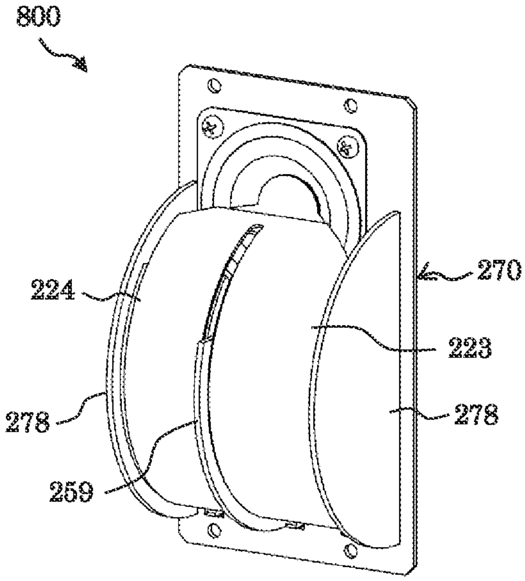
FIG. 50 is a front perspective view illustrating an eighth speaker in which the eighth speaker unit according to the present invention is mounted in a housing.

Additionally, the eighth speaker unit 80 formed as above forms an eighth speaker 800 illustrated in FIG. 50 by fixing the large diameter side 1*b* of the cone diaphragm 1 and the other end side 223*b* of the first curved vibration surface 223 and the other end side 224*b* of the second curved vibration surface 224 in the curved diaphragm 212 to a housing 270 together.

Figure 51:
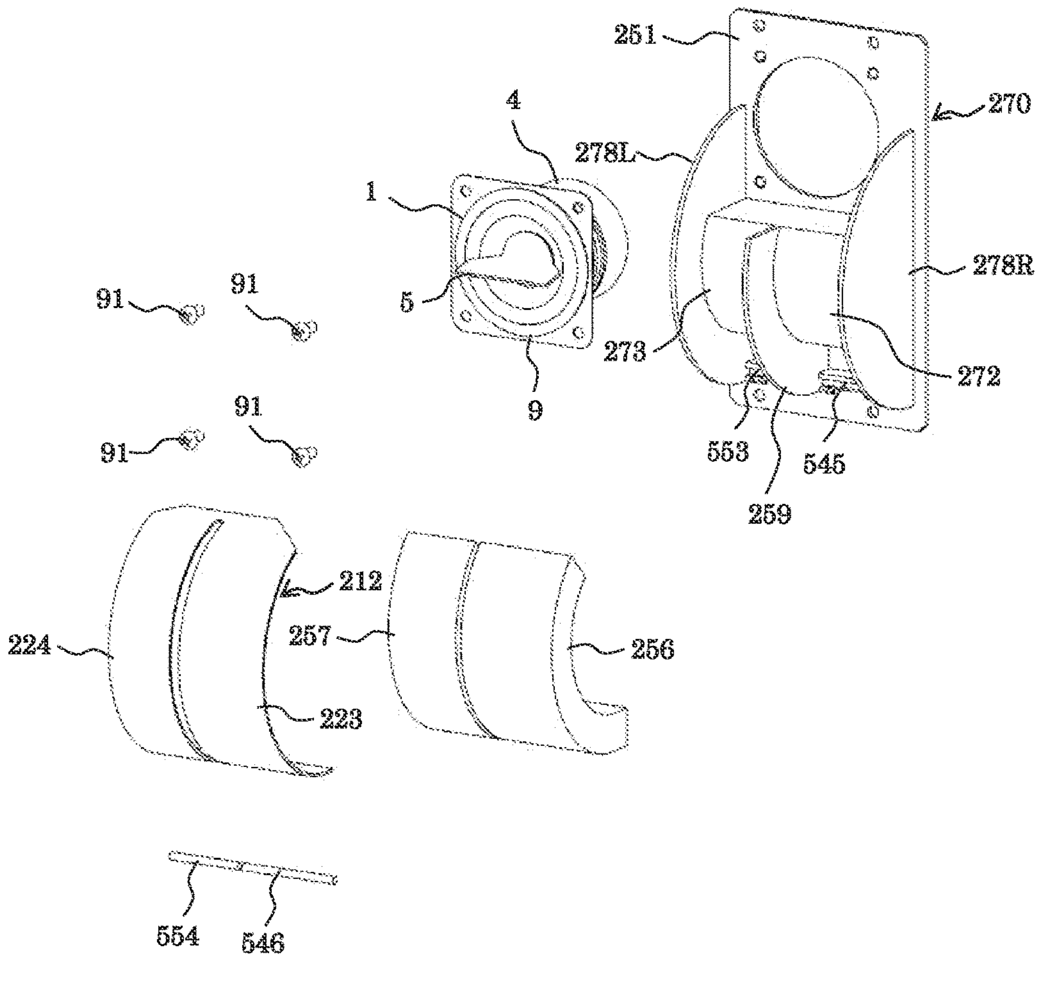
FIG. 51 is an exploded view describing a structure of the eighth speaker illustrated in FIG. 50.

As illustrated in FIG. 51, the housing 270 includes the support frame 251, adjacent two support surfaces 272, 273 continuously provided on this support frame 251, the first fixation means 254 provided at a terminal portion of the one support surface 272 and the second fixation means 255 provided at a terminal portion of the other support surface 273, the flexible elastic support members 256, 257 arranged on the two support surfaces 272, 273, respectively, and a pair of side plates 278, 278.

As with the support surface 252 in the sixth speaker unit 60, the support surface 272 is a part including a curved surface portion equal to the curve of the first curved vibration surface 223 in the curved diaphragm 212 and is positioned on a back surface side of the first curved vibration surface 223 without putting the curved surface portion in contact with a back surface of the first curved vibration surface 223 and is provided to be positioned on a lower right side of the support frame 251.

On the other hand, as with the support surface 253 in the sixth speaker unit 60, the support surface 273 is a part including a curved surface portion equal to the curve of the second curved vibration surface 224 in the curved diaphragm 212 and is positioned on a back surface side of the second curved vibration surface 224 without putting the curved surface portion in contact with a back surface of the second curved vibration surface 224 and is provided to be positioned on a lower left side of the support frame 251.

These support surface 272 and support surface 273 are formed in adjacent positions, respectively, with the partition plate 259 being arranged therebetween, and the dimension of the support surface 272 in the width direction is greater (wider) than the dimension of the support surface 273 in the width direction according to the dimensions of the first curved vibration surface 223 and the second curved vibration surface 224 in the width direction.

The side plates 278 are a pair of plate-shaped members that are arranged on two sides, respectively, so as to sandwich and store the support frame 251, the two support surfaces 272, 273, the flexible elastic support members 256, 257 arranged on these support surfaces 272, 273, respectively, and the partition plate 259 with the curved diaphragm 212 (the first curved vibration surface 223 and the second curved vibration surface 224) and are arranged such that, for example, the pair of plate-shaped members having the same size in a shape of mountain like the shape along an outer edge of the Roman character "D" face each other.

In FIG. 51, the side plate on a front right side is indicated by a reference sign 278R, and the side plate on a front left side is indicated by a reference sign 278L.

Therefore, as illustrated in FIG. 51, the eighth speaker unit 80 first fixes the cone support frame 9 to the support frame 251 of the housing 270 by using the screws 91 . . . 91. Next, after the elastic support member 256 is arranged on the support surface 272 on a right side of the housing 270, and the first curved vibration surface 223 in the curved diaphragm 212 is elastically bent downward at an angle of 180 degrees to insert the other end side 223*b* thereof into the recessed groove 545, the fixation rod 546 is additionally arranged for holding. Thus, the other end side 223*b* of the first curved vibration surface 223 is attached to the housing 270 by the first fixation means 254.

Additionally, after the elastic support member 257 is arranged on the support surface 273 on a left side of the housing 270, and the second curved vibration surface 224 in the curved diaphragm 212 is elastically bent downward at an angle of 180 degrees to insert the other end side 224*b* thereof into the recessed groove 553, the fixation rod 554 is additionally arranged for holding. Thus, the other end side 224*b* of the second curved vibration surface 224 is attached to the housing 270 by the second fixation means 255.

As a result, the other end side 223*b* of the first curved vibration surface 223 is attached to the right side of the housing 270, and the other end side 224*b* of the second curved vibration surface 224 is attached to the left side of the housing 270; thus, the two vibration surfaces (the curved surface portions) are curved in the same direction and are adjacent to each other.

In this case, since the first curved vibration surface 223 and the second curved vibration surface 224 are adjacent with the partition plate 259 being arranged therebetween as well, the risk that the respectively generated sounds interfere to the other and are distorted is solved by the partition plate 259.

The eighth speaker 800 formed as above also makes up by the cone diaphragm 1 the reproduction bandwidth on the low frequency side that the speaker including the curved diaphragm cannot sound, and it is possible to reproduce sounds of a middle frequency to a low frequency of a reduced resonance bandwidth in the first curved vibration surface 223 of a great (wide) dimension in the width direction in the curved diaphragm 212 and, on the other hand, it is possible to reproduce sounds of a high frequency to a middle frequency of an increased resonance bandwidth in the second curved vibration surface 224 of a small (narrow) dimension in the width direction in the curved diaphragm 212.

That is, this eighth speaker 800 includes a dynamic-type first speaker including the cone diaphragm 1, a second speaker including the first curved vibration surface 223, and a third speaker including the second curved vibration surface 224 of a different resonance bandwidth from that of the first curved vibration surface 223. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

Ninth Embodiment

Figure 52:
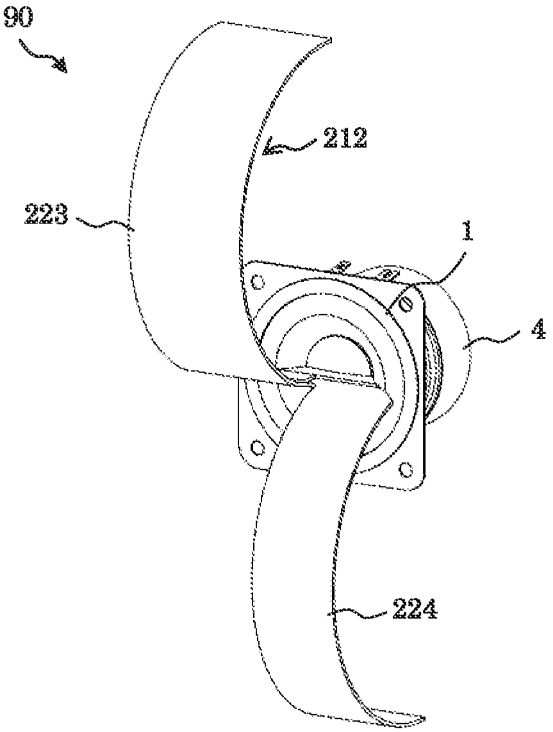
FIG. 52 is a front perspective view illustrating a ninth speaker unit according to the present invention.
Figure 53:
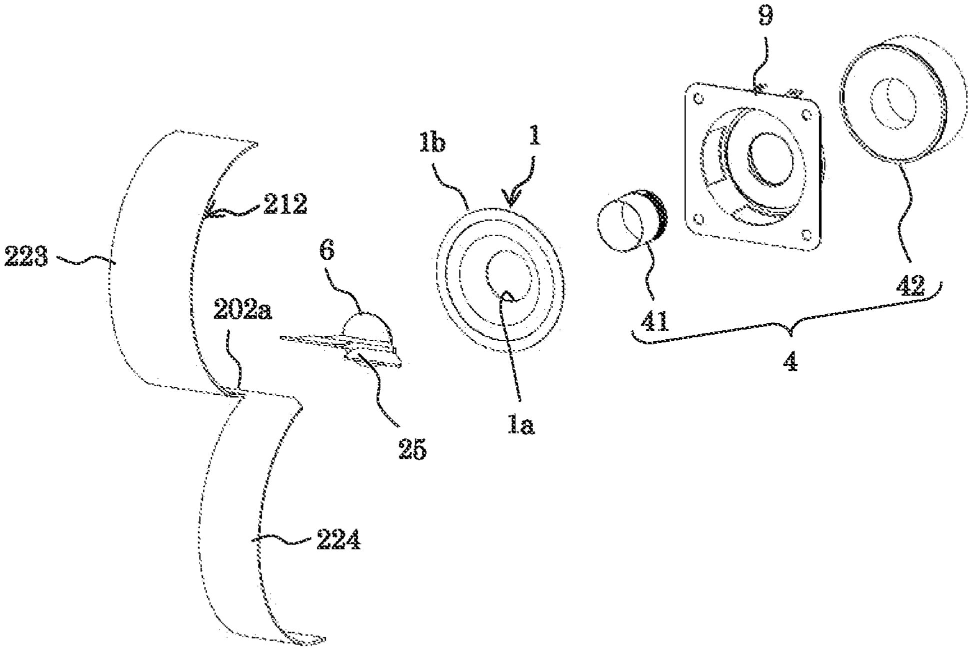
FIG. 53 is an exploded view describing a structure of the ninth speaker unit according to the present invention.

Additionally, as illustrated in FIGS. 52 and 53, a speaker unit 90 according to a ninth embodiment at least includes the cone-shaped diaphragm 1, the curved diaphragm 212, the driver unit 4 that drives those cone-shaped diaphragm 1 and curved diaphragm 212 together, and the blade piece 25 in the form of a plate to which the one end side of the curved diaphragm 212 is attached and that is connected to the driver unit 4, and as with the eighth embodiment, the curved diaphragm 212 includes the notch 226 that is along the length direction while being displaced from the center in the width direction.

In the present embodiment, the curved diaphragm 212 is partially divided to include the two vibration surfaces by providing the notch 226, and the first curved vibration surface 223 and the second curved vibration surface 224 are curved in different directions with the notch 226 being arranged therebetween such that the two vibration surfaces are arranged diagonally.

In these first curved vibration surface 223 and second curved vibration surface 224, the elements such as the dimensions in the length direction and the thicknesses of the respective vibration surfaces may be the same, but at least the dimensions in the width direction orthogonal to the length direction are required to be different from each other.

That is, in the first curved vibration surface 223 and the second curved vibration surface 224 in the curved diaphragm 212, the dimensions in the length direction and the thicknesses are the same, but it is different in that the bending directions of the vibration surfaces are conflicting as with the first curved vibration surface 221 and the second curved vibration surface 222 in the above-described seventh speaker unit 70, and the respective dimensions in the width direction are different from each other as with the first curved vibration surface 223 and the second curved vibration surface 224 in the above-described eighth speaker unit 80.

In FIGS. 52 and 53, there is illustrated the ninth speaker unit 90 that includes the curved diaphragm 212 including the two curved vibration surfaces in which the dimensions in the length direction and the thicknesses are the same, but the dimensions in the width direction are different from each other, and the curved surface portions are formed in directions conflicting from each other.

Figure 54:
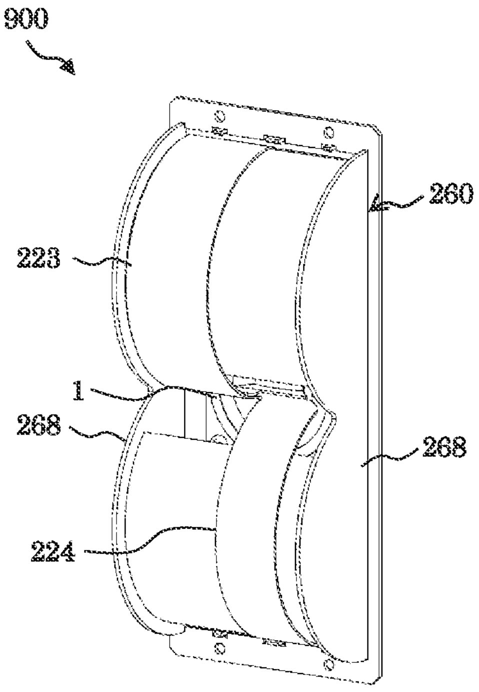
FIG. 54 is a front perspective view illustrating a ninth speaker in which the ninth speaker unit according to the present invention is mounted in the housing.

Additionally, the ninth speaker unit 90 formed as above forms a ninth speaker 900 illustrated in FIG. 54 by fixing the large diameter side 1*b* of the cone diaphragm 1 and the other end side 223*b* of the first curved vibration surface 223 and the other end side 224*b* of the second curved vibration surface 224 in the curved diaphragm 212 to the housing 260 together.

Figure 55:
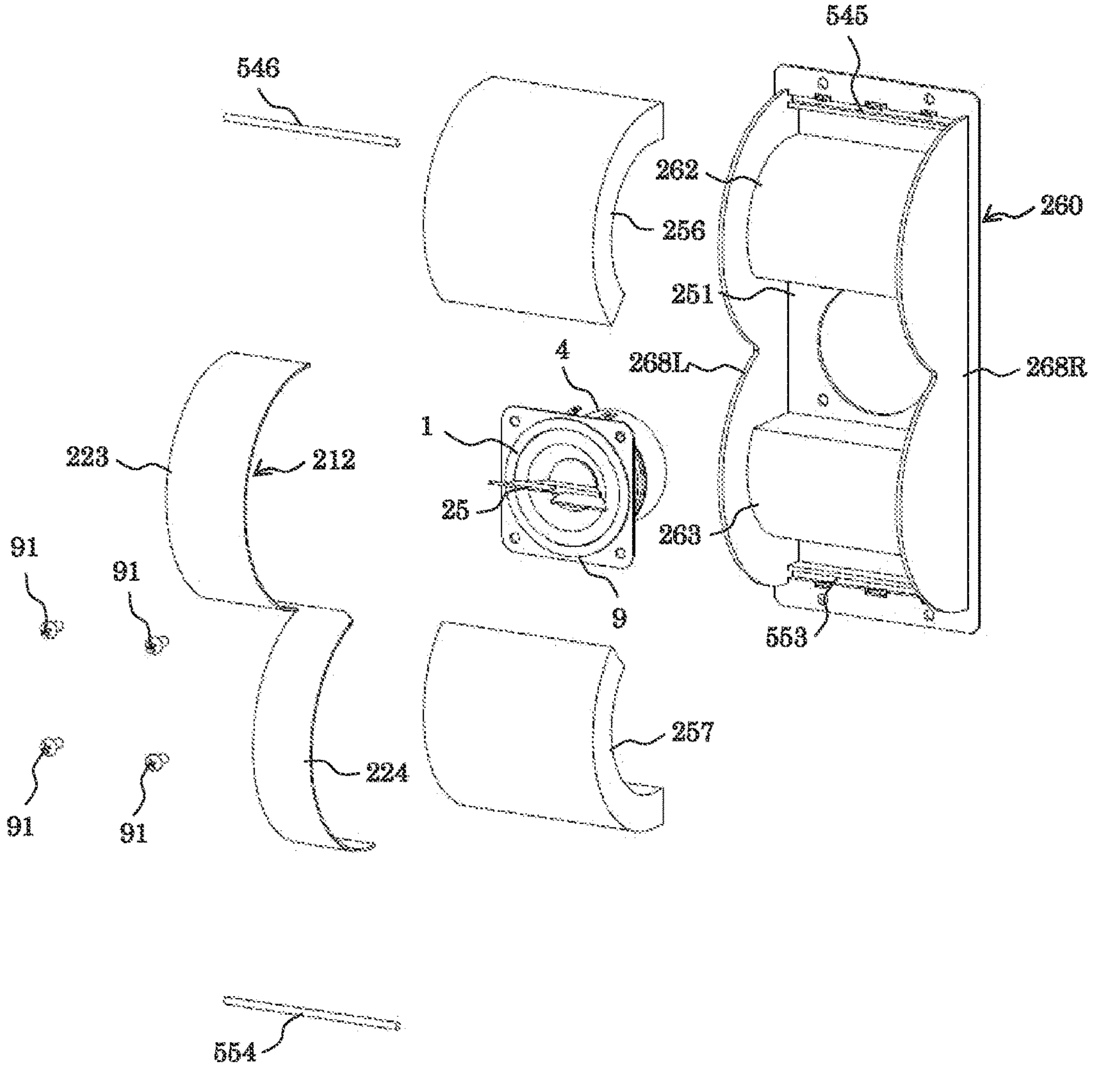
FIG. 55 is an exploded view describing a structure of the ninth speaker illustrated in FIG. 54.

As illustrated in FIG. 55, the housing 260 includes the support frame 251, the adjacent two support surfaces 262, 263 continuously provided on this support frame 251, the first fixation means 254 provided at the terminal portion of the one support surface 262 and the second fixation means 255 provided at the terminal portion of the other support surface 263, the flexible elastic support members 256, 257 arranged on the two support surfaces 262, 263, respectively, and the pair of side plates 268, 268.

Therefore, as illustrated in FIG. 55, the ninth speaker unit 90 first fixes the cone support frame 9 to the support frame 251 of the housing 260 by using the screws 91 . . . 91. Next, after the elastic support member 256 is arranged on the support surface 262 on the upper side of the housing 260, and the first curved vibration surface 223 in the curved diaphragm 212 is elastically bent upward at an angle of 180 degrees to insert the other end side 223*b* thereof into the recessed groove 545, the fixation rod 546 is additionally arranged for holding. Thus, the other end side 223*b* of the first curved vibration surface 223 is attached to the housing 260 by the first fixation means 254.

Additionally, after the elastic support member 257 is arranged on the support surface 263 on the lower side of the housing 260, and the second curved vibration surface 224 in the curved diaphragm 212 is elastically bent downward at an angle of 180 degrees to insert the other end side 224*b* thereof into the recessed groove 553, the fixation rod 554 is additionally arranged for holding. Thus, the other end side 224*b* of the second curved vibration surface 224 is attached to the housing 260 by the second fixation means 255.

Thus, the other end side 223*b* of the first curved vibration surface 223 is attached to the left upper end of the housing 260, and the other end side 224*b* of the second curved vibration surface 224 is attached to the right lower end of the housing 260; thus, the two vibration surfaces (the curved surface portions) are curved in different directions and arranged diagonally.

The ninth speaker 900 formed as above also makes up by the cone diaphragm 1 the reproduction bandwidth on the low frequency side that the speaker including the curved diaphragm cannot sound, and it is possible to reproduce sounds of a middle frequency to a low frequency of a reduced resonance bandwidth in the first curved vibration surface 223 of a great (long) dimension in the length direction in the curved diaphragm 212 and, on the other hand, it is possible to reproduce sounds of a high frequency to a middle frequency of an increased resonance bandwidth in the second curved vibration surface 224 of a small (short) dimension in the length direction in the curved diaphragm 212.

That is, this ninth speaker 900 includes a dynamic-type first speaker including the cone diaphragm 1, a second speaker including the first curved vibration surface 223, and a third speaker including the second curved vibration surface 224 of a different resonance bandwidth from that of the first curved vibration surface 223. Therefore, when the electric signal is inputted to the driver unit 4, a wider (expanded) reproduction frequency bandwidth in the curved diaphragm than that of the conventional speaker system for hearing-impaired people and hearing people is obtained, and it is possible to improve the sound quality.

In addition, since it is light, requires less disposing area, and easy to carry, a high performance and high quality hybrid-type speaker system with the improved versatility of the speaker is implemented.

As above, in those sixth to ninth speakers 600, 700, 800, and 900, the sound from the dynamic-type first speaker including the cone-shaped diaphragm and the sounds from the second speaker and the third speaker including the curved diaphragm are mixed, and thus it is possible to reproduce the sound of a wider bandwidth (sound waves for hearing-impaired people and hearing people).

Additionally, since the driver unit that drives the cone-shaped diaphragm and the driver unit that drives the curved diaphragm are common in the sixth to ninth speakers 600, 700, 800, and 900, the manufacturing cost and the weight are reduced. Moreover, the integrally and continuously provided first speaker and second speaker and third speaker integrally allow for a less disposing area and a compact form.

Note that, in the above-described sixth to ninth embodiments, a case where the curvatures of the vibration surfaces are different in the curved diaphragms in which the dimensions such as the lengths and the widths are the same is not exemplified; however, it is possible to reproduce the sound of a reduced resonance bandwidth by reducing the curvature of the one curved vibration surface in the curved diaphragm and to reproduce the sound of an increased resonance bandwidth by increasing the curvature of the other curved vibration surface in the curved diaphragm.

Additionally, in the above-described sixth to ninth embodiments, a case where the thicknesses and the hardnesses of the vibration surfaces are different is not exemplified; however, it is possible to change the thicknesses and the hardnesses as needed by affixing a sheet material and applying a paint on the curved vibration surface.

As a result, it is possible to reproduce the sound of a reduced resonance bandwidth by increasing the thickness of the one curved diaphragm and to reproduce the sound of an increased resonance bandwidth by reducing the thickness of the other curved diaphragm. Additionally, it is possible to reproduce the sound of a reduced resonance bandwidth by making the one curved diaphragm soft and to reproduce the sound of an increased resonance bandwidth by making the other curved diaphragm hard.

REFERENCE SIGNS LIST

1 first diaphragm (cone-shaped diaphragm)
2, 12 second diaphragm (curved diaphragm)
4 driver unit
5, 15, 25 blade
6 center cap (dust cap)
9 cone support frame
10, 20, 30, 40, 50, 60, 70, 80, 90 speaker unit
21 first curved vibration surface
22 second curved vibration surface
41 voice coil
42 magnetic circuit
50, 150, 250, 260, 270 housing
100, 200, 300, 400, 500, 600, 700, 800, 900 speaker (hybrid-type speaker system)
102, 112, 122 second diaphragm (first curved diaphragm)
103, 113, 123 third diaphragm (second curved diaphragm)
202, 212 second diaphragm (curved diaphragm)
221, 223 first curved vibration surface
222, 224 second curved vibration surface
225, 226 notch

The invention claimed is:

1. A speaker unit, comprising:
a first diaphragm in the form of a cone;
a second diaphragm in the form of a sheet forming a curved vibration surface; and
a driver unit driving the first diaphragm and the second diaphragm together, wherein
the driver unit is connected to a small diameter side of the first diaphragm and one end side of the second diaphragm, and
the second diaphragm is provided with means for affixing sheet material on a predetermined region or another region except the predetermined region, and has a plurality of regions of different resonance characteristics in which thickness of vibration surfaces are changed in the middle of a length direction from the one end side toward another end side of the second diaphragm; and
the predetermined region includes a boundary with the other region having a tapered shape in which a dimension in a width direction is reduced toward the other end side from the one end side of the second diaphragm.

2. The speaker unit according to claim 1, wherein the second diaphragm is connected to the driver unit via a blade piece in the form of a plate attached to a tip of a voice coil bobbin of the driver unit.

3. A speaker unit, comprising:
a first diaphragm in the form of a cone;
a second diaphragm in the form of a sheet forming a curved vibration surface; and
a driver unit driving the first diaphragm and the second diaphragm together, wherein
the driver unit is connected to a small diameter side of the first diaphragm and one end side of the second diaphragm, and
the second diaphragm is provided with means for applying a coating agent on a predetermined region or another region except the predetermined region, and has a plurality of regions of different resonance characteristics in which hardesses of vibration surfaces are changed in the middle of a length direction from the one end side toward another end side of the second diaphragm; and
the predetermined region includes a boundary with the other region having a tapered shape in which a dimension in a width direction is reduced toward the other end side from the one end side of the second diaphragm.

4. The speaker unit according to claim 3, wherein the second diaphragm is connected to the driver unit via a blade piece in the form of a plate attached to a tip of a voice coil bobbin of the driver unit.

5. A speaker unit, comprising:
a first diaphragm in the form of a cone;
a second diaphragm in the form of a sheet forming a curved vibration surface; and
a driver unit driving the first diaphragm and the second diaphragm together, wherein
the driver unit is connected to a small diameter side of the first diaphragm and one end side of the second diaphragm, and
the second diaphragm is provided with means for applying a coating agent on a predetermined region or another region except the predetermined region, and has a plurality of regions of different resonance characteristics in which weights of vibration surfaces are changed in the middle of a length direction from the one end side toward another end side of the second diaphragm; and
the predetermined region includes a boundary with the other region having a tapered shape in which a dimension in a width direction is reduced toward the other end side from the one end side of the second diaphragm.

6. The speaker unit according to claim 5, wherein the second diaphragm is connected to the driver unit via a blade piece in the form of a plate attached to a tip of a voice coil bobbin of the driver unit.

7. A speaker unit, comprising:
a first diaphragm in the form of a cone;
a second diaphragm in the form of a sheet forming a curved vibration surface; and
a driver unit driving the first diaphragm and the second diaphragm together, wherein
the driver unit is connected to a small diameter side of the first diaphragm and one end side of the second diaphragm, and
the second diaphragm is provided with means for applying a coating agent on a predetermined region or another region except the predetermined region, and has a plurality of regions of different resonance characteristics in which thickness of vibration surfaces are changed in the middle of a length direction from the one end side toward another end side of the second diaphragm; and the predetermined region includes a boundary with the other region having a tapered shape in which a dimension in a width direction is reduced toward the other end side from the one end side of the second diaphragm.

8. The speaker unit according to claim 7, wherein the second diaphragm is connected to the driver unit via a blade piece in the form of a plate attached to a tip of a voice coil bobbin of the driver unit.

9. A speaker unit, comprising:

a first diaphragm in the form of a cone;

a second diaphragm in the form of a sheet forming a curved vibration surface; and a driver unit driving the first diaphragm and the second diaphragm together, wherein the driver unit is connected to a small diameter side of the first diaphragm and one end side of the second diaphragm, and the second diaphragm is provided with means for affixing sheet material on a predetermined region or another region except the predetermined region, and has a plurality of regions of different resonance characteristics in which hardnesses of vibration surfaces are changed in the middle of a length direction from the one end side toward another end side of the second diaphragm; and the predetermined region includes a boundary with the other region having a tapered shape in which a dimension in a width direction is reduced toward the other end side from the one end side of the second diaphragm.

10. The speaker unit according to claim 9, wherein the second diaphragm is connected to the driver unit via a blade piece in the form of a plate attached to a tip of a voice coil bobbin of the driver unit.

11. A speaker unit, comprising:

a first diaphragm in the form of a cone;

a second diaphragm in the form of a sheet forming a curved vibration surface; and a driver unit driving the first diaphragm and the second diaphragm together, wherein the driver unit is connected to a small diameter side of the first diaphragm and one end side of the second diaphragm, and the second diaphragm is provided with means for affixing sheet material on a predetermined region or another region except the predetermined region, and has a plurality of regions of different resonance characteristics in which weights of vibration surfaces are changed in the middle of a length direction from the one end side toward another end side of the second diaphragm; and the predetermined region includes a boundary with the other region having a tapered shape in which a dimension in a width direction is reduced toward the other end side from the one end side of the second diaphragm.

12. The speaker unit according to claim 11, wherein the second diaphragm is connected to the driver unit via a blade piece in the form of a plate attached to a tip of a voice coil bobbin of the driver unit.

* * * * *